United States Patent
Shugar et al.

(10) Patent No.: US 9,243,818 B2
(45) Date of Patent: Jan. 26, 2016

(54) STACKABLE TRACKING SOLAR COLLECTOR ASSEMBLY

(75) Inventors: Daniel S. Shugar, San Bruno, CA (US); Charles Almy, Berkeley, CA (US); John Peurach, San Francisco, CA (US); Nathaniel T. Coleman, Oakland, CA (US); Jason Jones, Berkeley, CA (US); Reuben Sandler, Berkeley, CA (US)

(73) Assignee: SunPower Corporation, San Jose, CA (US)

( * ) Notice: Subject to any disclaimer, the term of this patent is extended or adjusted under 35 U.S.C. 154(b) by 869 days.

(21) Appl. No.: 12/021,682

(22) Filed: Jan. 29, 2008

(65) Prior Publication Data

US 2008/0230047 A1 Sep. 25, 2008

Related U.S. Application Data

(60) Provisional application No. 60/896,775, filed on Mar. 23, 2007, provisional application No. 60/991,597, filed on Nov. 30, 2007.

(51) Int. Cl.
*H01L 31/042* (2014.01)
*F24J 2/54* (2006.01)
(Continued)

(52) U.S. Cl.
CPC ............... *F24J 2/5413* (2013.01); *F24J 2/525* (2013.01); *F24J 2/5237* (2013.01); *H02S 20/00* (2013.01); *F24J 2002/5277* (2013.01); *F24J 2002/5279* (2013.01); *F24J 2002/5451* (2013.01); *F24J 2002/5468* (2013.01);
(Continued)

(58) Field of Classification Search
CPC .................. F24J 2002/5277; F24J 2002/5279; F24J 2002/5451; F24J 2002/5468; F24J 2002/5486; F24J 2/525; F24J 2/5413; F24J 2/5237; H02S 20/00; H02S 20/10; H02S 20/30; Y10T 29/49355; Y02E 10/50; Y02E 10/47
USPC ........................................... 136/246; 126/569
See application file for complete search history.

(56) References Cited

U.S. PATENT DOCUMENTS 3,716,234 A * 2/1973 Lancellotti .................... 473/481
4,000,734 A    1/1977 Matlock et al.
(Continued)

FOREIGN PATENT DOCUMENTS

AU    B-55904/86    10/1986
FR    2461331       1/1981
(Continued)

OTHER PUBLICATIONS

JP2001-007373 Machine Translation, Hamamoto, Jan. 2001.*
(Continued)

*Primary Examiner* — Devina Pillay
(74) *Attorney, Agent, or Firm* — Knobbe Martens Olson & Bear, LLP

(57) ABSTRACT

A solar collector assembly may include a frame supporting a solar collector and a frame member defining a tilted pivot axis. Support struts may be used to elevate one end of the frame and may be pivoted between an orientation generally parallel to the frame member and to an orientation generally away from the frame. Anchorless, ballast type bases may be used to support the solar collector assembly. Several assemblies may be stacked on top of one another in a storage or transportation configuration using spacers extending between the frames.

13 Claims, 49 Drawing Sheets

(51) Int. Cl.
*F24J 2/52* (2006.01)
*H02S 20/10* (2014.01)
*H02S 10/30* (2014.01)

(52) U.S. Cl.
CPC ......... *F24J 2002/5486* (2013.01); *H02S 10/30* (2014.12); *H02S 20/10* (2014.12); *Y02E 10/47* (2013.01); *Y02E 10/50* (2013.01); *Y10T 29/49355* (2015.01)

(56) References Cited

U.S. PATENT DOCUMENTS

| | | |
|---|---|---|
| 4,108,154 A | 8/1978 | Nelson |
| 4,187,123 A | 2/1980 | Diggs |
| 4,345,582 A | 8/1982 | Aharon et al. |
| 4,365,617 A | 12/1982 | Bugash et al. |
| 4,404,465 A | 9/1983 | Miller |
| 4,429,178 A | 1/1984 | Prideaux et al. |
| 4,765,309 A | 8/1988 | Legge et al. |
| 4,832,001 A | 5/1989 | Baer |
| 4,855,167 A * | 8/1989 | Biehl ............... 428/18 |
| 5,228,924 A | 7/1993 | Barker et al. |
| 5,319,905 A * | 6/1994 | Szirtes ............... 52/108 |
| 5,685,151 A | 11/1997 | Ross |
| 6,031,178 A | 2/2000 | Kester |
| 6,058,930 A | 5/2000 | Shingleton |
| 6,323,416 B1 | 11/2001 | Komori et al. |
| 6,355,875 B1 | 3/2002 | Kamimura |
| 6,469,242 B1 | 10/2002 | Kondo |
| 6,760,988 B2 * | 7/2004 | Bardeleben ............... 40/591 |
| 2003/0070705 A1 | 4/2003 | Hayden et al. |
| 2004/0124711 A1 * | 7/2004 | Muchow et al. ............... 307/64 |
| 2004/0238025 A1 | 12/2004 | Shingleton |
| 2009/0032014 A1 | 2/2009 | Meydbray |

FOREIGN PATENT DOCUMENTS

| | | | |
|---|---|---|---|
| GB | 2357785 | 7/2001 | |
| JP | 60169173 | 9/1985 | |
| JP | 03145168 | 6/1991 | |
| JP | 2001-7373 A * | 11/2001 | ............ H01L 31/042 |
| WO | 0155651 | 8/2001 | |
| WO | 2004083741 | 9/2004 | |

OTHER PUBLICATIONS

Shugar et al., Commercialization of a Value-Engineered Photovoltaic Tracking System, Proceedings of the 25th IEEE Photovoltaic Specialists Conference, May 1996, pp. 1537-1540, Washington, DC, USA.

Shugar et al., Design and Prototype of a Minimal Cost Tracking Photovoltaic Array Structure, Proceedings of the American Solar Energy Society Conference, Solar '95, Jul. 1995, Minneapolis, MN, USA.

International Search Report dated Apr. 18, 2008 from corresponding International App. No. PCT/US2008/051767.

Office Action in corresponding Chinese Patent Application No. 200880009482.X; Mailed Jun. 11, 2010; 10 pages (incl. translation).

* cited by examiner

STACKABLE TRACKING SOLAR COLLECTOR ASSEMBLY

CROSS REFERENCE TO OTHER APPLICATIONS

This application claims the benefit of U.S. Provisional Application Nos. 60/896,775, filed 23 Mar. 2007 and 60/991,597, filed 30 Nov. 2007, both having the same title as this application.

FEDERALLY SPONSORED RESEARCH OR DEVELOPMENT

This invention was made with U.S. Government support under Subcontract Number ZAX-6-33628-09 awarded by the National Renewable Energy Laboratory. The U.S. Government has certain rights to this invention.

BACKGROUND OF THE INVENTION

This invention relates to solar energy collection, and in particular to an arrangement for driving rows of solar collector assemblies to track the motion of the sun relative to the earth. The invention is more particularly directed to improvements in structure relating to the efficient manufacture, transport and installation of solar collector assemblies, in particular rows of tracking solar collector assemblies. The invention applies to solar collectors in which the solar collector modules include arrays of photovoltaic cells for generating electrical power, but the same principles can be applied also to arrangements for solar heating, for example.

Photovoltaic arrays are used for a variety of purposes, including as a utility interactive power system, as a power supply for a remote or unmanned site, a cellular phone switch-site power supply, or a village power supply. These arrays can have a capacity from a few kilowatts to a hundred kilowatts or more, and are typically installed where there is a reasonably flat area with exposure to the sun for significant portions of the day.

In general terms, these solar collector assemblies have their solar collector modules, typically photovoltaic modules, supported on a frame. The frame commonly includes a frame member, sometimes referred to as a torque tube or torque member, which serves as an axis. A tracker drive system, also called a tilt assembly, may be used to rotate or rock the solar collector assemblies of the one or more rows of solar collector assemblies about their tilt axes to keep the photovoltaic modules as square to the sun as possible. Usually, the rows are arranged with the tilt axes of the solar collector assemblies disposed in a north-south direction, and the tilt assemblies gradually rotate the one or more rows of solar collector assemblies throughout the day from an east-facing direction in the morning to a west-facing direction in the afternoon. The solar collector assemblies are brought back to the east-facing orientation for the next day.

One solar collector arrangement of this type is shown in Barker et al. U.S. Pat. No. 5,228,924. There, each row of panels is affixed to a horizontal pivot shaft that is supported on two or more support piers on which the pivot shaft is journaled. A drive mechanism is mounted on one of the piers, and pushes against the solar panel at some point that is displaced from the shaft. In that case, the drive is of the screw type, and as a drive motor rotates, a shaft retracts or extends to rotate the row of panels in one direction or the other. In this arrangement, each row of panels has its own respective drive mechanism, and so these all have to be synchronized to follow the sun together. Other designs, such as that shown in U.S. Pat. No. 6,058,930, employ a single actuator to control multiple rows of solar panels.

BRIEF SUMMARY OF THE INVENTION

An example of a solar collector assembly comprises a frame having a frame member defining a tilt axis. A solar collector is mounted to the frame. A first side support is coupled to the frame member towards the first end. A second side support is coupled to the frame member towards the second end. The frame member is pivotally coupled to the first and second side supports to permit the solar collector module to be tilted about the tilt axis. The second side support comprises first and second struts. Each strut is coupled to the frame for pivotal movement about a first axis, generally parallel to the tilt axis, and about a second axis to permit the struts to be extended from an orientation generally parallel to the frame member to an orientation generally away from the frame. In some examples the first side support further comprises a mounting member configured to couple to a first surface mount and the first and second struts further comprise mounting members configured to couple to a second surface mount.

A first example of a solar collector installation comprises a first solar collector assembly. The solar collector assembly comprises a frame having a first end and a second end and a solar collector mounted to the frame. A first side support is coupled to the frame towards the first end and a second side support is coupled to the frame towards the second end. The second side support comprises first and second struts, each strut being coupled to the frame for placement at an orientation generally away from the frame. A first surface mount, comprising an anchorless, ballast-type first base, is configured to rest on and substantially above a support surface on which the first solar collector assembly is deployable. A surface mount, comprising an anchorless, ballast-type second base, is configured to rest on and substantially above a support surface on which the first solar collector assembly is deployable. The first side support is coupled to the first surface mount and the second side support is coupled to the second surface mount. In some examples the second surface mount comprises first and second anchorless, ballast-type second bases with the first and second struts connected to the first and second anchorless, ballast-type second bases, respectively. Some examples include a second solar collector assembly with its first strut coupled to the second anchorless, ballast-type second base of the second surface mount such that the second anchorless, ballast-type second base constitutes a shared, unitary base; in this way lateral loads exerted on the first and second solar collector assemblies can be distributed loads.

A second example of a solar collector installation comprises a plurality of solar collector assemblies and a plurality of first and second bases. Each solar collector assembly comprises a frame having a first end and a second end and a solar collector mounted to the frame. Each solar collector assembly also comprises a first side support coupled to the frame towards the first end and a second side support coupled to the frame towards the second end, the second side support comprising first and second support struts, each support strut having a distal end. A plurality of the first bases are arranged substantially in a first row on and substantially above a support surface. A plurality of second bases are arranged substantially in a second row on and substantially above the support surface, the second row having an interior. Each of the plurality of first side supports is coupled to one of the plurality of first bases. Each of the plurality of first and second support struts has its distal end coupled to one of the plurality of second bases such that at least one of the second bases in the interior of the second row is coupled to a support strut of two adjacent solar collector assemblies. The support struts support the solar collector module assemblies above the support surface at at least one chosen tilt angle. In some embodiments the first and second bases comprise anchorless, ballast-type bases. In some embodiments the first and second bases are arranged on the support surface without substantial excavation of the support surface. In some embodiments each of the second bases in the interior of the second row is coupled to a support strut of two adjacent solar collector assemblies.

An example of a stack of solar collector assemblies comprises a plurality of spacers and a plurality of solar collector assemblies. Each solar collector assembly comprises a frame, a solar collector and first and second side supports. The frame and a solar collector are mounted to the frame. The frame has a first end and a second end and also has a frame member defining a tilt axis. The frame extends beyond the solar collector at the first and second ends. The frame further comprises spacer engagement areas configured to engage with the spacers. A first side support is coupled to the frame member towards the first end. A second side support is coupled to the frame member towards the second end. The frame member is pivotally coupled to the first and second side supports to permit the solar collector module to be tilted about the tilt axis. The spacers are configured to be positioned between each of the solar collector modules assemblies in engagement with the spacer engagement areas to support the solar collector module assemblies in a stacked configuration. In some examples the second side support comprises first and second struts, each strut being coupled to the frame for pivotal movement about a first axis generally parallel to the tilt axis and about a second axis; this permits the struts to be extended from a first orientation generally parallel to the frame member to a second orientation generally away from the frame. In some examples at least one of the solar collector module assemblies comprises a drive element configured to be securable to the frame member in a first orientation and securable to the frame in a second orientation. The drive element extends substantially away from the pivot axis and the solar collector when in the first orientation. The drive element extends substantially away from the pivot axis and generally parallel to the solar collector when in the second orientation. In some examples a skid may be used to support the solar collector assemblies. The skid may comprise a base, supporting the solar collector assemblies, and a stabilizer bar extending upwardly from the base. The drive element may be securable to the stabilizer bar to help stabilize the stack of solar collector assemblies.

An example of a method for constructing a tracking solar collector installation is carried out as follows. A plurality of solar collector assemblies are built at a first location. Each solar collector assembly comprises a frame and a solar collector mounted to the frame. The solar collector assemblies are adapted to be arranged in a substantially compact, storage or transport configuration or to be arranged in a deployed configuration. A plurality of surface mounts are prepared at a second location. The plurality of solar collector assemblies are transported to an installation location. The plurality of surface mounts are arranged in at least one row on a support surface at the installation location. The plurality of solar collector assemblies are deployed by mounting them to the plurality of surface mounts such that each of the plurality of solar collector assemblies is rotatable about a tilt axis and supported above the support surface at a chosen tilt angle. In some examples the surface mounts are arranged on and substantially above the support surface and without substantial excavation of the support surface. In some examples the deploying step includes manipulating one or more support members coupled to the frame from a storage or transport configuration wherein the support members are arranged substantially parallel to the frame to a deployed configuration wherein the support members are directed substantially away from the frame. In some examples the preparing step comprises preparing ballast-type surface mounts and the rearranging step comprises placing ballast-type surface mounts on and substantially above the support surface and without substantial excavation of the support surface. In such examples the placing step may comprises placing first and second ballast-type surface mounts on the support surface for each solar collector assembly.

Other features, aspects and advantages of the present invention can be seen on review of the figures, the detailed description, and the claims which follow.

DESCRIPTION OF THE SPECIFIC EMBODIMENTS

Figure 1:
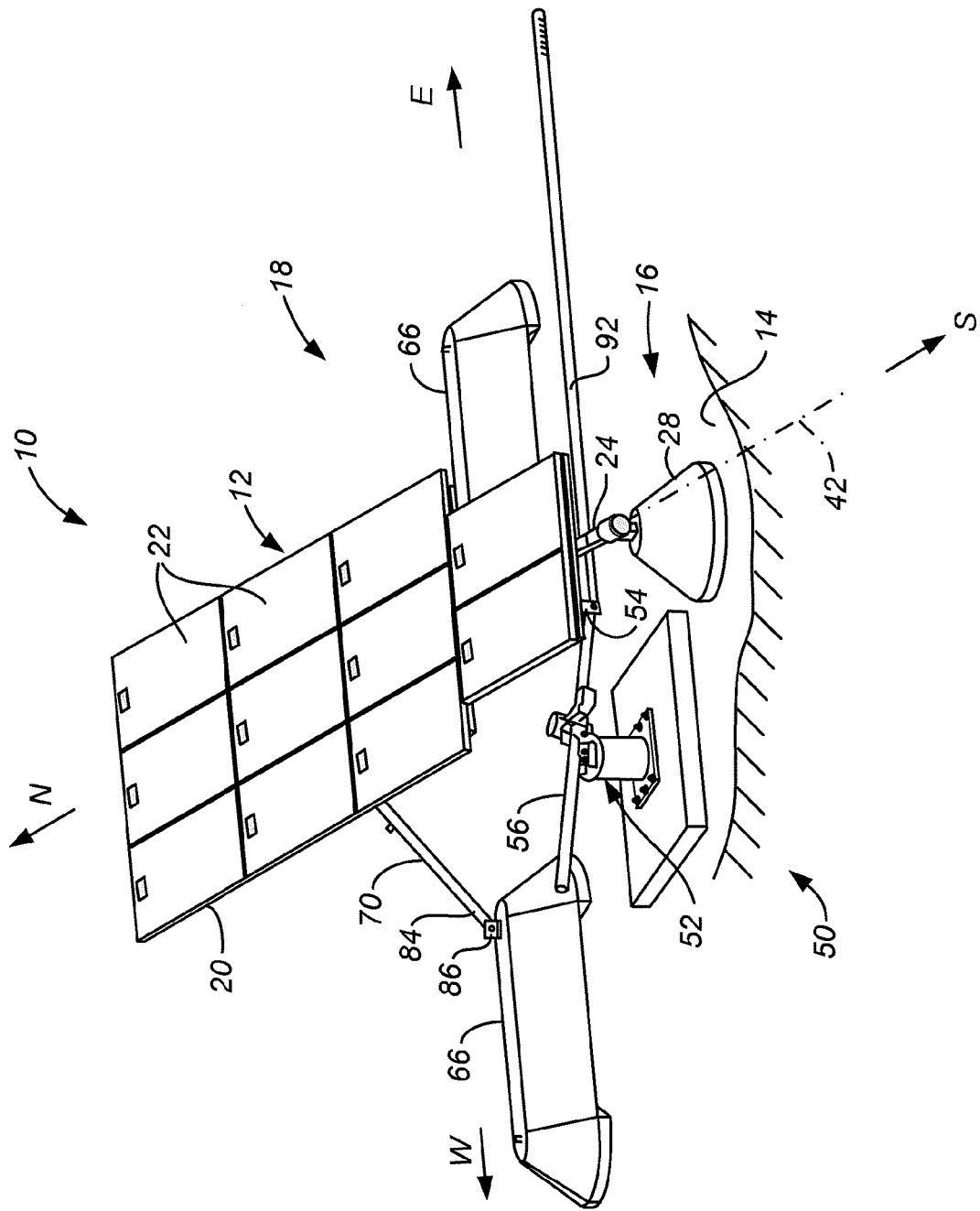
FIG. 1 is a front, left side, top view showing an example of a solar collector assembly.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

One of the advantages accruing from some examples of the invention is the ability to install solar collector assemblies over uneven terrain without the need for substantial site preparation. This permits solar collector assemblies to be installed at locations that otherwise would not be economically feasible.

Figure 4:
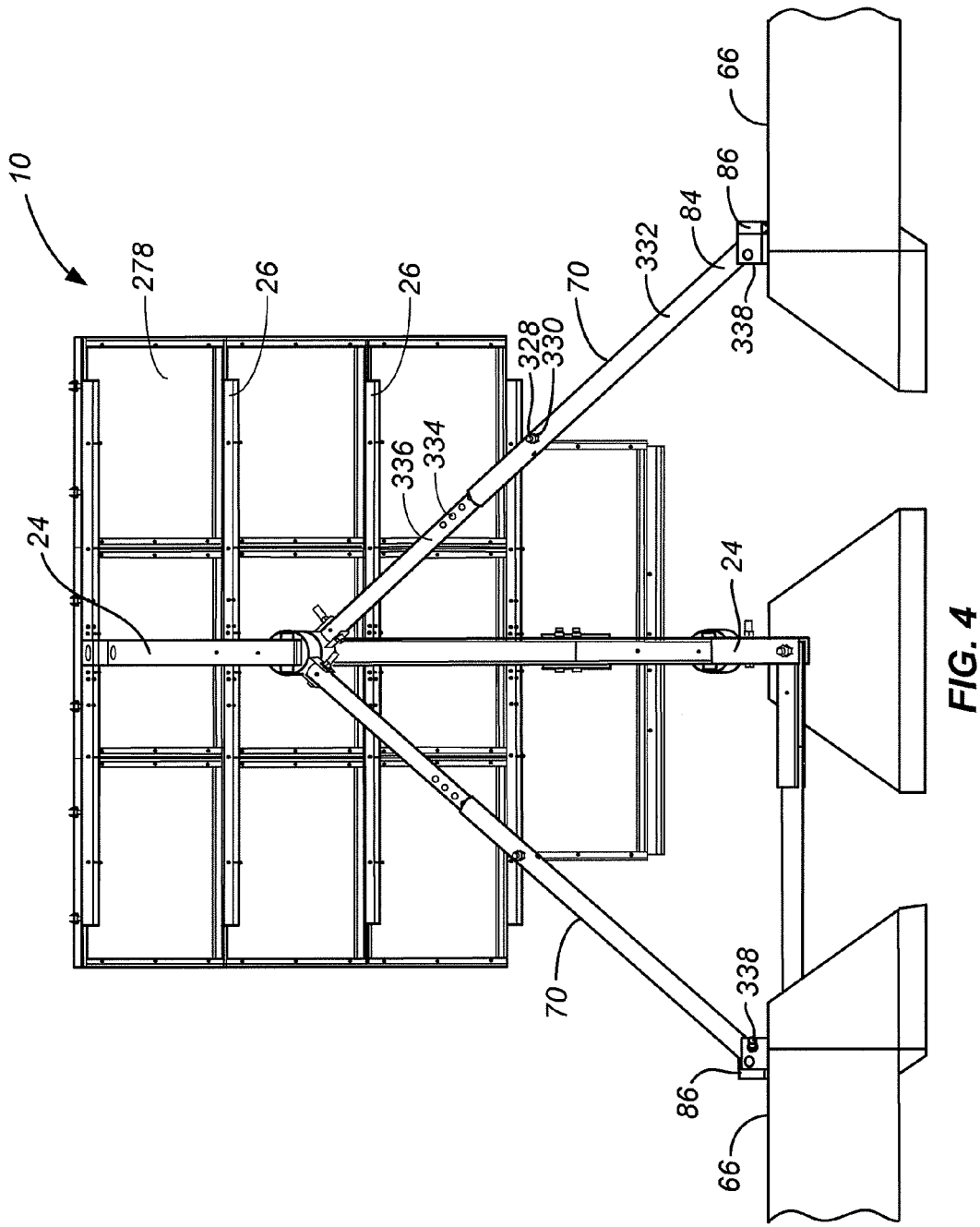
Figure 5:
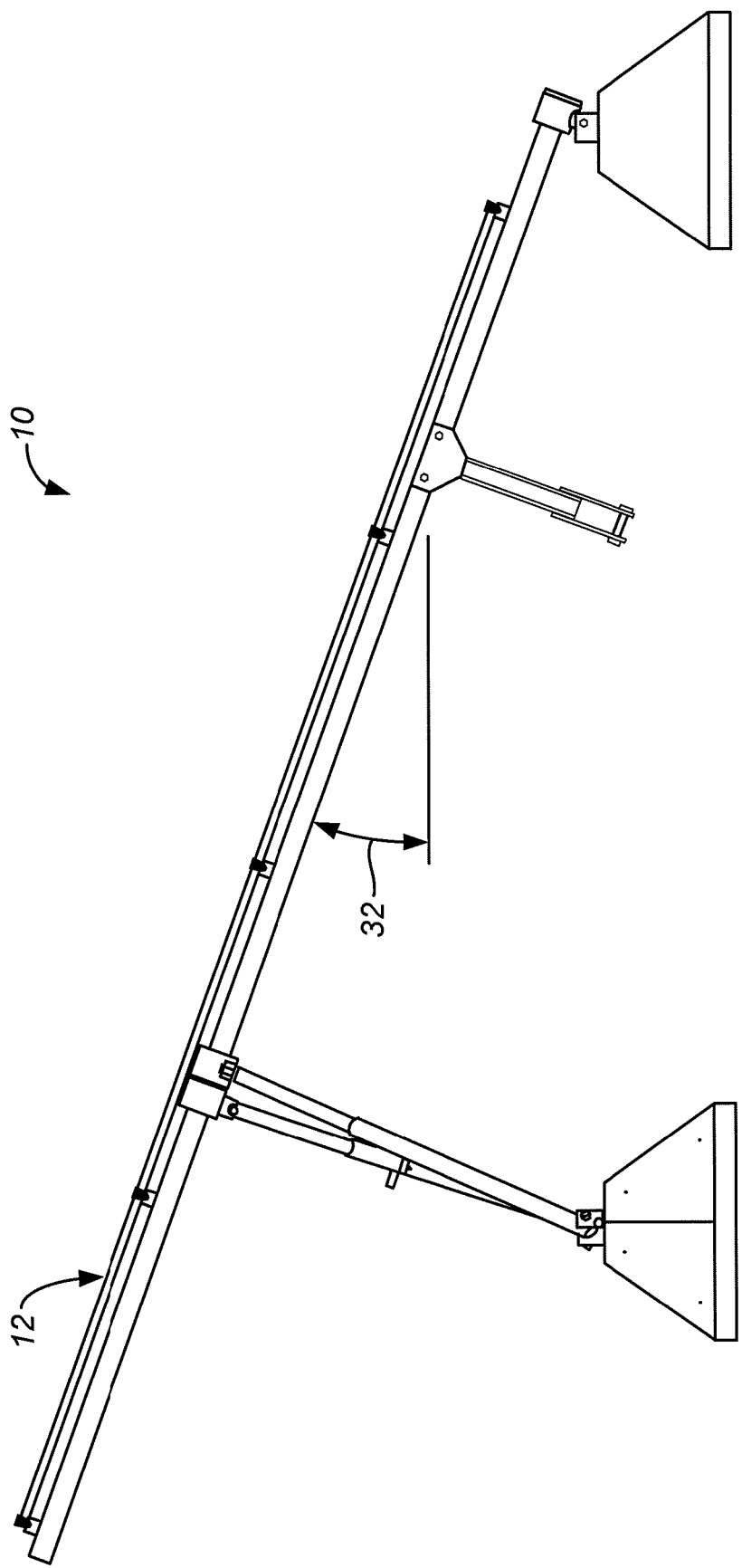

FIG. 1 illustrates a solar collector assembly 10 including broadly a solar collector module assembly 12 mounted above a support surface 14, typically the ground, by a first support 16, sometimes referred to as south side support 16, and by a second support 18, sometimes referred to as north side support 18. Solar collector module assembly 12 includes a frame 20 supporting a number of solar collector modules 22. As shown in FIGS. 4 and 5, frame 20 includes a frame member 24, sometimes referred to as torque member 24, supporting transversely oriented rails 26. Solar collector modules 22 are secured to rails 26 by clips 27 (see FIGS. 6, 7A and 22) or other mounting structure appropriate to the construction of the solar collector modules. An example of clips suitable for use with solar collector modules 22 having a peripheral frame is disclosed in U.S. patent application Ser. No. 11/681,972 filed 5 Mar. 2007.

Figure 5A:
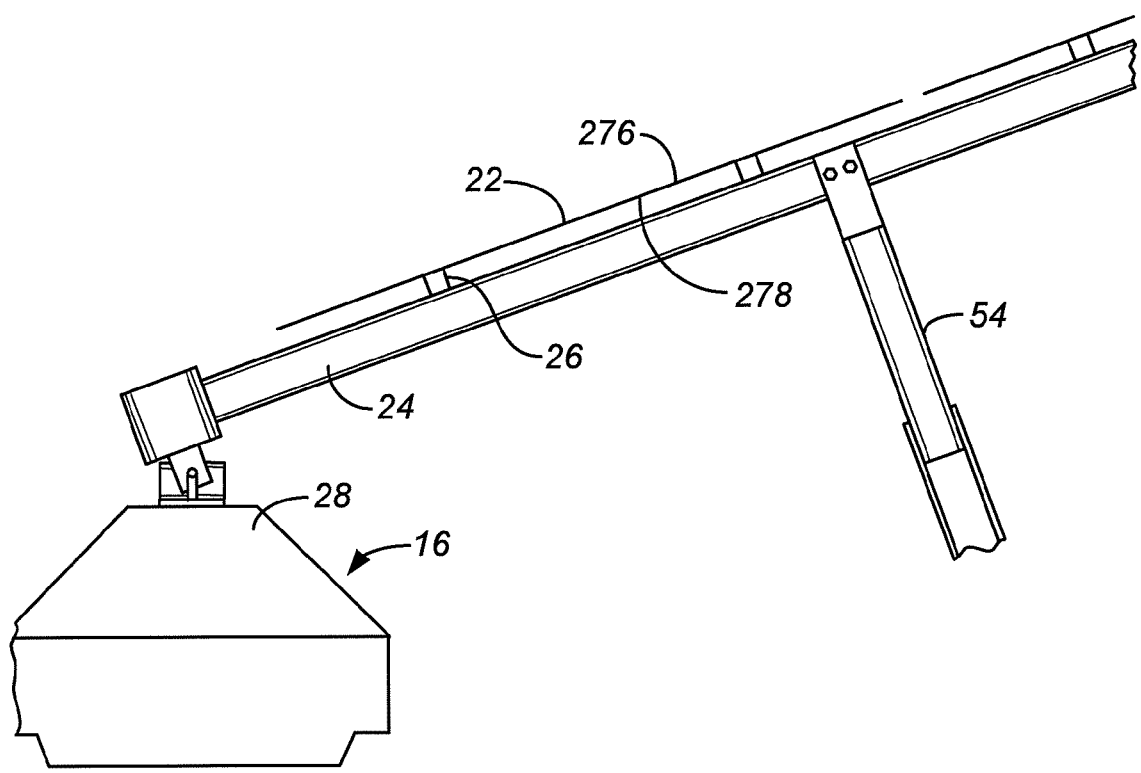
FIG. 5A is an enlarged right side elevational view of a further example of the invention in which the solar collector module is a frameless solar collector module secured to the rails of the frame by an adhesive.

FIG. 5A illustrates an alternative example in which solar collector module 22 is a frameless module secured to rails 26 of frame 20 using an adhesive. The use of a frameless solar collector module can provide several advantages, including saving the cost of solar collector module frames, increasing the stack density (see FIGS. 19-22) due to lower overall height, and helping to prevent theft because frameless modules can be adhered to the substructure which makes it difficult to remove the module without damaging it.

Figure 6:
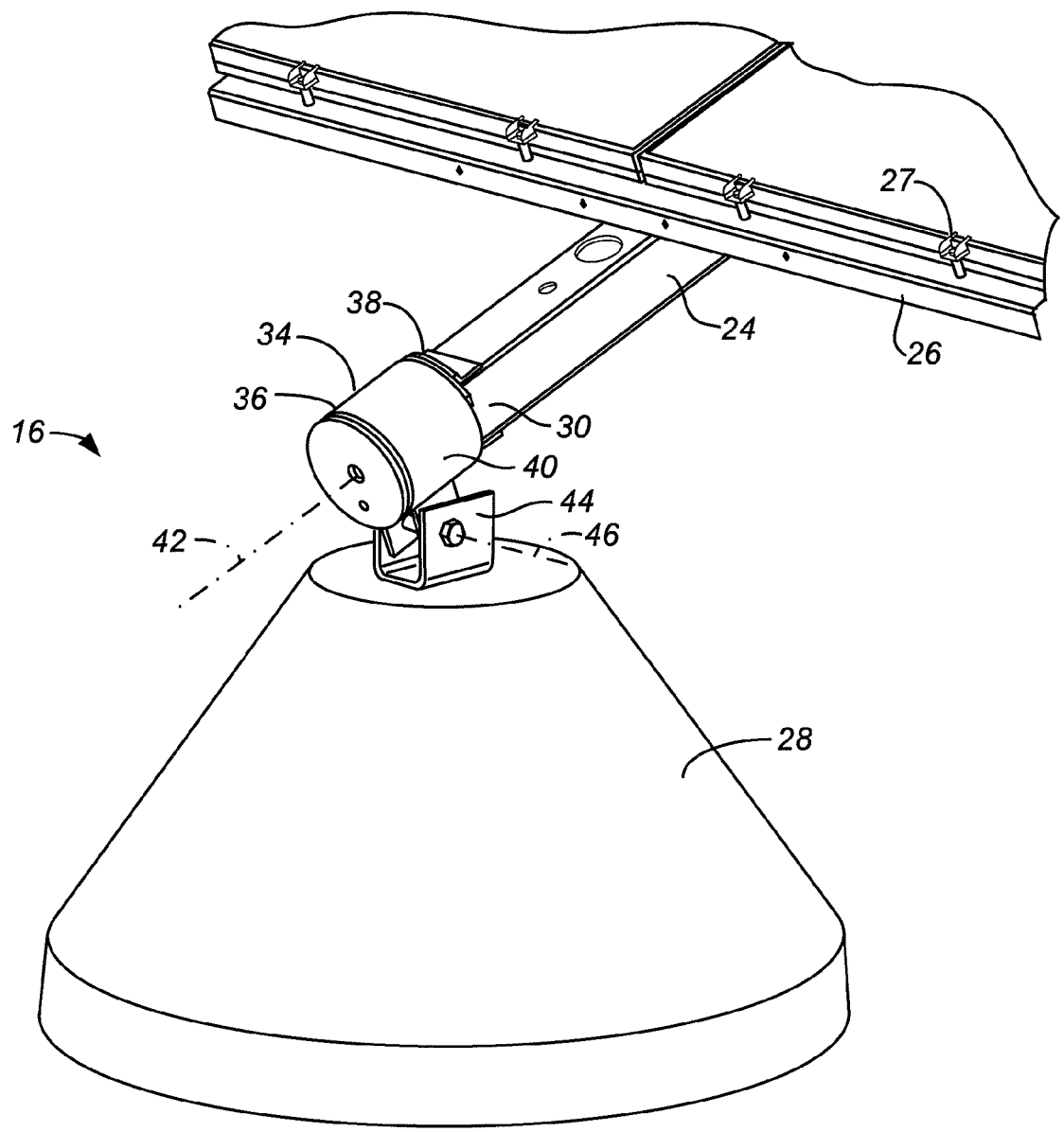
FIG. 6 is an enlarged view showing the south side support of FIG. 1.

As shown in FIG. 6, south side support 16 includes a first surface mount 28, sometimes referred to as south base 28, resting on and substantially above support surface 14. In appropriate cases some surface preparation of support surface 14 may be necessary or desirable to provide a stable surface for base 28. South base 28 is an anchorless, ballast type base designed to be sufficiently heavy to secure the south end 30 of torque member 24 in place without the need for substantial excavation of the support surface, such as would be necessary if base 28 were buried within the support surface, or the need to otherwise anchor the south base to support surface 14. South base 28 is typically made of concrete.

Torque member 24 is pivotally secured to south base 28 by a south side joint 34. South side joint 34 includes a south bearing assembly 36 having an inner bearing member 38 affixed to south end 30 of torque member 24 and an outer bearing member 40 rotatable about inner bearing member 38. This permits torque member 24 to rotate or pivot about a tilt axis 42 defined by the torque member. South side joint 34 also includes a south pivot mount 44 securing outer bearing member 40 of south bearing assembly 36 to south base 28 for pivotal movement about a generally horizontal south pivot axis 46. This permits tilt angle 32 to be changed. The orientation of south pivot mount 44 relative to south base 28 can also be adjusted about a vertical axis. The ability to adjust the orientation of south pivot mount and the ability of torque member 24 to pivot about tilt axis 42 and about south pivot axis 46 helps to accommodate unevenness in support surface 14 thereby helping to eliminate extensive preparation of support surface 14 prior to installation.

Figure 8:
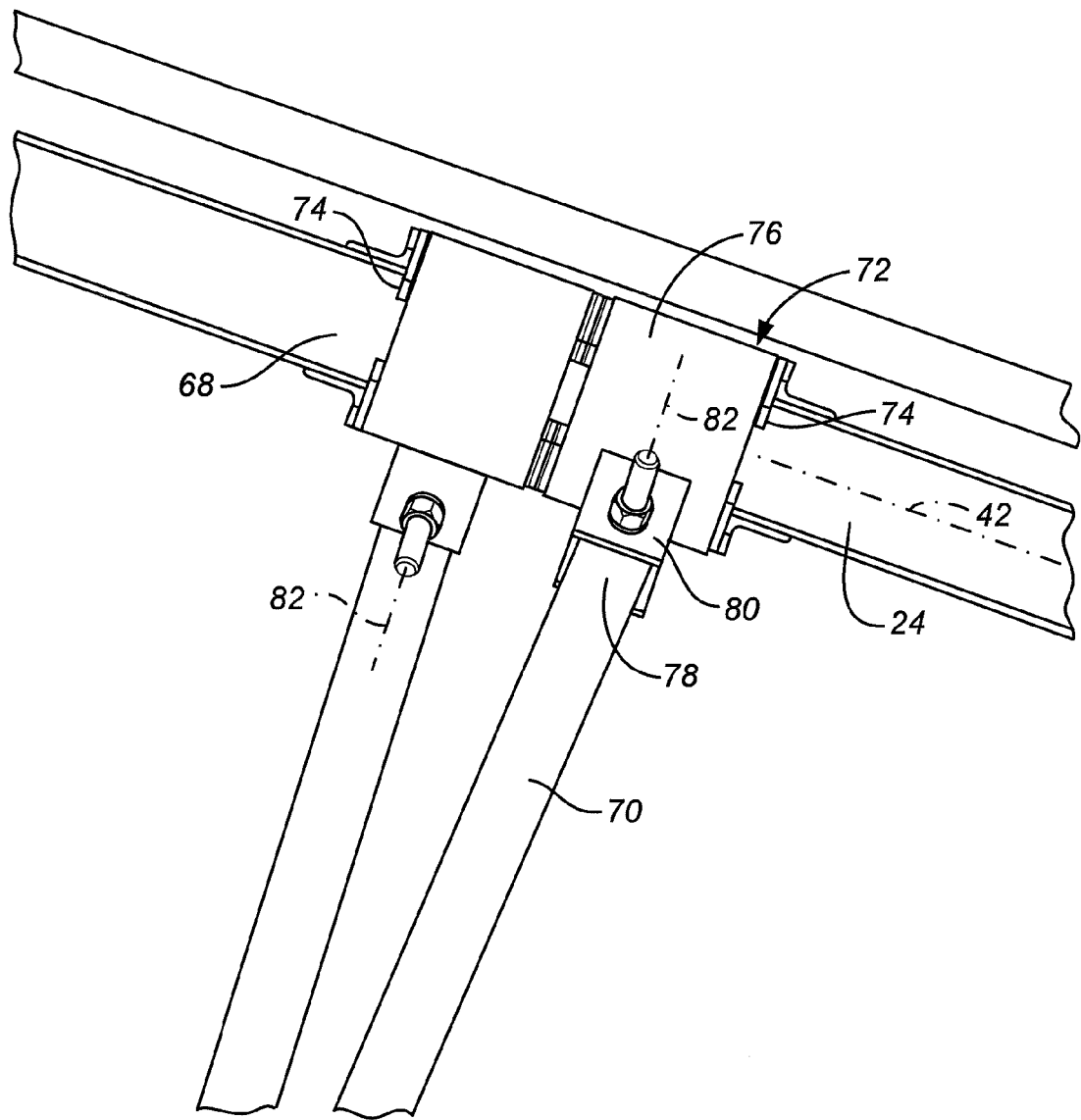
FIGS. 8 and 9 are enlarged side and end views of a portion of the underside of the assembly of FIGS. 1-5 illustrating bearing assemblies securing the upper ends of the support struts to the torque member.
Figure 9:
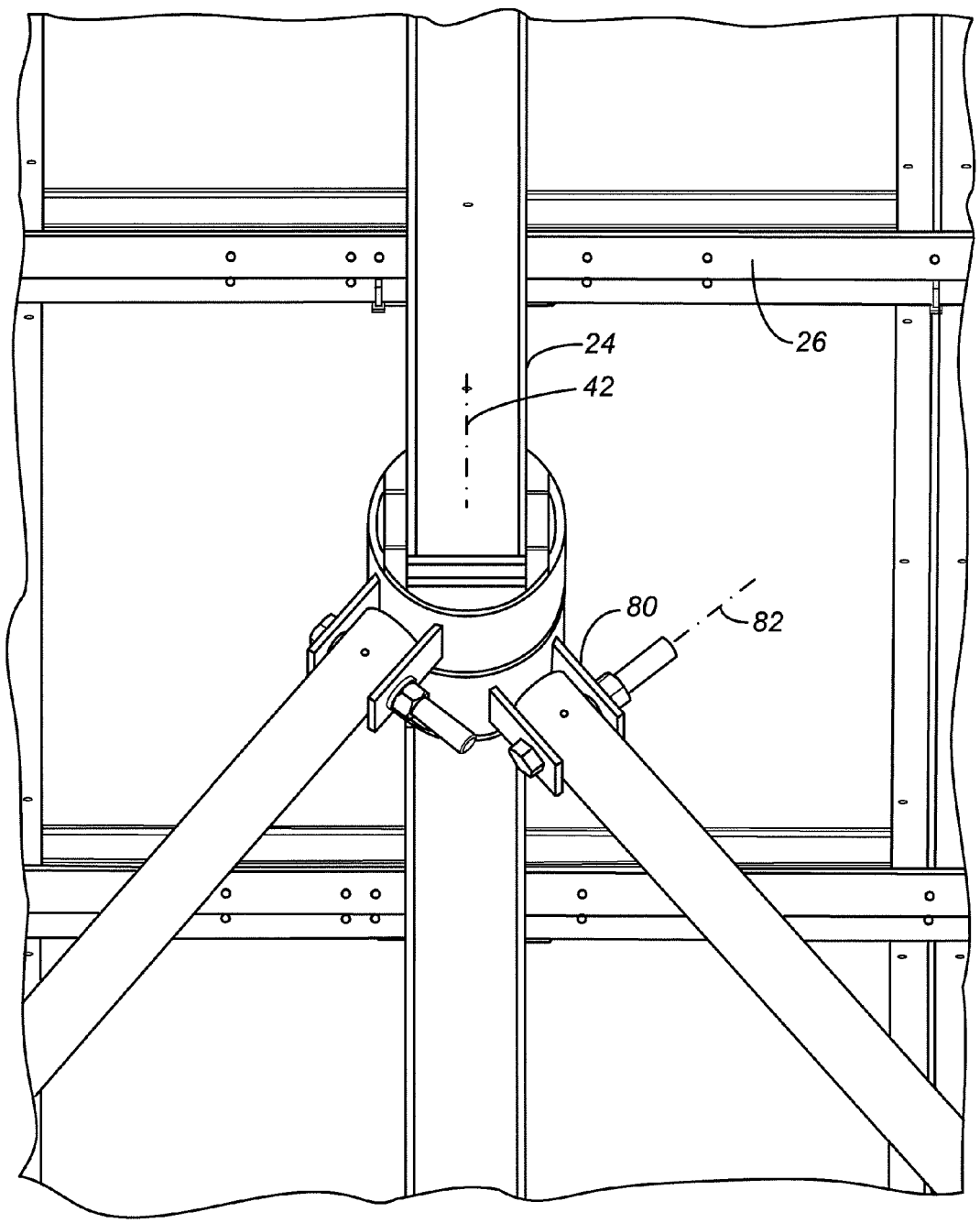

Referring now to FIGS. 1, 8 and 9, north side support 18 includes second surface mounts 66, sometimes referred to as north bases 66, resting on support surface 14. North side support 18 includes a support strut 70 extending from each north base 66 and pivotally secured to north end 68 of torque member 24 by a north bearing assembly 72. As with south side support 16, north bases 66 are anchorless, ballast type bases designed to be sufficiently heavy to secure the north end 68 of torque member 24, and therefore solar collector module assembly 12, against wind and other forces without need to excavate or otherwise anchor the north bases to support surface 14. North base 66 is typically made of concrete.

The required weight for south base 28 and each north base 66 will depend upon various factors including the size and configuration of assembly 12, expected wind speeds, expected wind directions, and tilt angle 32. For example, for solar collector assemblies having a surface area of about 9.3 to 37 square meters (100 to 400 sq. ft.) oriented at a tilt angle 32 (see FIG. 5) of 20°, each north base 66 may have a weight of at least 2270 kg (5000 lbs.) and each south base 28 may have a weight of at least 680 kg (1500 lbs.).

Figure 1A:
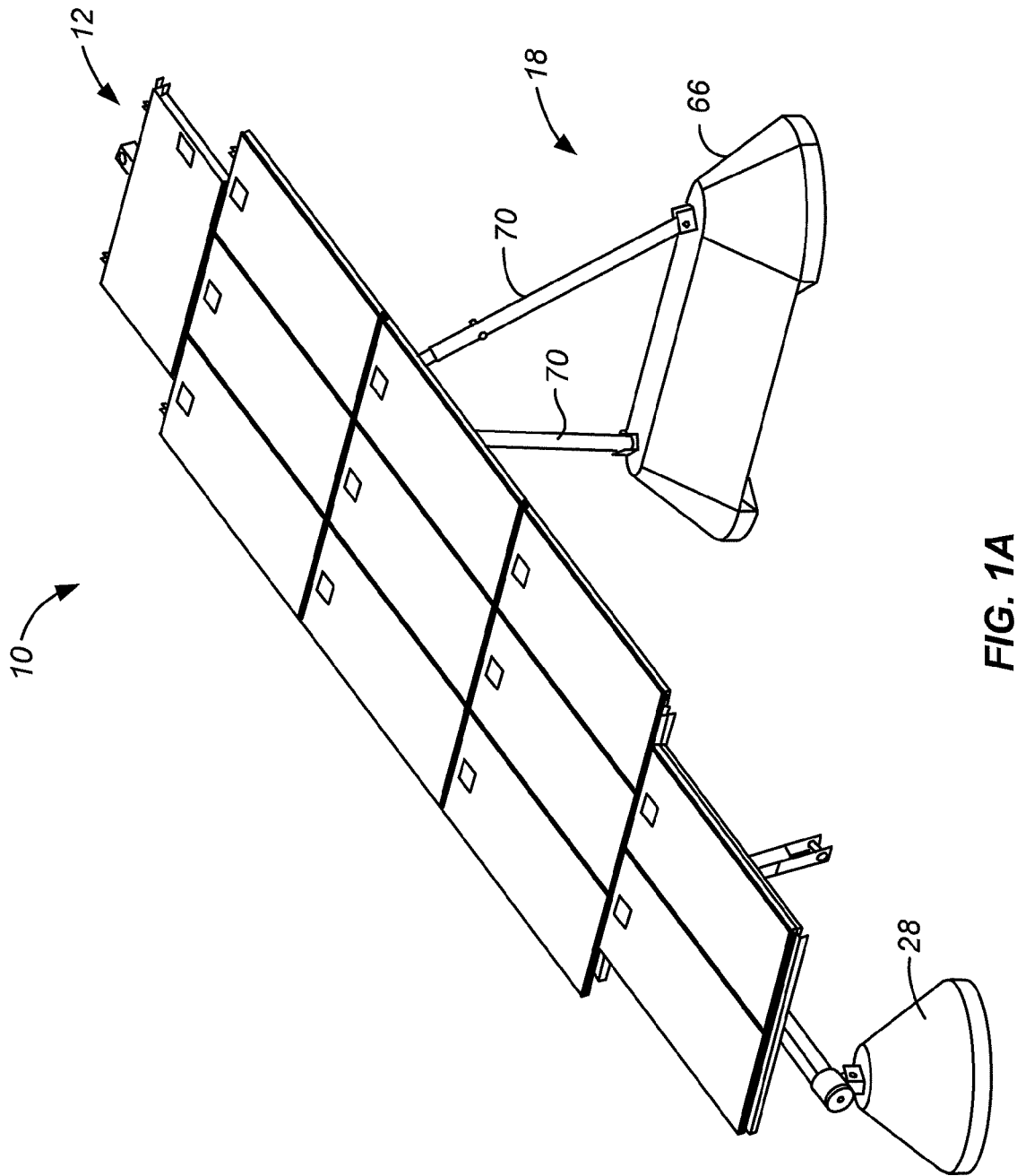
FIG. 1A is a front, right side, top view showing another example of a solar collector assembly.
Figure 2:
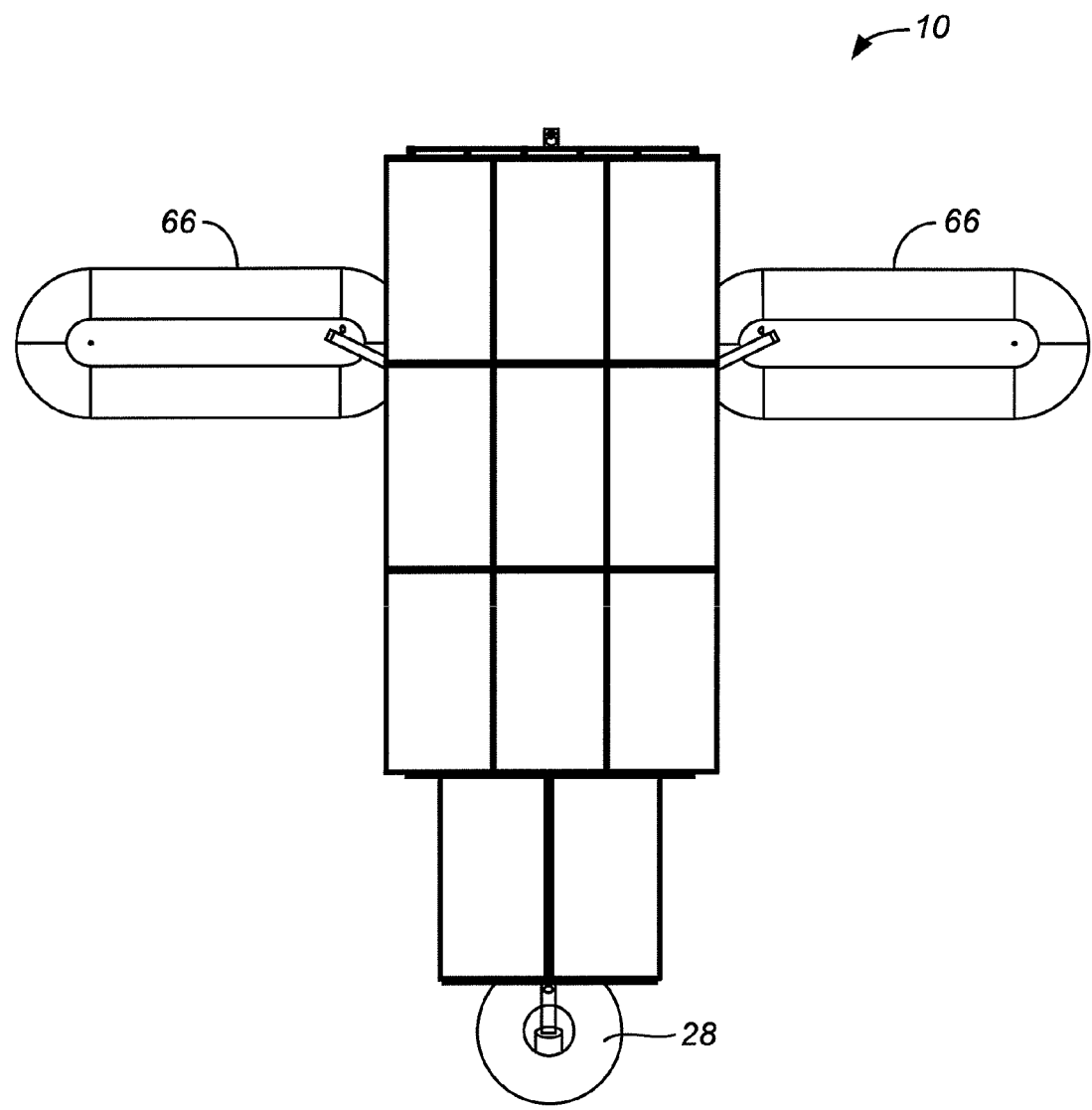
FIGS. 2-5 are top plan, front elevational, rear elevational and left side elevational views of the solar collector assembly of FIG. 1.
Figure 3:
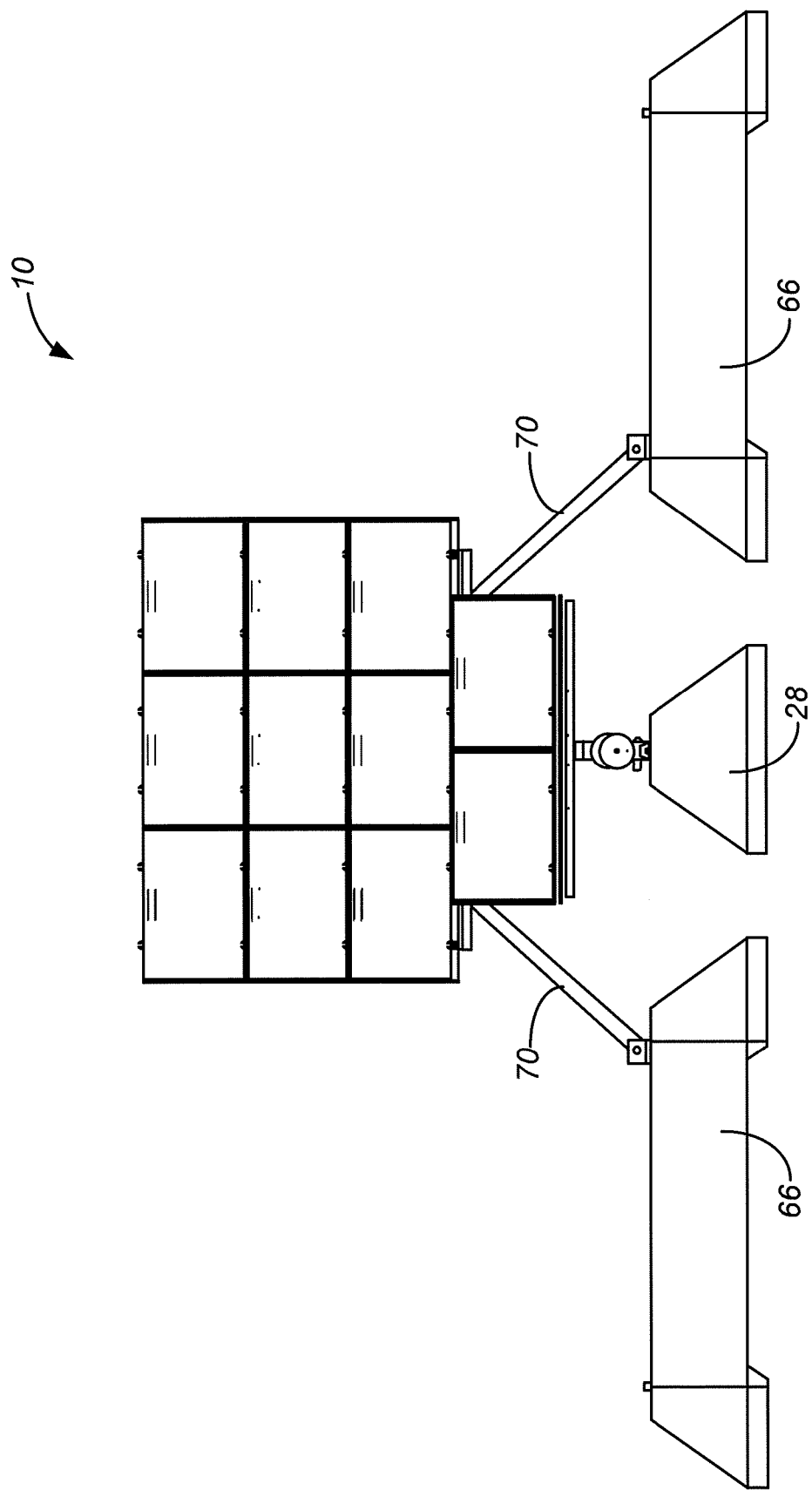
Figure 10:
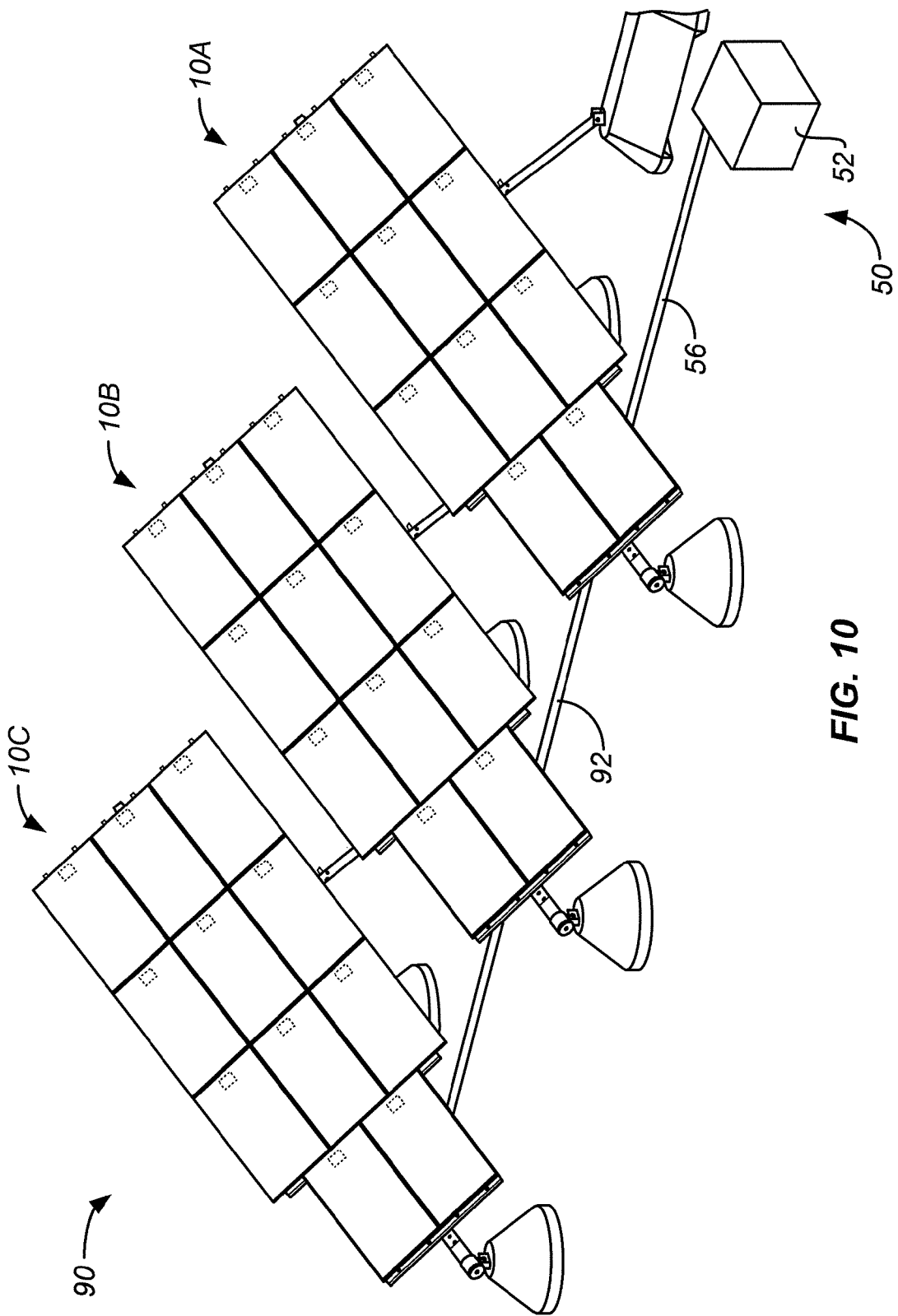
FIG. 10 is a front, right side, top view of one end of a row of the solar collector assemblies of FIG. 1 shown in a morning, generally east-facing orientation.
Figure 11:
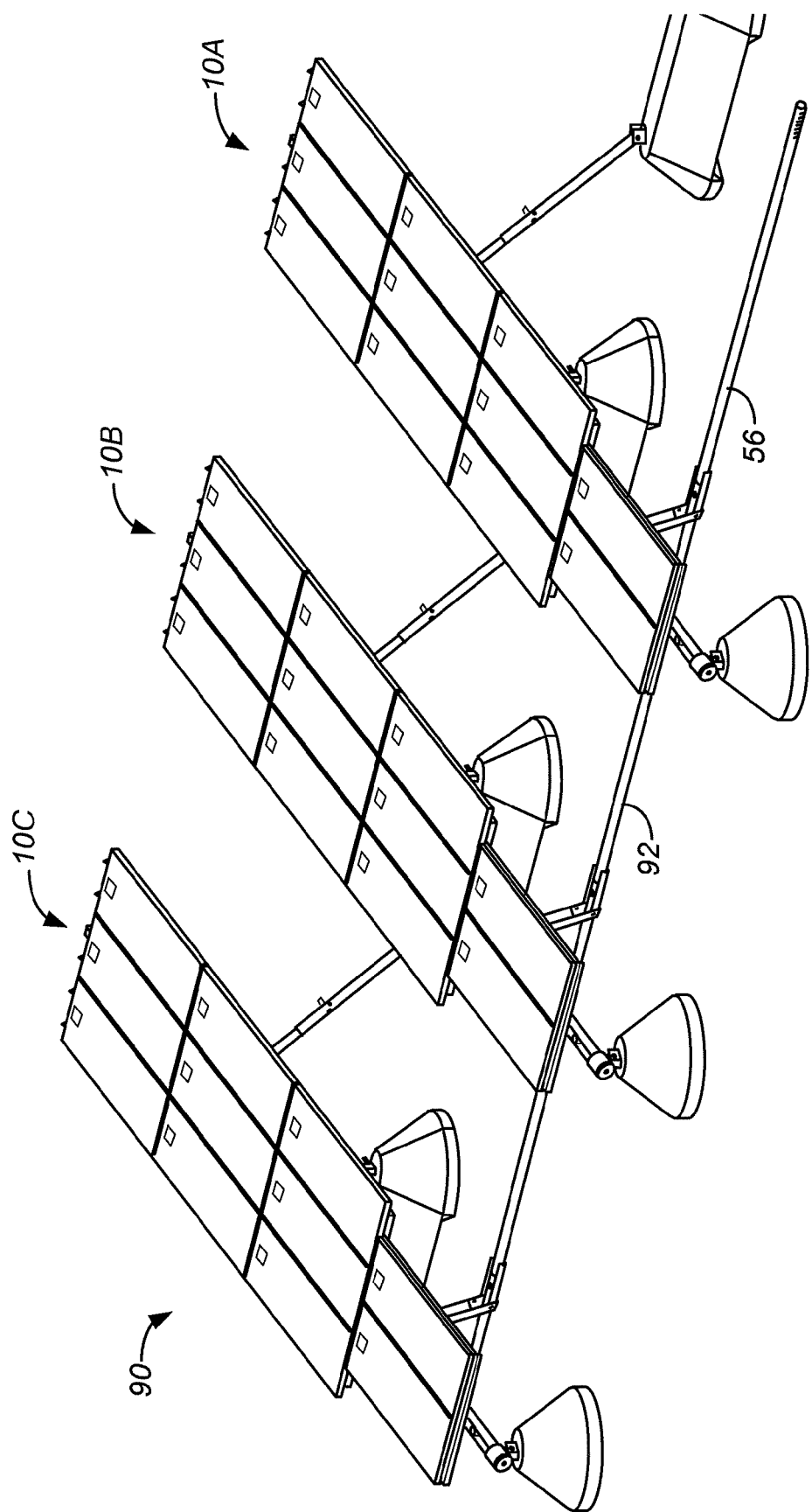
FIG. 11 illustrates the row of solar collector assemblies of FIG. 10 and a noontime orientation.
Figure 12:
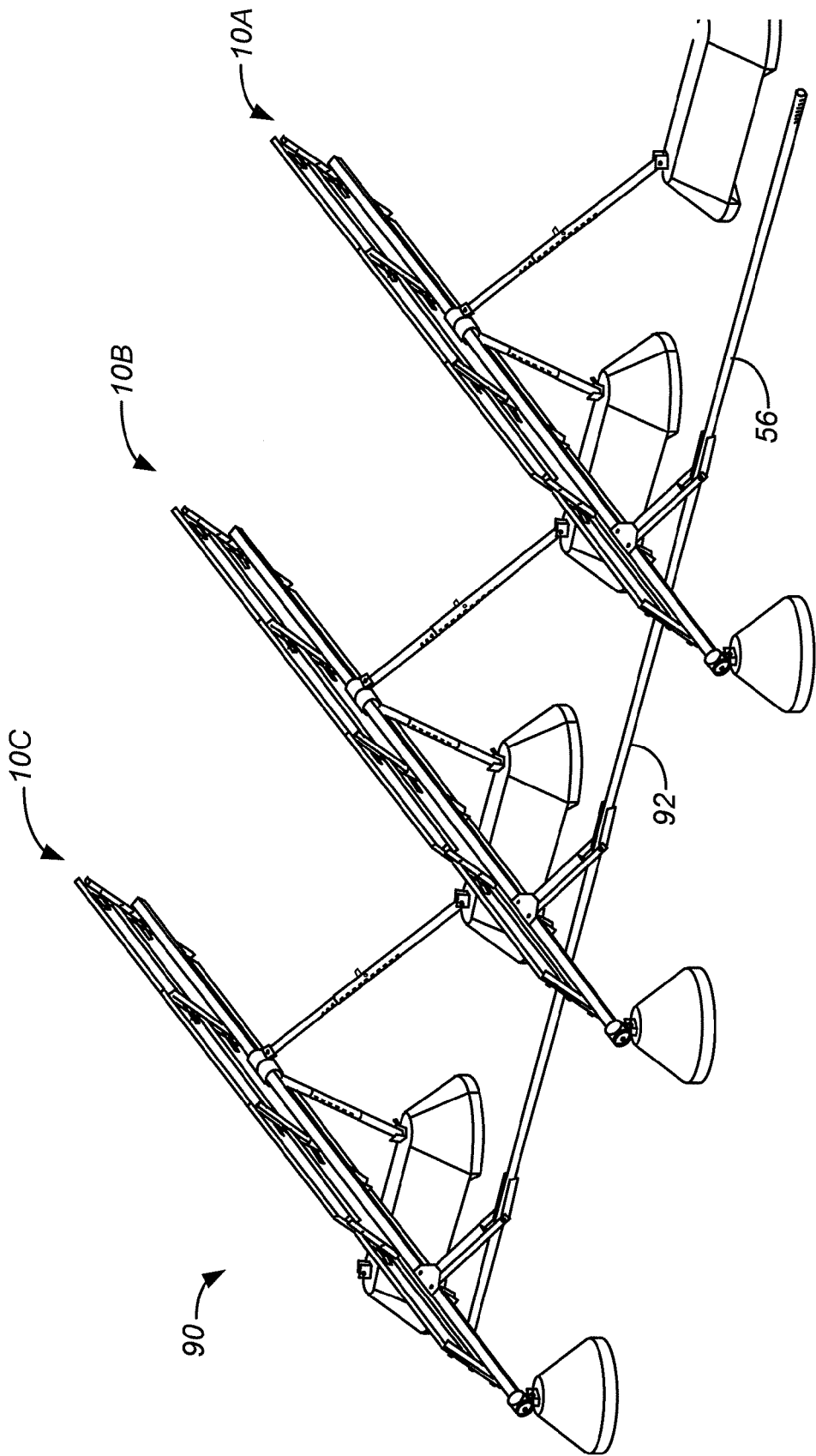
FIG. 12 illustrates the row of solar assemblies of FIG. 10 in evening, generally west-facing orientation.

One of the advantages of north side support 18 is that north base 66 can function as a shared, unitary north base when used between adjacent solar collector assemblies 10 in a row 90 of assemblies 10. In the example of FIGS. 10-12, the north base 66 between assembly 10A and assembly 10B and between assembly 10B and assembly 10C are shared, unitary north bases. This is important because loads, in particular wind loads, on assemblies 10 are not the same and are typically constantly changing. Therefore, loads, in particular lateral loads, exerted on assemblies 10 in the same row 90 can be distributed among the other assemblies in the row through north bases 66. Therefore, the total weight of all of the north bases 66 in row 90 can be less than if north bases were not shared between adjacent solar collector assemblies 10 while making the possibility of overturning solar collector assemblies 10 highly unlikely. In other examples, instead of using north base 66 as a shared base, each north base 66 would be used with a single solar collector module assembly 12; see FIG. 1A. In addition, a combination of the two can be used in a single row 90 with only some of solar collector assemblies 10 sharing a north base 66.

Each north bearing assembly 72 is similar to south bearing assembly 36 and includes an inner bearing member 74 affixed to torque member 24 and an outer bearing member 76 rotatably mounted over inner bearing member 74 so to be free to pivot about tilt axis 42. The upper end of 78 of each support strut 70 is pivotally mounted to outer bearing member 76 by a clevis-type strut mount 80 so that support strut 70 can pivot about a strut mount axis 82. The lower end 84 of support strut 70, see FIG. 4, is pivotally mounted to north base 66 by a north pivot mount 86. North pivot mount 86 is substantially the same as south pivot mount 44 and permits support strut 70 to pivot about a generally horizontal axis corresponding to south pivot axis 46. In addition, north pivot mount 86 can be rotated about a generally vertical axis to aid securing support strut 70 to torque member 24 and north base 66. Support struts 70 are also variable length, telescoping struts. The pivotal connections between support strut 70 and torque member 24, the pivotal connections between support strut 70 and north base 66, and the use of the variable length, telescoping struts 70 enhances the ease of installation of solar collector assembly 10 because exact placement of north bases 66 is not required nor must support surface 14 be extensively graded or otherwise prepared to accept the north bases. The ability to place north and south bases 66, 28 without substantial excavation, that is with only that excavation required to provide a stable support surface for the ballast-type north and south bases, provides a significant cost advantage during installation.

Figure 13:
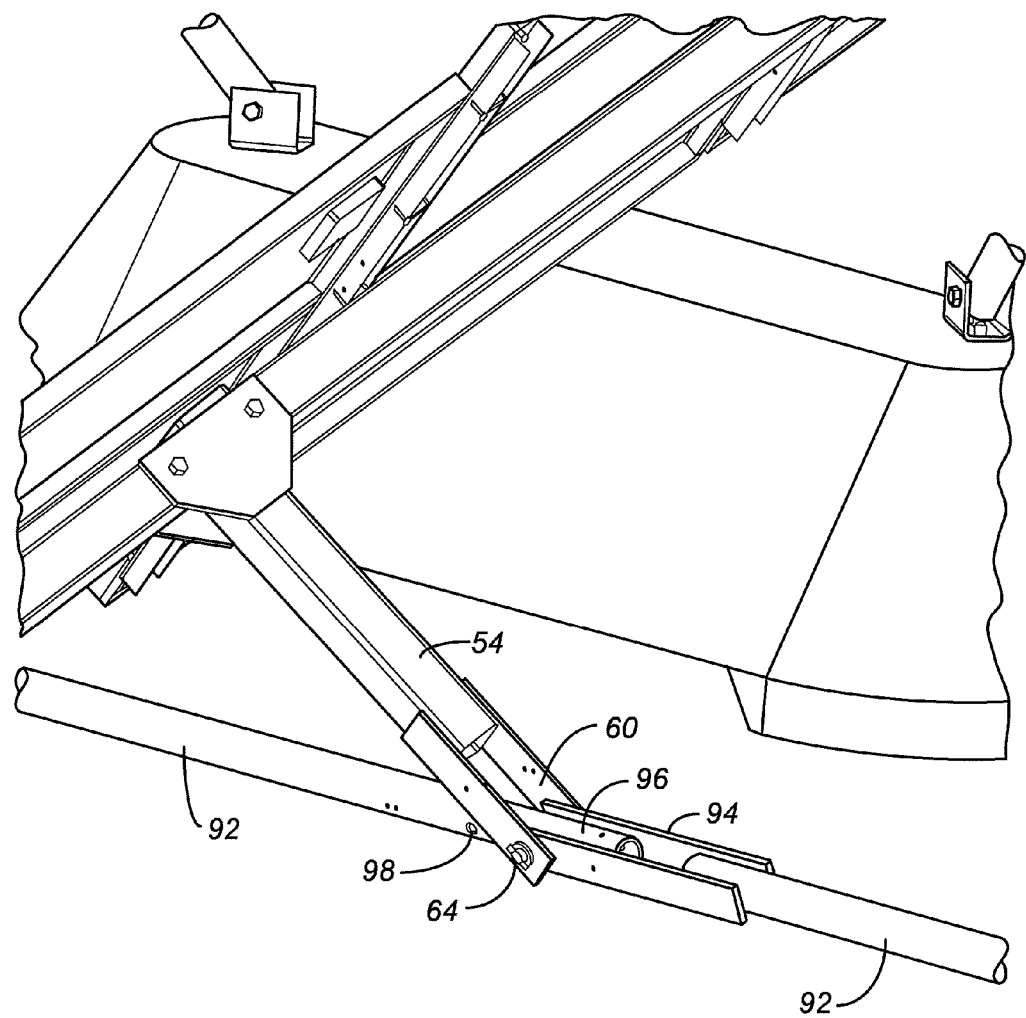
FIG. 13 is an enlarged view of a portion of FIG. 12 showing the pivotal connection of drive element couplers to the outer end of the drive element of the middle solar collector assembly.
Figure 13A:
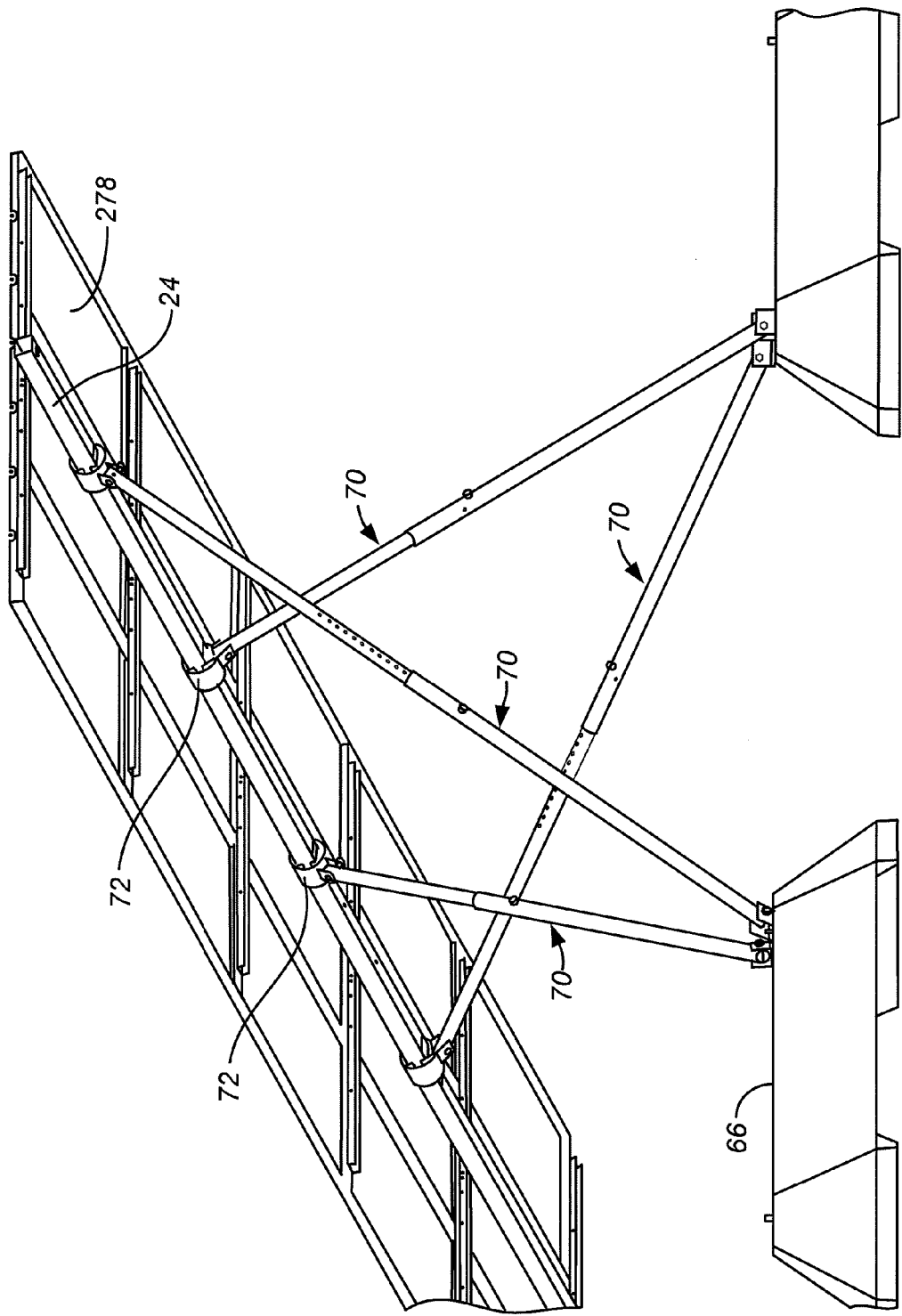
FIG. 13A illustrates an example in which four support struts are used to support the solar collector module assembly.

In some examples multiple support struts 70, four in the example of FIG. 13A, can extend from a single torque member 24 to a north base 66. This arrangement can be especially useful for larger solar collector module assemblies 12 that may be heavier and may exert larger wind loads on support struts 70. Bearing assemblies 72 are shown spaced apart from one another in the example of FIG. 13A. Some or all of bearing assemblies 72 may be adjacent to one another or spaced apart from one another whether two support struts 70 or three or more support struts 70 extend from a single torque member 24.

Figure 7:
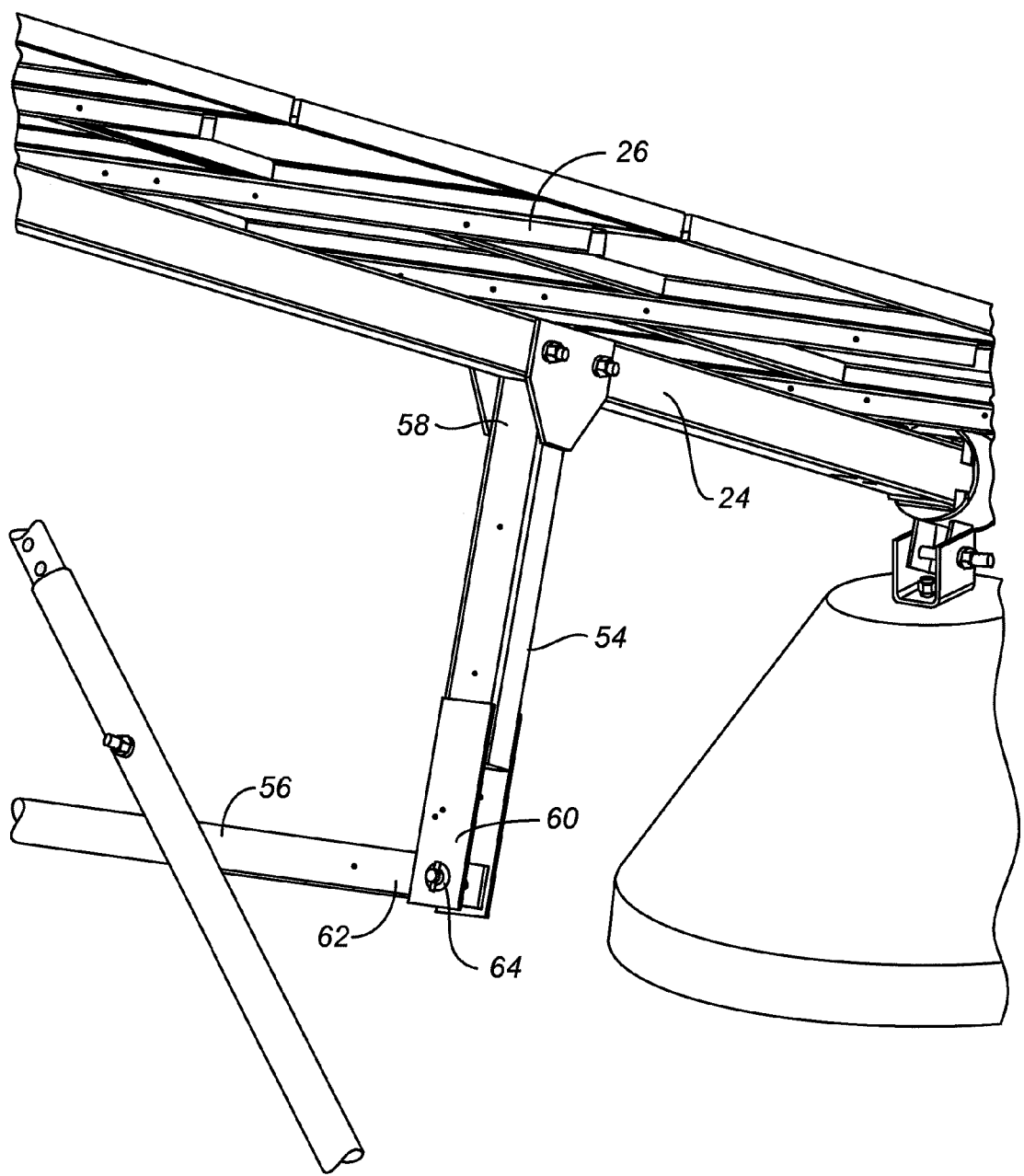
FIG. 7 is an enlarged view of a portion of the underside of the assembly of FIGS. 1-5 illustrating the distal end of the drive rod pivotally connected to the outer end of the drive element, the inner end of the drive element secured to the torque member.
Figure 7A:
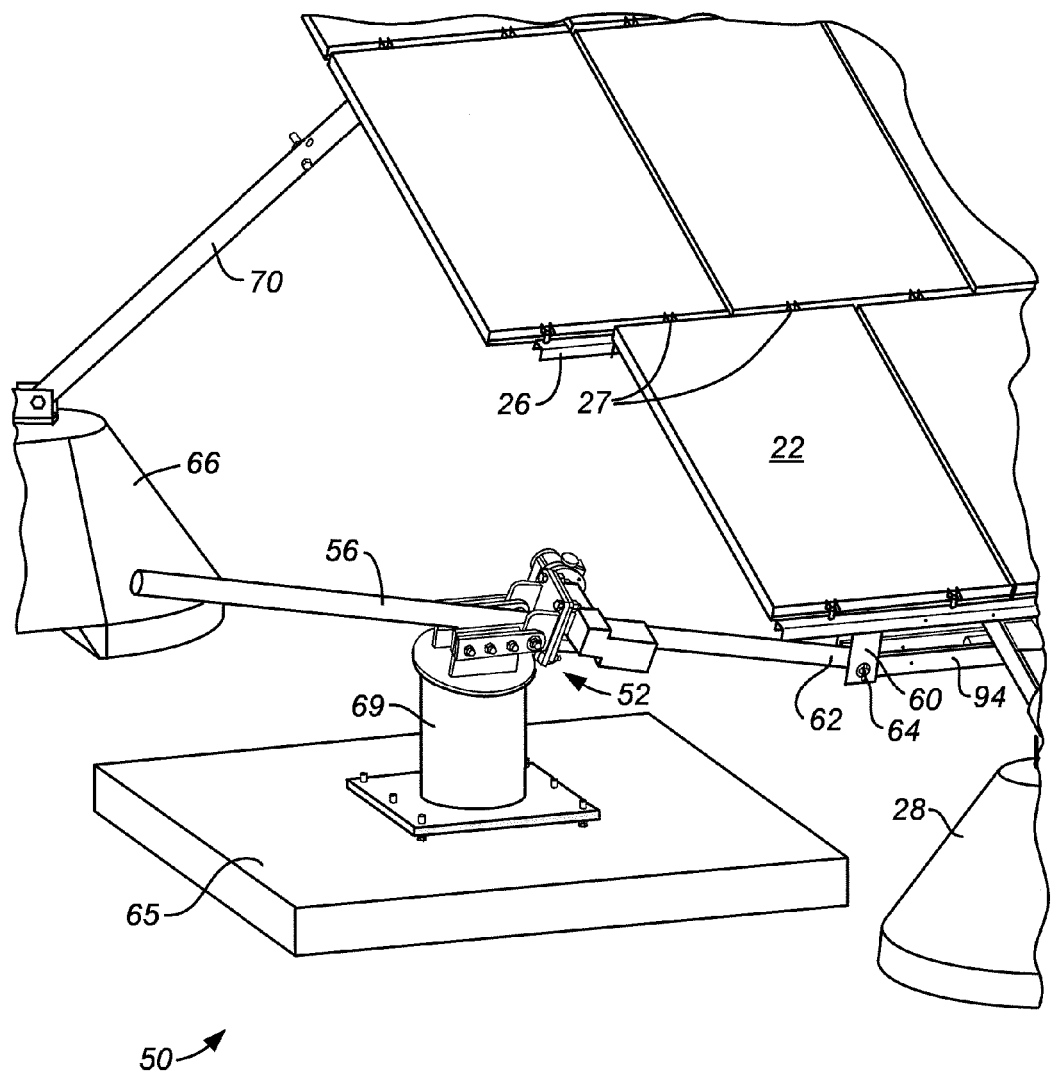
FIG. 7A is an enlarged view of a portion of FIG. 1 showing the driver.
Figure 7B:
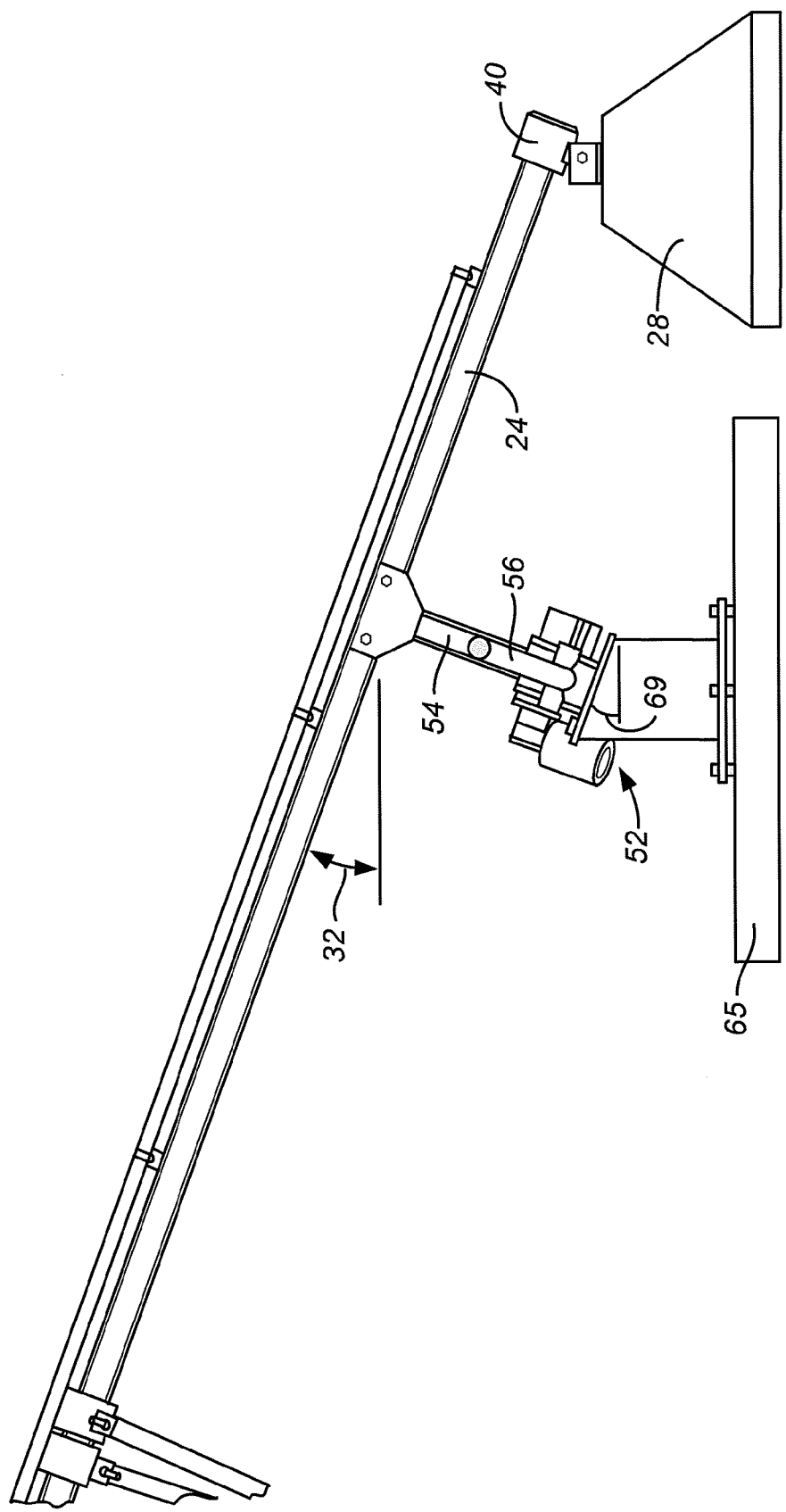
FIG. 7B is a partial left side elevational view of the structure of FIG. 1 showing the angular orientation of the driver.

Referring now to FIG. 1, solar collector module assembly 12 is pivoted about tilt axis 42, thus allowing the assembly to follow the movement of the sun during the day, by a tilt assembly. FIGS. 7, 7A and 7B show one example of a tilt assembly 50 while FIGS. 27, 28 and 29 show another, and presently preferred, example of a tilt assembly 400.

Tilt assembly 50 includes a driver 52 connected by a drive rod 56 to a torque arm type of drive element 54 extending from torque member 24. The inner end 58 of drive element 54 is secured to torque member 24 and extends from the torque member generally perpendicular to a plane defined by solar collector modules 22. Drive element 54 includes a clevis-type outer end 60 which receives the clevis-type distal end 62 of drive rod 56 with ends 60, 62 pivotally secured to one another by a pivot element 64, typically a round pin secured by two roll pins. Driver 52 causes drive rod 56 to move in a generally linear, generally horizontal fashion; this movement causes outer end 60 of drive element 54 to rotate about tilt axis 42 thus allowing solar collector modules 22 to generally follow the sun.

Driver 52 is mounted to a footing or foundation 65 which, like south base 28 and north base 66, is typically concrete and is heavy enough not to require burying within the ground. As shown in FIG. 7B, driver 52 is oriented at an angle 69 equal to tilt angle 32 to best accommodate the motion of outer end 60 of drive element 54. Therefore, it is typically desired that foundation 65 be generally horizontal. However, the need for foundation 65 to be generally horizontal can be eliminated by constructing tilt assembly 50 in a manner to eliminate this requirement. For example, the angular orientation between driver 52 and foundation 65 can be made to be adjustable.

Figure 27:
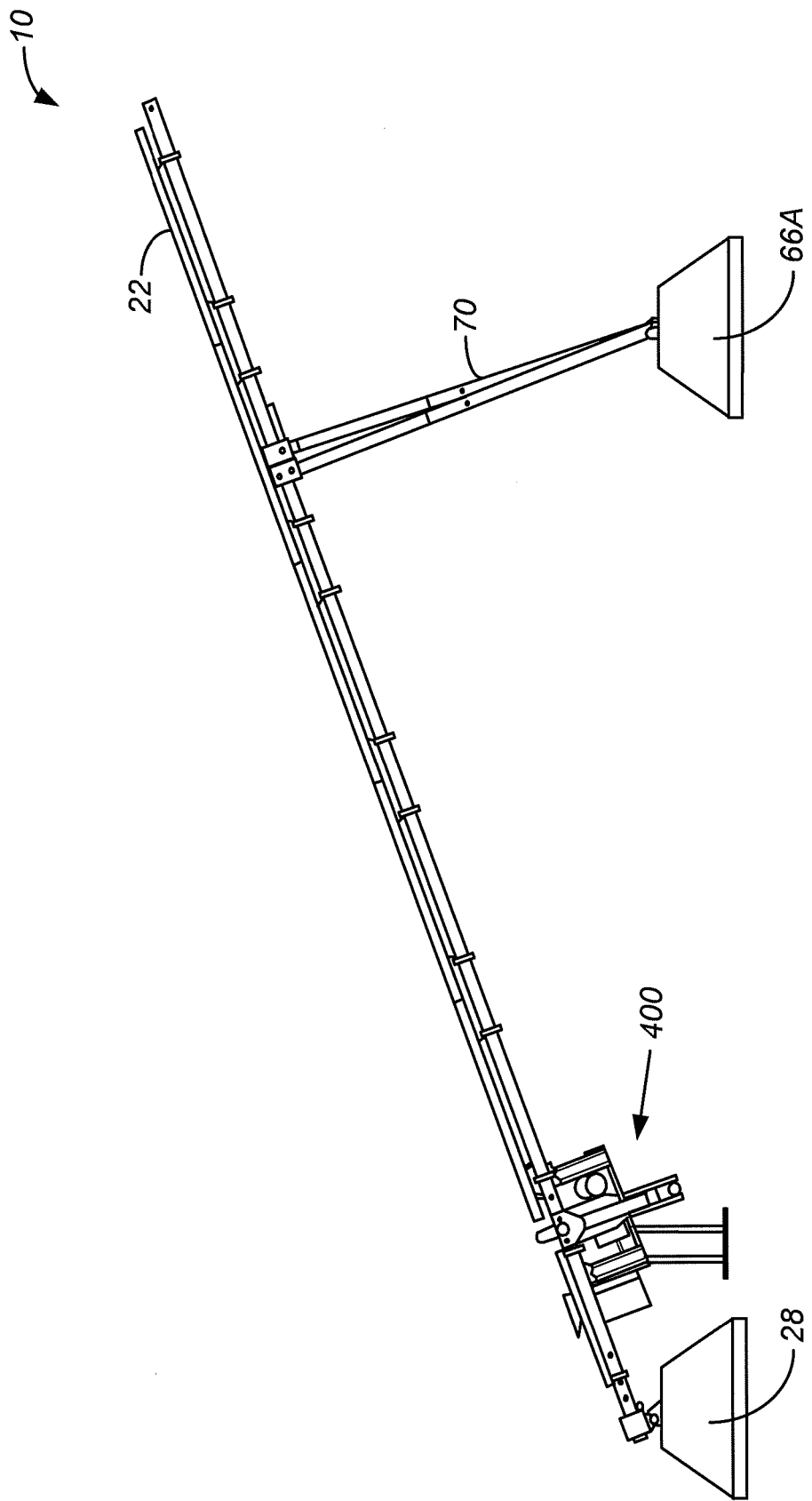
Figure 28:
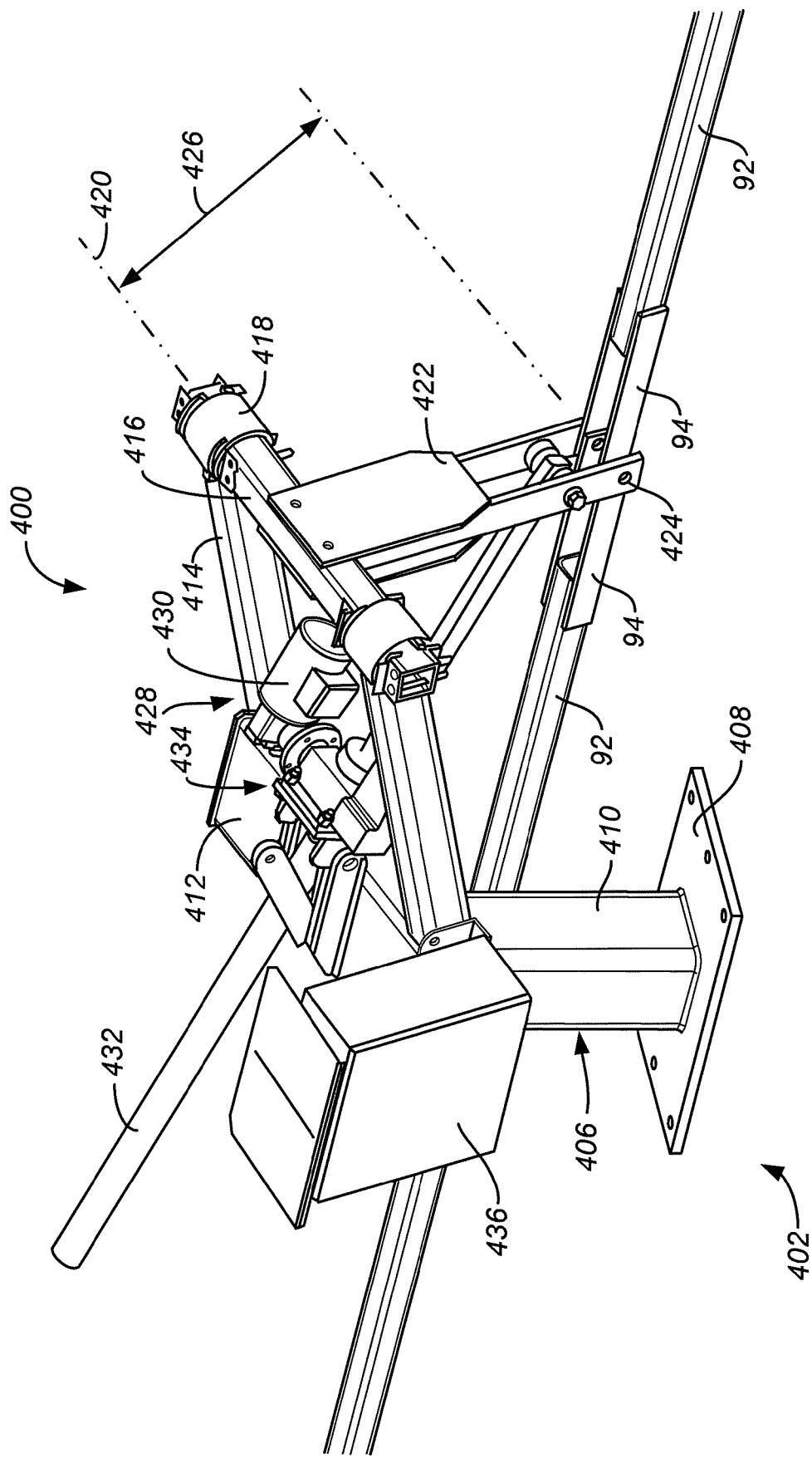
FIG. 28 is an enlarged overall view of a tilt assembly for use with the embodiments of FIGS. 23-27.
Figure 29:
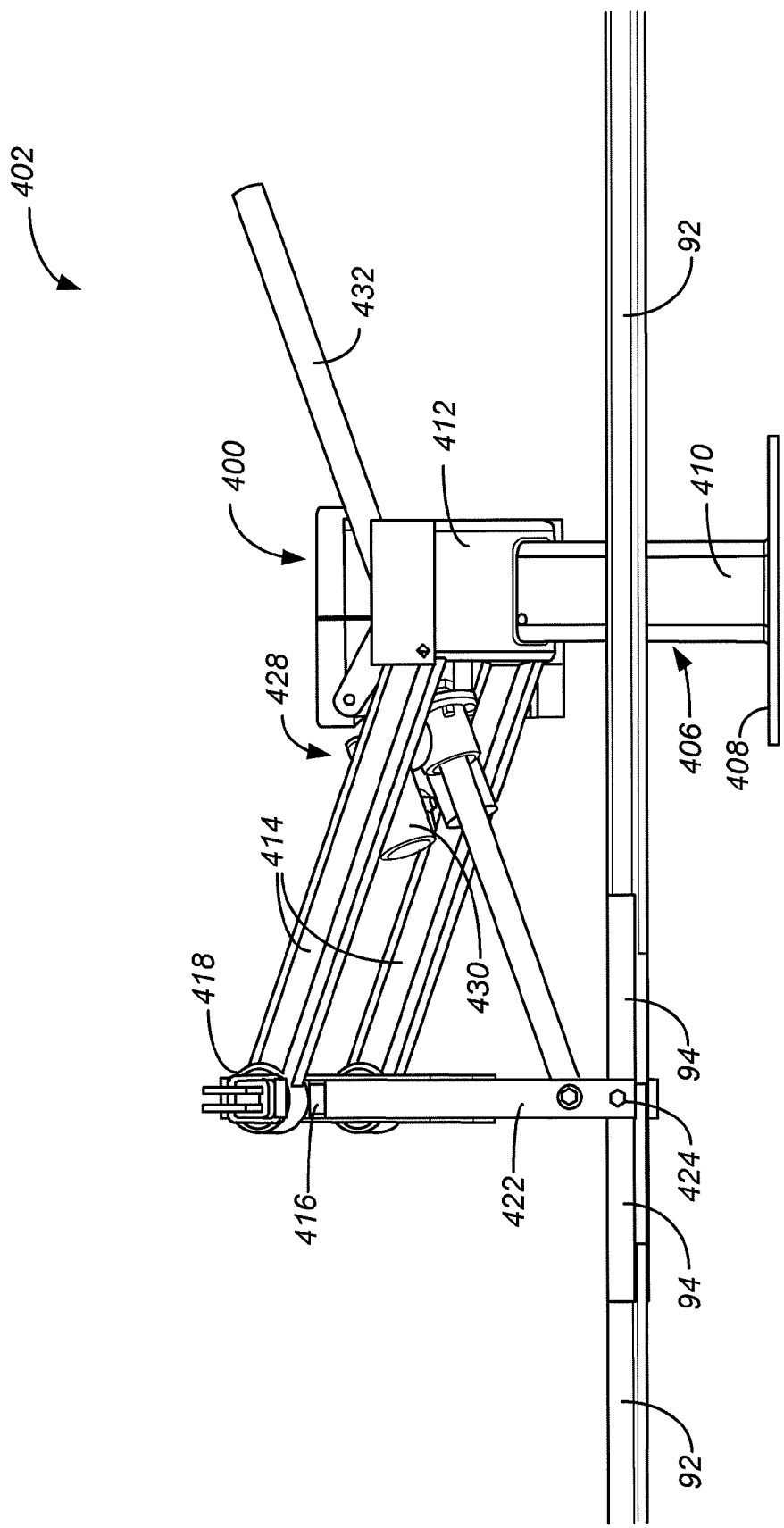
FIG. 29 is a rear elevational view of the tilt assembly of FIG. 28.

FIGS. 27, 28 and 29 illustrate a tilt assembly 402 comprising a driver 400 and drive element couplers 92. Driver 400 is connected to and drives drive element couplers 92. Drive element couplers 92 extend to drive elements 54, see FIG. 13, of the solar collector assembly 10 on either side of tilt assembly 402. Driver 400 includes a drive frame 406 including a base 408 adapted to be secured an appropriate foundation or other support, not shown. The foundation could be an above-ground structure or a fully or partially buried structure. For example, base 408 could be bolted, welded or otherwise secured to a large, heavy steel plate with, or without, rods or spikes driven into the earth. Other examples for the foundation include a screw-in foundation, a vibration or pressure (or both) driven tube or tubes, and a ballasted vessel filled with (typically local) soil or gravel.

Drive frame 406 also includes a generally vertical post 410 and a transversely extending member 412 extending from the upper end of post 410 to create a generally L-shaped structure. Member 412 extends upwardly and outwardly at an angle to the horizontal generally equal to the inclination of tilt axis 42. A pair of support arms 414 extend from either end of member 412. A drive arm support 416 is mounted to the distal ends of support arms 414 by bearings 418. This permits drive arm support 416 to rotate about a drive arm axis 420. Drive arm axis 420 is arranged to be generally parallel to and generally laterally aligned with pivot axes 42 of the solar collector assemblies 10 on either side of tilt assembly 402.

Driver 400 also includes a drive arm 422 extending from drive arm support 416 and connected to the clevis-type ends 94 of drive element couplers 92 at a drive position 424. The distance from drive position 424 to drive arm support axis 420 is termed second distance 426. Second distance 426 is equal to a first distance measured between pivot element 64 and tilt axis 42 passing through the center of torque member 24; see FIGS. 7 and 13.

Driver 400 also includes a drive arm driver 428 including a motor 430 connected to a drive rod 432 by a gear arrangement 434. The gear arrangement 434 typically uses a worm gear reduction to a screw jack; however drive rod 432 can also be driven by a hydraulic pump and jack or other actuation devices. The configuration of tilt assembly 402, and especially drive frame 406, permits drive element couplers 92 to freely pass beneath a portion of the drive frame. Drive frame 406 accomplishes this in a cantilevered fashion using a single post 410; however, drive frame 406 could be otherwise configured, such as with a post 406 on both sides of drive element couplers 92, to provide this feature. Driver 400 also includes an enclosure 436 containing an electronic controller used to control the actuation of motor 430 throughout the day.

Tilt assembly 402 provides several advantages over tilt assembly 50. When using tilt assembly 50, certain forces, specifically non-horizontal forces acting on the solar collector module assemblies 12, are exerted by drive elements 54 on torque members 24 of solar collector assemblies 10 and increase towards the end of the row away from tilt assembly 50. Constructing driver 400 so that the working length of drive arm 422, that is second distance 426, is the same as the working length of drive element 54, and arranging the location and orientation of drive arm support axis 420 to be aligned with tilt axes 42, causes drive arm 422 to go through the same motions as drive elements 54. Drive arm 422 thus minimizes the movement of drive element 54; this effectively eliminates this transfer of an increasing force from one solar assembly 10 to the adjacent solar assembly 10 when the solar assemblies and are all in line. Placing driver 400 midway along row 90 of solar collector assemblies 10, which is a known technique, allows a single driver 400 to drive twice the number of solar collector assemblies 10 while using the same strength drive element couplers 92 as the drive element coupler 92 needed adjacent to drive rod 52 of the embodiment of FIG. 1. Placing driver 400 midway along row 90 of solar collector assemblies 10 also increases the number of solar collector assemblies 10 that can be driven by a single driver when the number of solar collector assemblies 10 that can be driven by a single driver is limited by the effects of thermal expansion.

The operation of drivers 52, 400 can be preprogrammed and adjusted to the particular location of the solar site. The location can be determined using, for example, information from a GPS device. Also, the operation of drivers 52, 400 can be controlled remotely as a matter of course. One benefit of remotely controlling all the solar collector assemblies 10 from a central electronic controller is a reduction in the cost of the entire installation by not needing a fully functional electronic controller at every solar collector assembly 10, just a simplified controller at each assembly 10 and a fully functional central electronic controller. Another benefit would be that the operator would not need to physically go from assembly 10 to assembly 10 to do any sort of maintenance on the electronic controllers associated with each assembly 10, which can prove to be very time consuming at large sites. Also, the user would not need to enter site parameters for every row; rather, it would be accomplished at the central electronic controller. Solar collector assemblies 10 are designed to be strong enough so as not to need to be tilted to a safe tilt angle (stowed) during high winds conditions. However, using a central electronic controller would facilitate stowing solar collector assemblies 10 during wind events.

FIG. 10 shows a row 90 of solar collector assemblies 10A, 10B, 10C shown in a morning, generally east-facing orientation while FIGS. 11 and 12 illustrate row 90 in noon time and evening, generally west-facing orientations. Tilt assembly 50 includes driver 52 and drive rod 56 as is shown in FIG. 1. In addition, tilt assembly 50 includes drive element couplers 92 coupling the outer ends 60 of drive elements 54 of assemblies 10A, 10B and of assemblies 10B, 10C. FIG. 13 is an enlarged view of a portion of assembly 10B of FIG. 12 illustrating the pivotal connections between drive element couplers 92 and outer end 60 of drive element 54. Drive element couplers 92 are similar to drive rod 56 having one clevis-type end 94 and a plain, cylindrical end 96 sized to fit within the clevis type end 94. Cylindrical end 96 has a number of holes 98 to permit the effective length of couplers 92 to be changed. Other techniques for changing the length of couplers 92 may also be used. The use of the pivotal connections at outer ends 60 of drive elements 54 makes the alignment of assemblies 10 in a row 90 of assemblies much less critical. This helps to permit rows 90 of assemblies 10 to be used on uneven, undulating or other support surfaces 14 that are not flat without the need for extensive, and expensive, site preparation.

A further example of a row 90 of solar collector assemblies 10 is illustrated in FIGS. 23, 23A and 25-27. Some of the differences between the example of FIG. 23 and that shown in FIGS. 1 and 11 include the use of a different arrangement for solar collector modules 22 and the use of a tilt assembly 402 midway along the row 90 instead of a tilt assembly 50 at the end of the row as shown in FIG. 1. The construction of, and advantages accruing through the use of, tilt assembly 402 has been discussed above with reference to FIGS. 27, 28 and 29.

Figure 23:
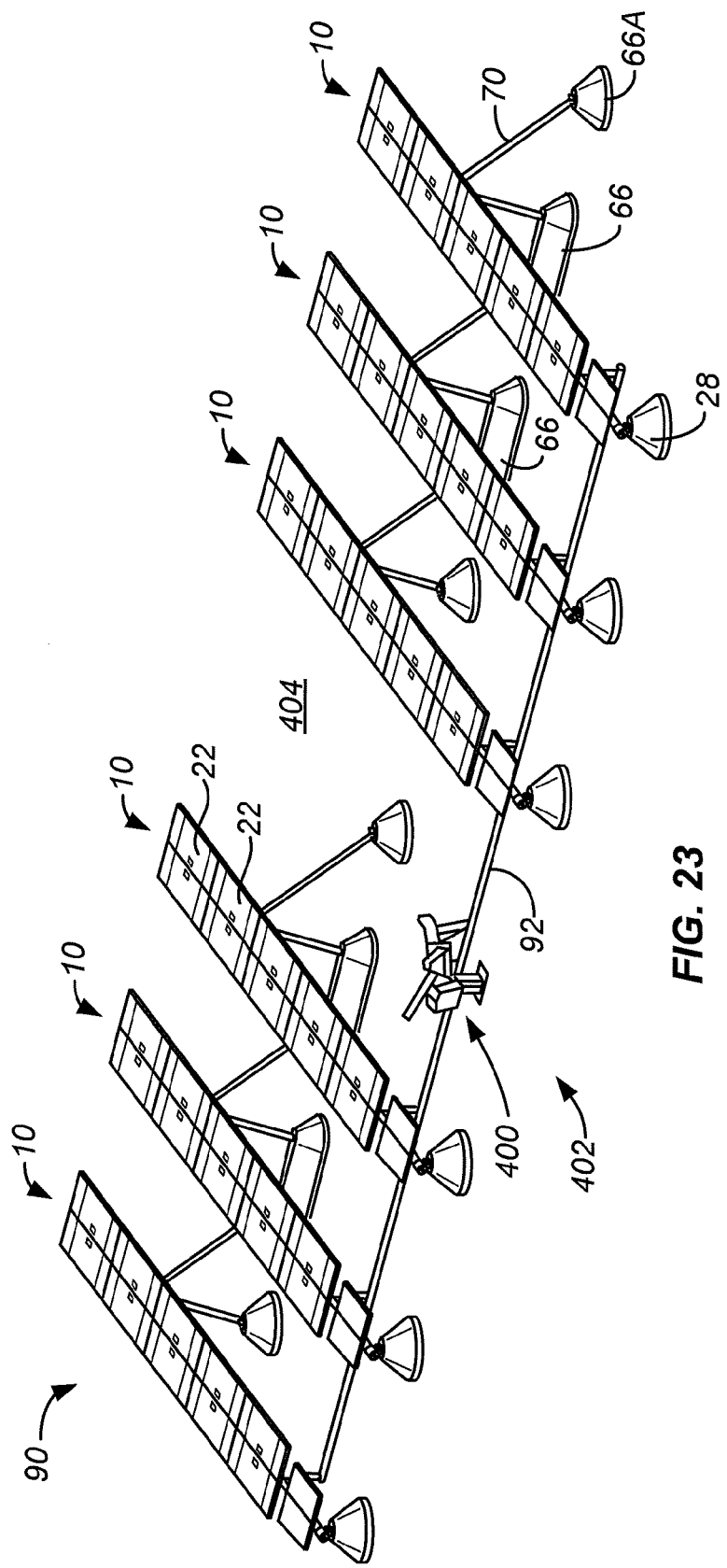
FIGS. 23 and 23A are overall views showing a further example of a row of solar collector assemblies.

Solar collector assemblies 10 in FIG. 23 are considered to be a single row 90; however, assemblies 10 may also be considered to create two rows of solar collector assemblies positioned along generally the same East-West path or line. Although three solar collector assemblies are shown one each side of tilt assembly 402 in row 90, in practice many more solar collector assemblies will typically constitute a single row 90. Another difference between row 90 of FIG. 23 and row 90 of FIG. 11 is the use of north bases 66 between adjacent solar collector assemblies 10 but the use of smaller north bases 66A, similar to south bases 28, at the ends of the rows and located in the gap 404 between assemblies 10 on either side of driver 400. It has been found that it is typically not necessary to use the larger north bases 66 when only a single support strut 70 is connected to the north base.

Figure 23A:
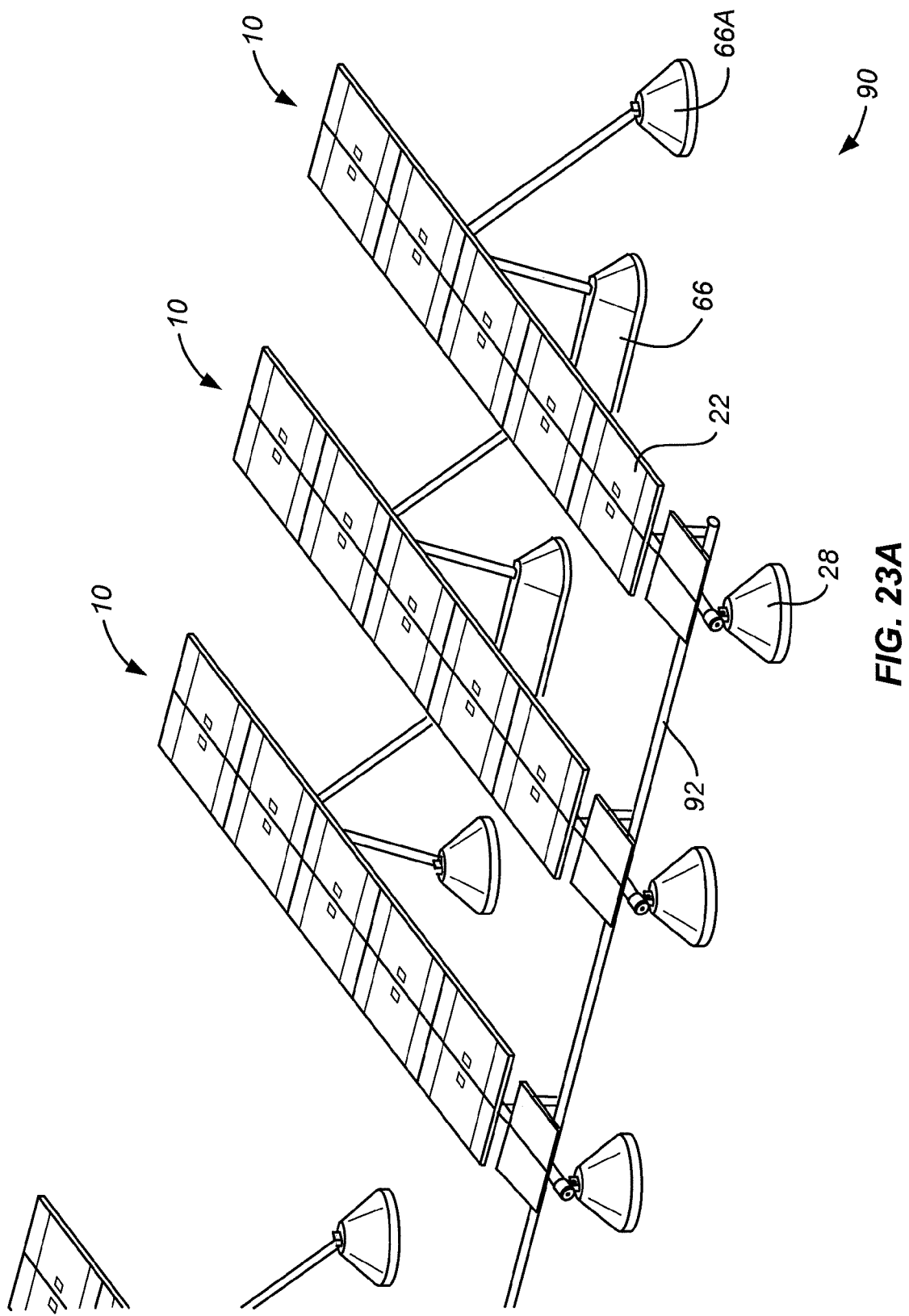
Figure 24:
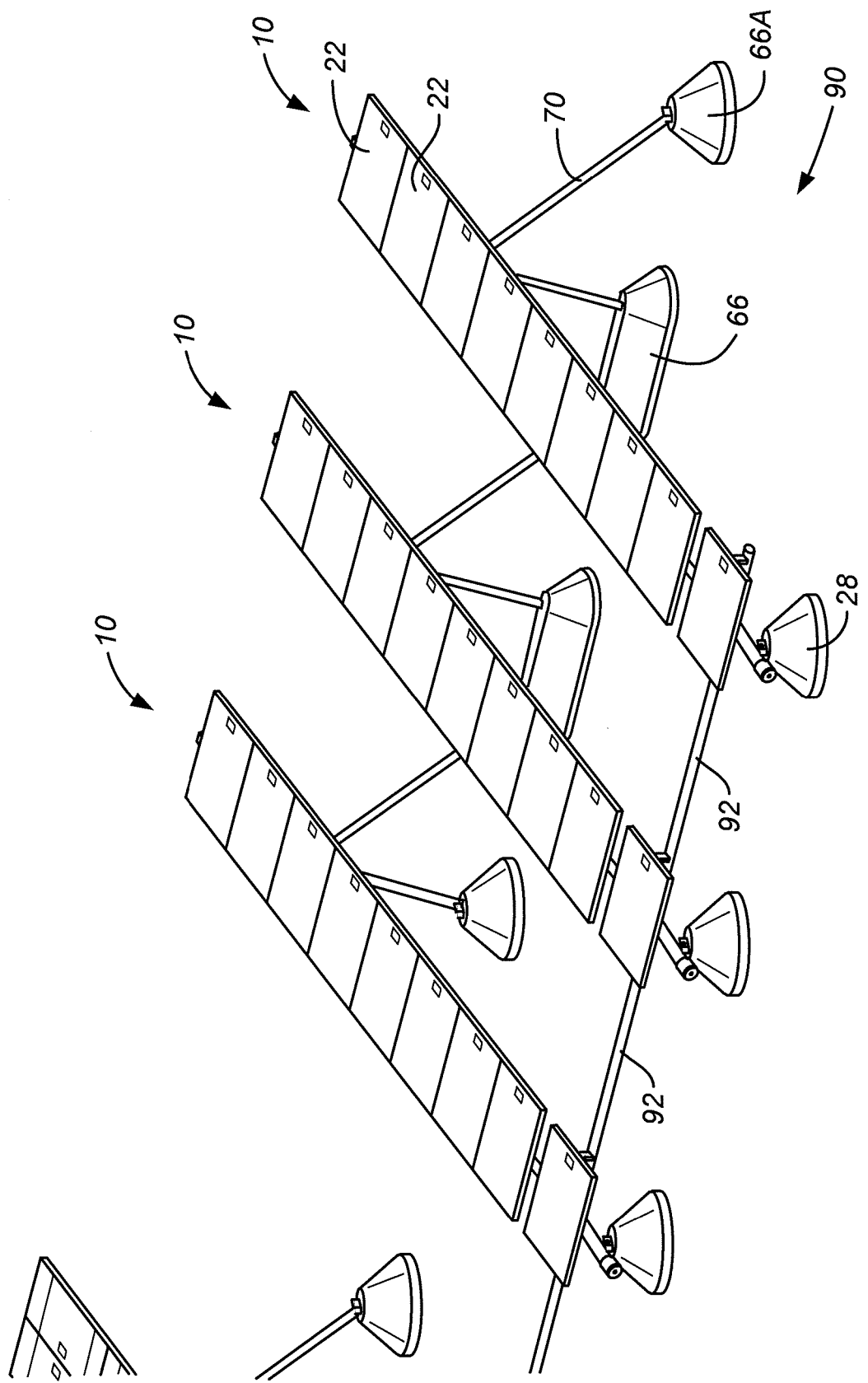
FIG. 24 is a view similar to that of FIG. 23A showing a still further example of a row of solar collector assembly.
Figure 25:
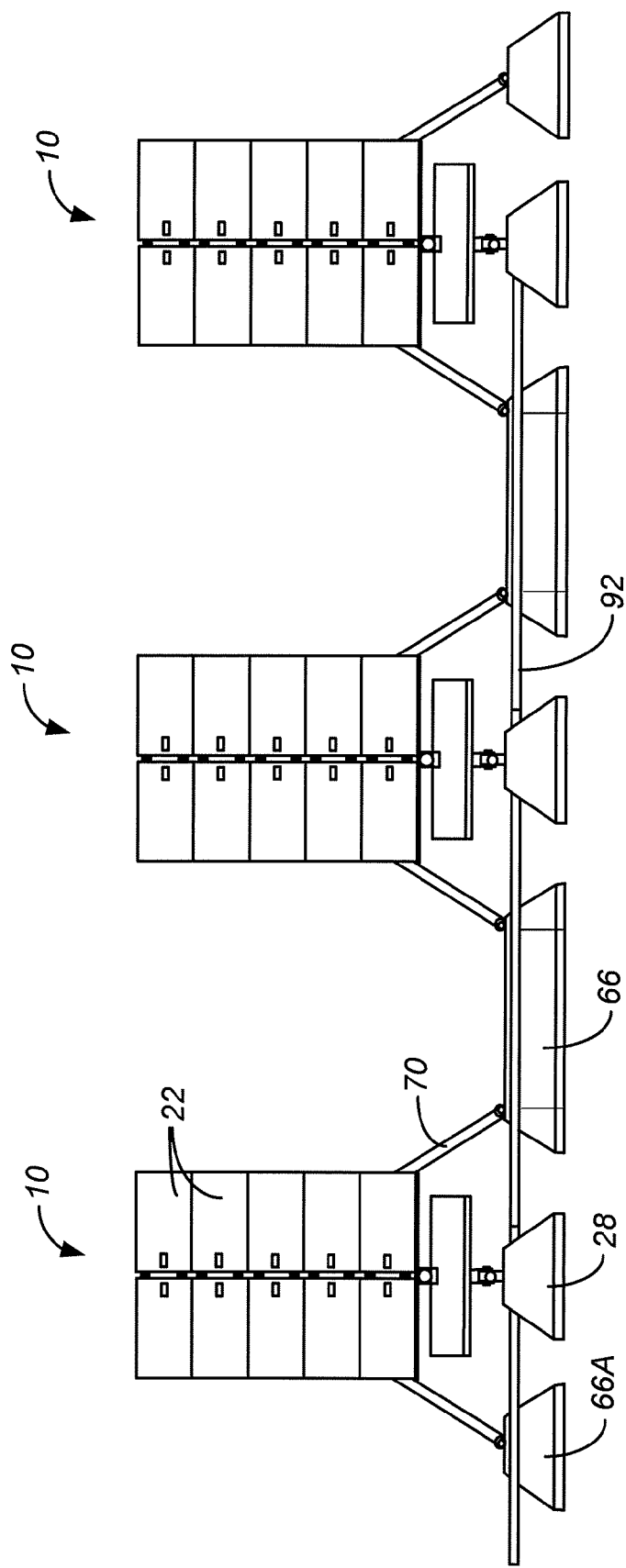
FIG. 25-27 are front elevational, rear elevational and side elevational views of the row of solar collector assemblies shown in FIG. 23A.
Figure 26:
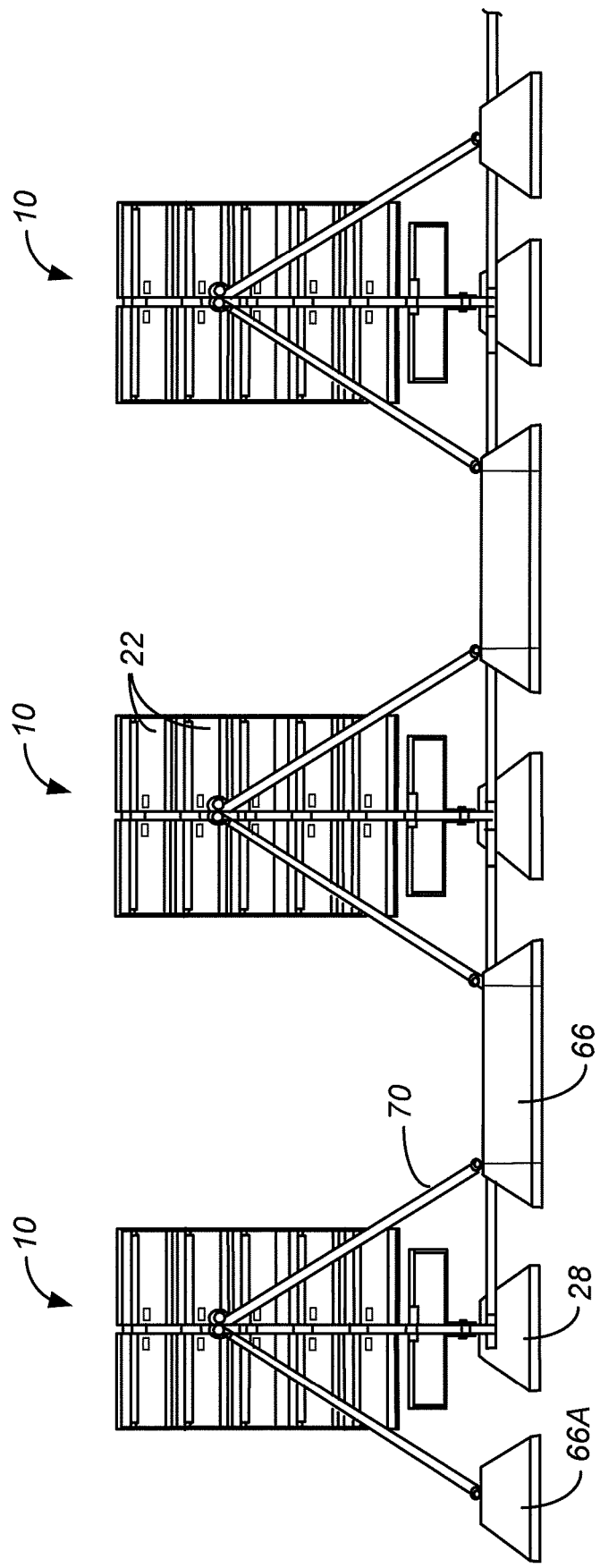

FIG. 24 is a view of an example of a row 90 of solar collector assemblies 10 similar to that of FIG. 23A but having a somewhat different pattern of solar collector modules 22. The particular choice of the pattern or arrangement of solar collector modules 22 will typically depend on maximizing the amount of PV on each solar collector module assembly 12 while (1) staying within the size limitations of the mode of transportation, such as in a container, on a truck or by rail, (2) staying within appropriate electrical limitations, and (3) maintaining integer fractions of string lengths. String length is measured by the number of solar collector modules 22 needed to provide a desired electrical output. Integer fractions of string lengths means that if a desired string length is X, but you cannot fit that many on a solar collector module assembly 12 because X is too large, then the string length of each assembly 12 should be X/2 or X/3 and so on, so that assemblies 12 can be easily wired together in the field. In addition, a string length can be too small so that you could have multiple strings on one solar collector assembly 10.

Figure 13B:
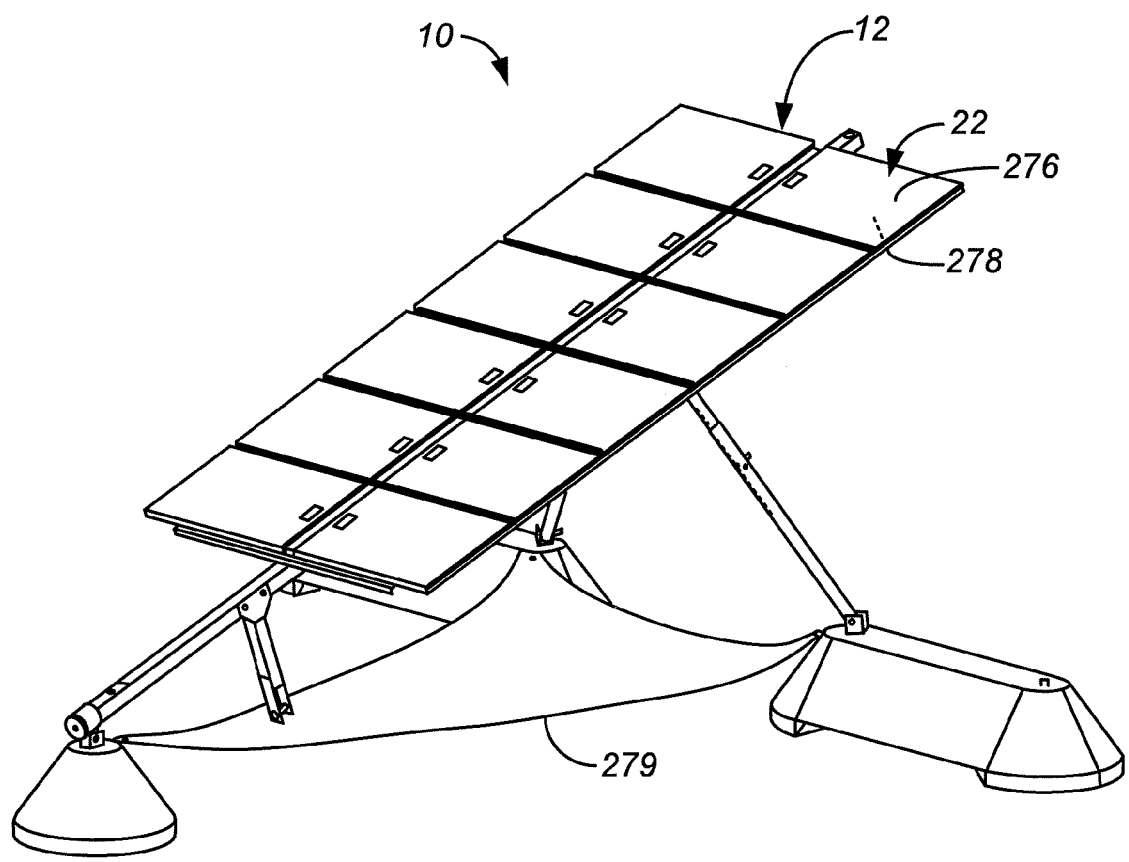
FIG. 13B illustrates a further example in which the solar collector modules are bi-facial solar collector modules and solar collector assembly includes a reflective element to redirect solar radiation back to the lower surface of the solar connector modules.
Figure 13C:
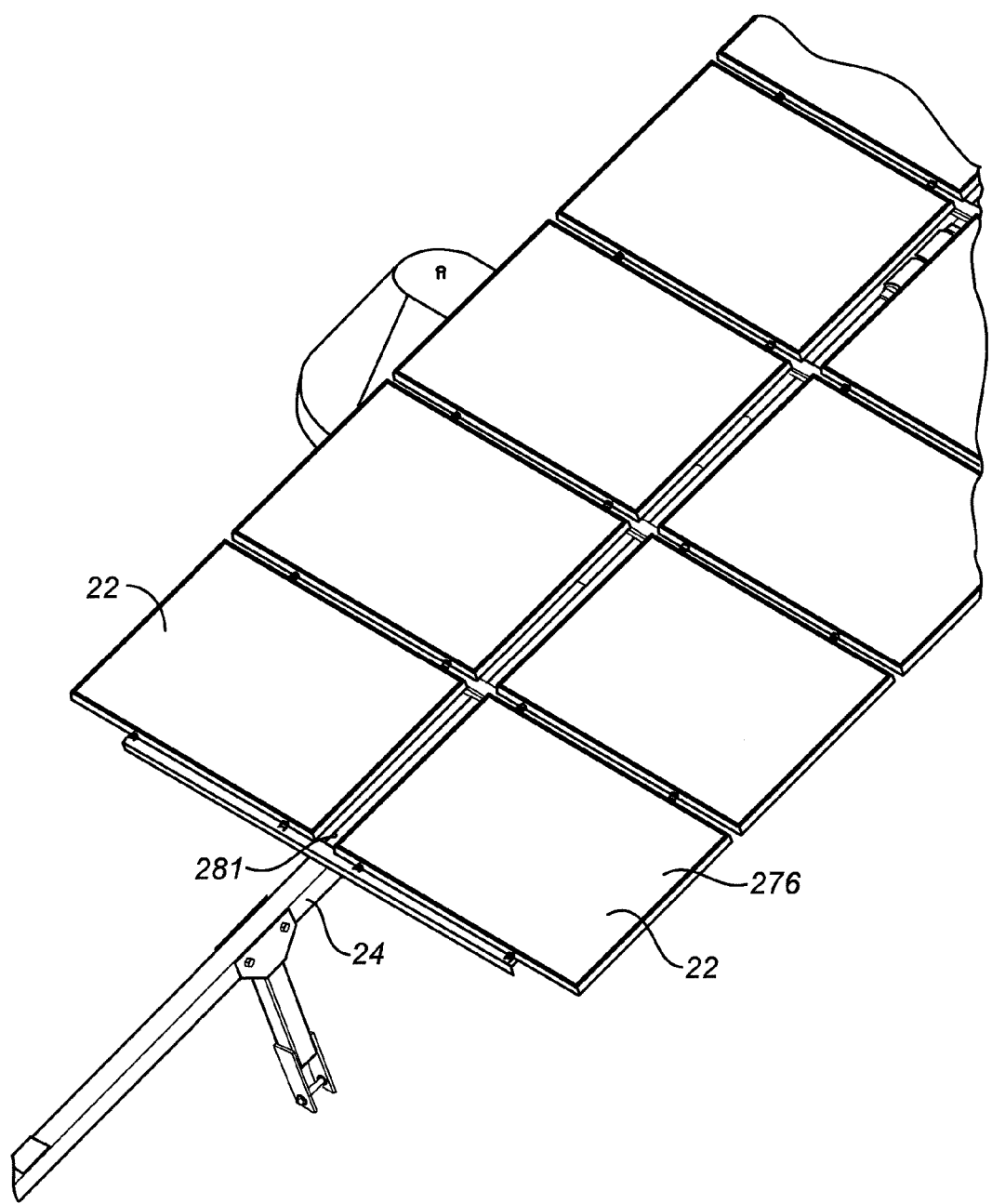
FIG. 13C is an enlarged view of a portion of the assembly of FIG. 13B viewed from above showing a gap between adjacent solar collector modules over the torque member.
Figure 14:
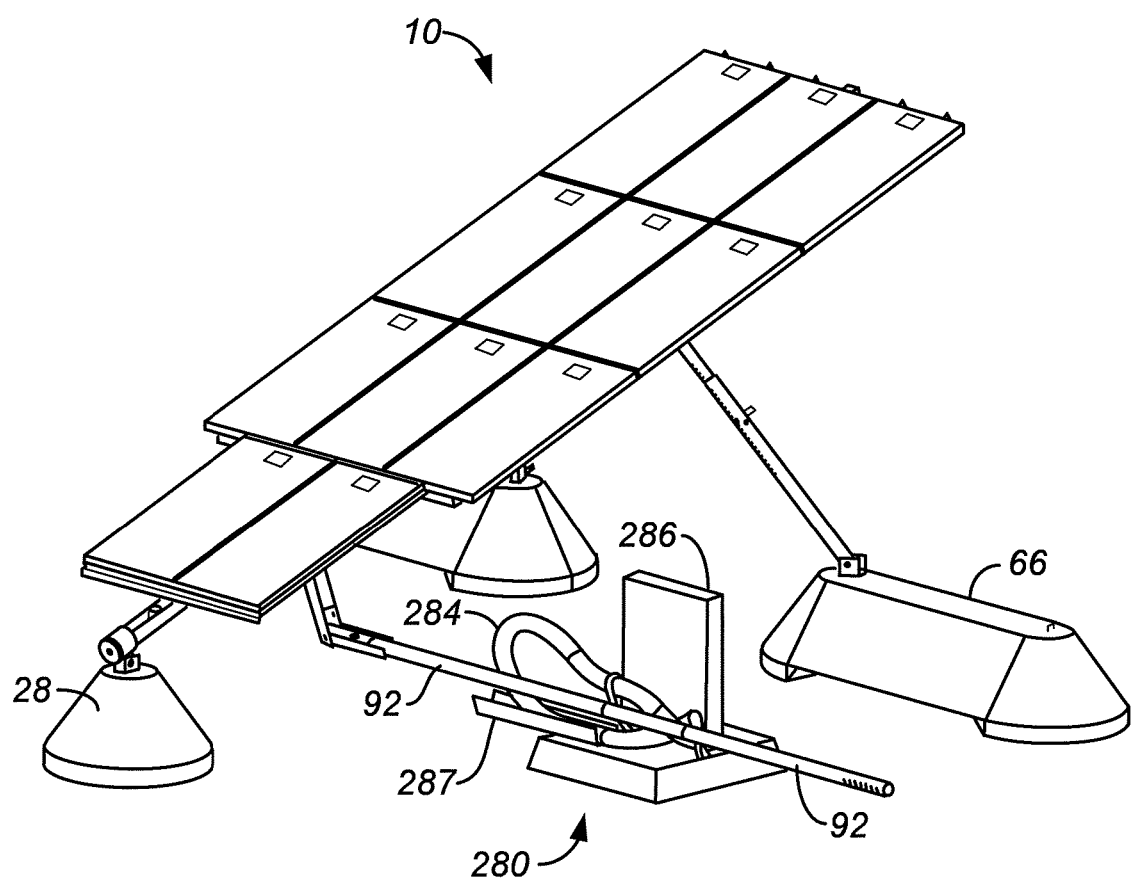
FIGS. 14-17 show the structure of FIG. 1 in which a combiner box assembly is used along a row of the solar collector assemblies.
Figure 15:
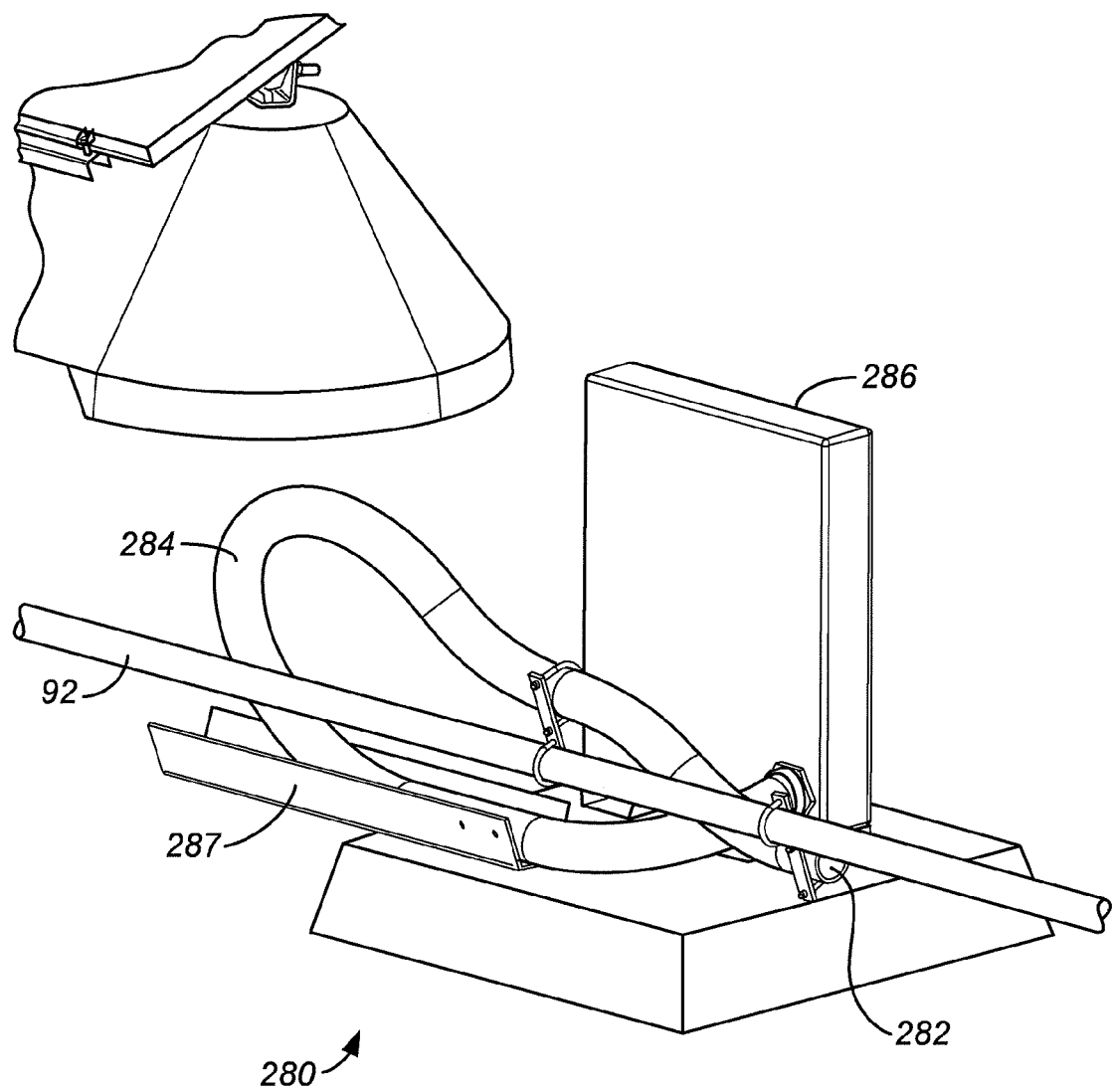
Figure 16:
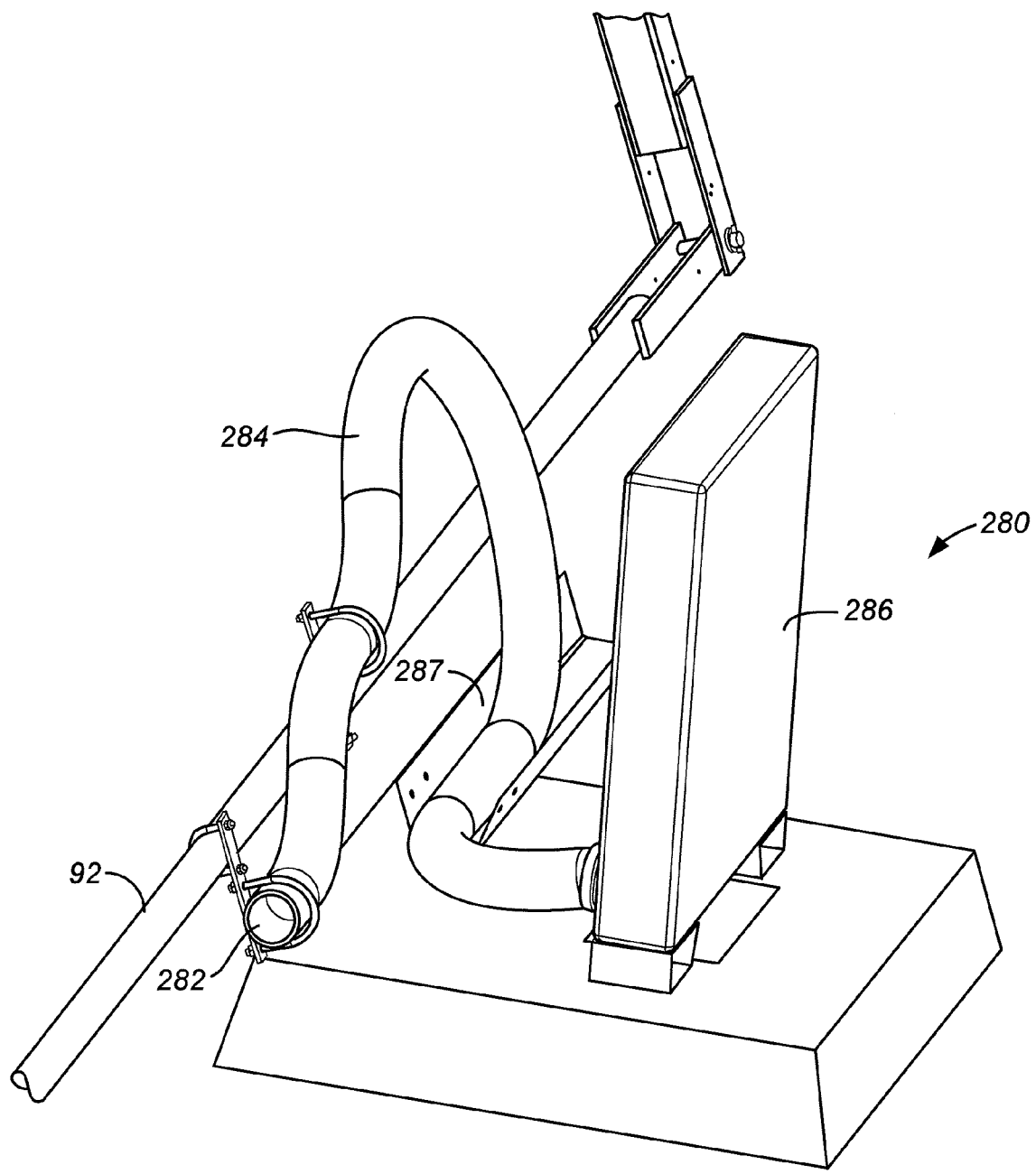

FIGS. 13B and 13C illustrate a further example in which solar collector modules 22 are bifacial modules. That is, they are constructed so that sunlight striking both the upper surface 276 and the lower surface 278 of modules 22 can be transformed into energy. To increase the amount of solar radiation striking lower surface 278, a reflective element 279 in the form of a sheet or tarp is positioned below solar collector module assembly 12. Reflective element 279 reflects sunlight that would otherwise be absorbed by the ground towards lower surface 278. Other types of reflective elements 279, such as a sheet of stiff or flexible metal or a sheet of painted plywood, may also be used. In addition, support surface 14 may be such as to permit a reflective element 279 to be applied directly to support surface 14; for example reflective element 279 may be in the form of a layer of white gravel or a layer of paint. Reflective element 279 may have the same or a different shape from that illustrated in FIG. 13B and may be sized larger or smaller than that illustrated in FIG. 13B. As shown best in FIG. 13C, solar collector modules 22 are spaced apart from one another to define a gap 281 between the modules above torque member 24. Gap 281 between modules 22 is provided to help ensure that torque member 24 does not shade lower surfaces 278 of the modules when light is reflected back towards lower surfaces 278 by reflective element 279.

Figure 17:
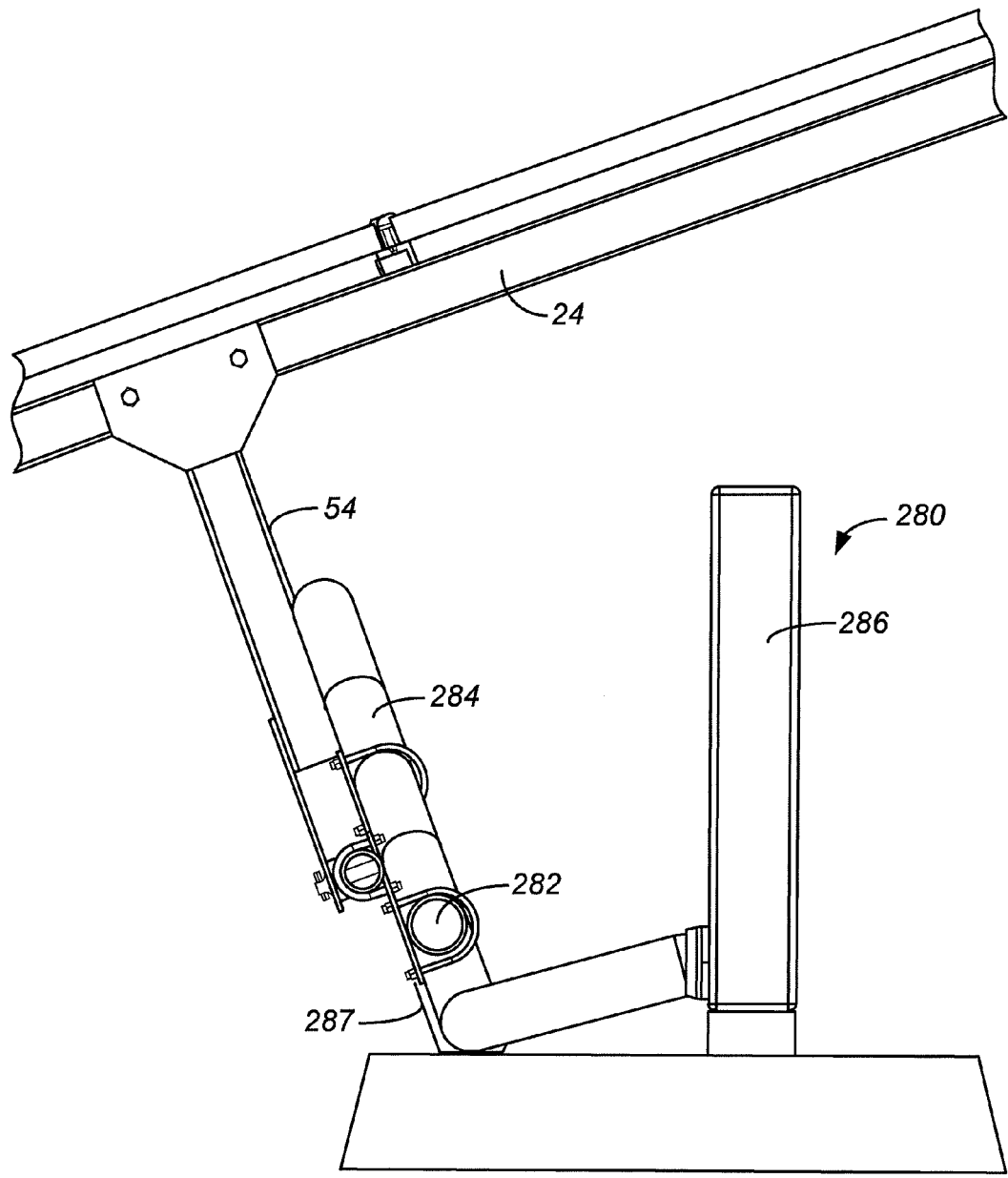

FIGS. 14-17 illustrate another example which uses a combiner box assembly 280 along each row of solar collector assemblies 10. Wires from each solar collector assembly 10 pass along drive element 54 and along drive element couplers 92 until reaching combiner box assembly 280. The wires, not shown in FIGS. 14-17, pass through an opening, not shown, in drive element coupler 92, into the open end 282 of a flexible hose 284, through flexible hose 284 and into combiner box 286. The proper movement of hose 284 is aided by the use of tray 287 which helps keep hose 284 from tangling, binding or reducing the minimum wire bend radius as drive element coupler 92 moves during the day. As shown in FIG. 17, the angular orientation of hose 284 is such as to generally lie in a plane parallel to drive element 54.

It is preferred that solar collector module assemblies 12 be constructed to minimize the number of separate pieces that must be assembled at the solar site. It is also preferred that solar collector module assemblies 12 be storable and transportable in a compact configuration with minimal packing material. FIGS. 18-26 illustrate one way of achieving a compact storage and transport configuration while FIGS. 30-41 illustrate another, presently preferred, way of doing so. The FIGS. 18-26 example will be discussed first, followed by a discussion of the FIGS. 30-41 example.

Figure 18:
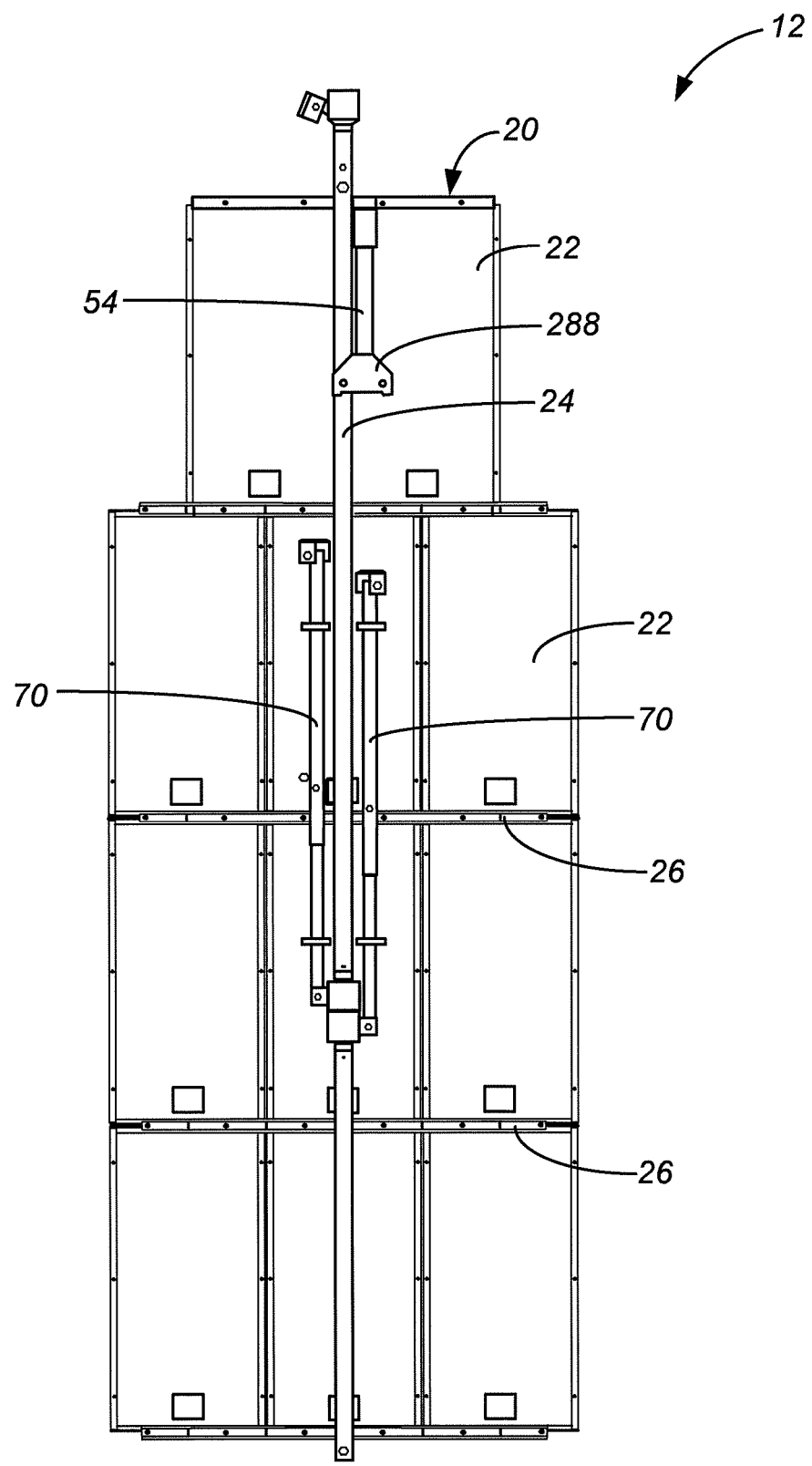
FIG. 18 is a bottom plan view of the solar collector module assembly of FIG. 1 in a storage and shipping orientation.

FIG. 18 illustrates a solar collector module assembly 12 in a shipping and storage orientation with support struts 70 arranged to lie parallel to frame 20 and solar collector modules 22 and also generally parallel to torque member 24. This is achieved by pivoting support struts 70 about axes 82 and also by rotating the support struts about tilt axis 42 with outer bearing member 76 rotating around inner bearing member 74. Support struts 70 are temporarily secured in this shipping and storage orientation by, for example, using bailing wire to secure support struts 70 to torque member 24. In addition, drive element 54 is temporarily mounted to torque member 24 so to lie generally parallel to frame 20 and solar collector modules 22 with the mounting plates 288 located on either side of torque member 24 as shown in FIG. 18.

Figure 19:
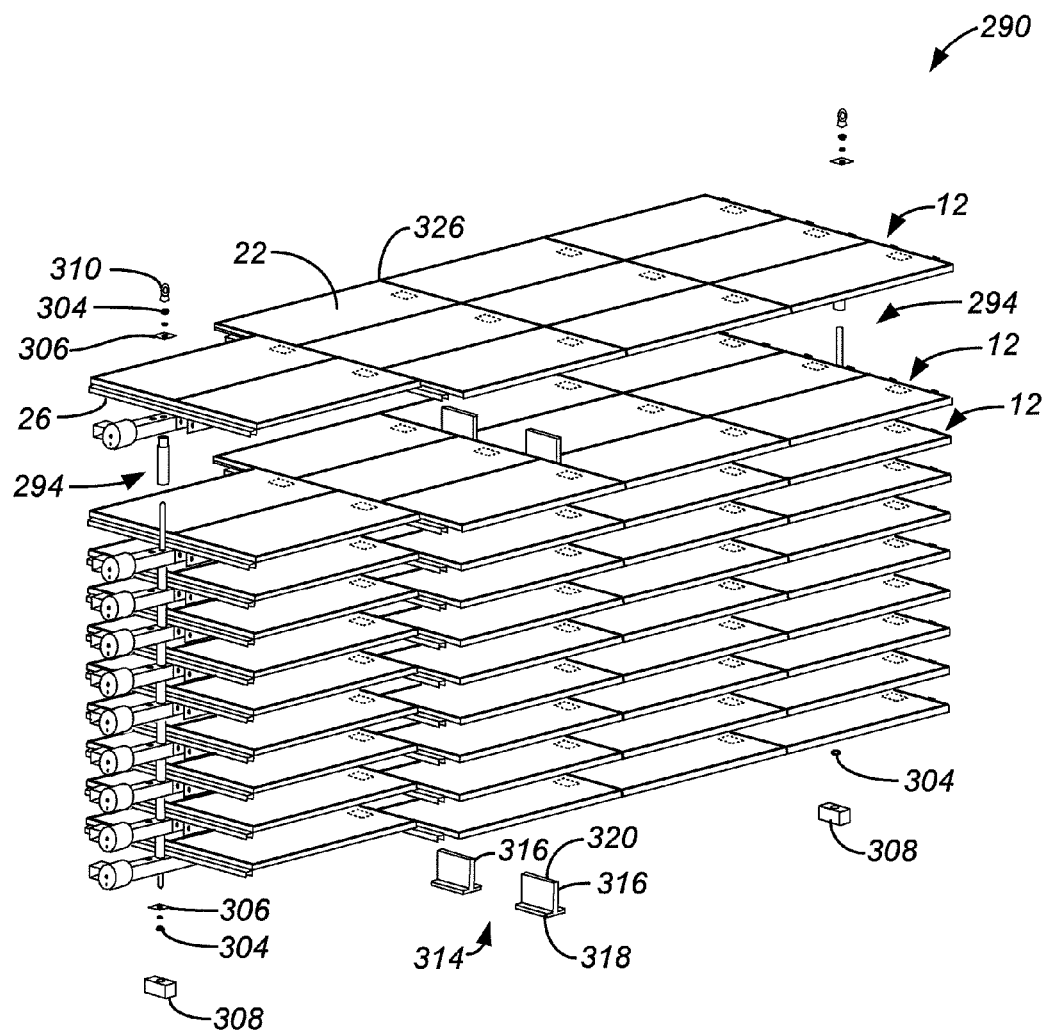
FIGS. 19-22 illustrate a stack of the solar collector module assemblies of FIG. 18 separated by spacer assemblies.
Figure 20:
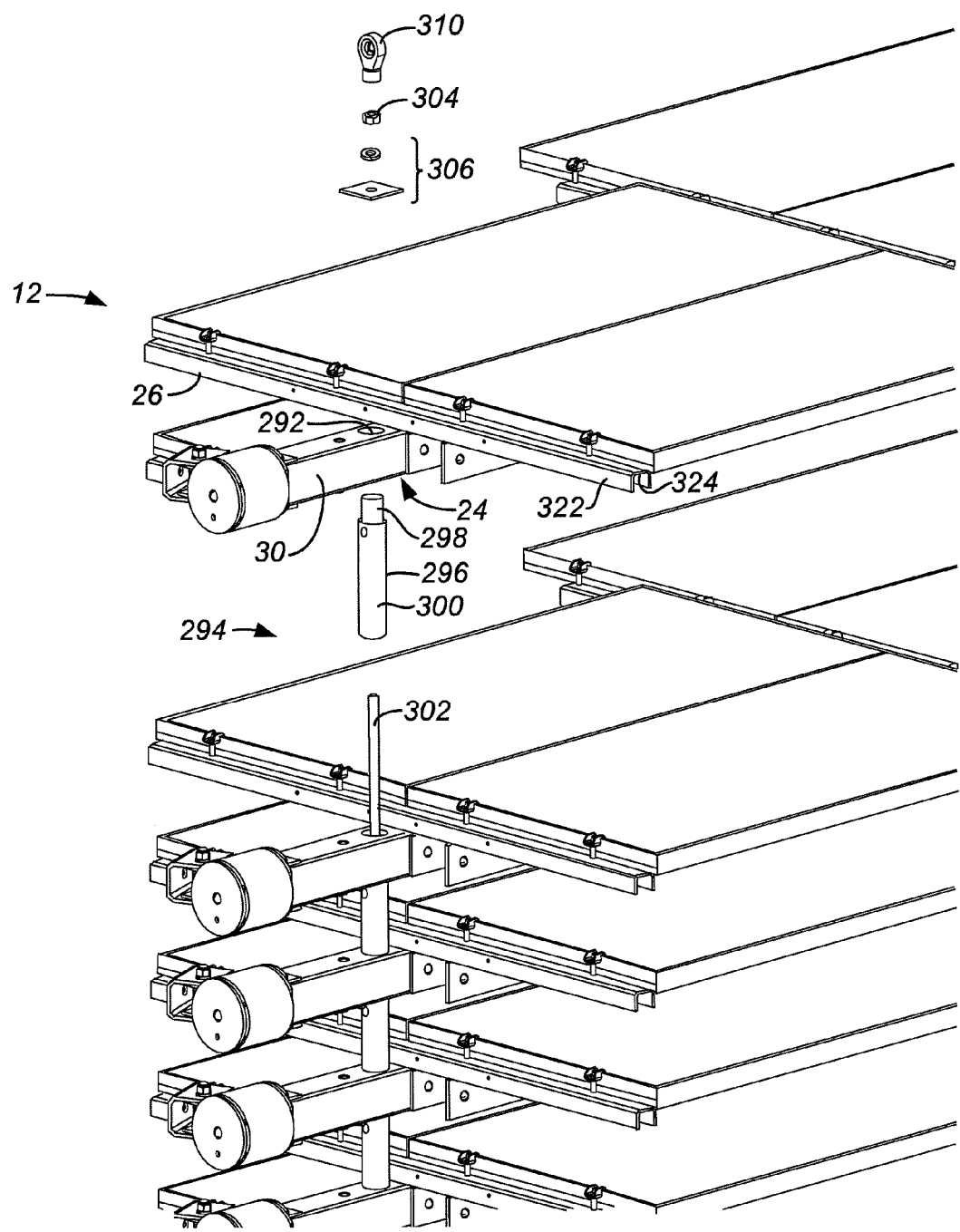
Figure 21:
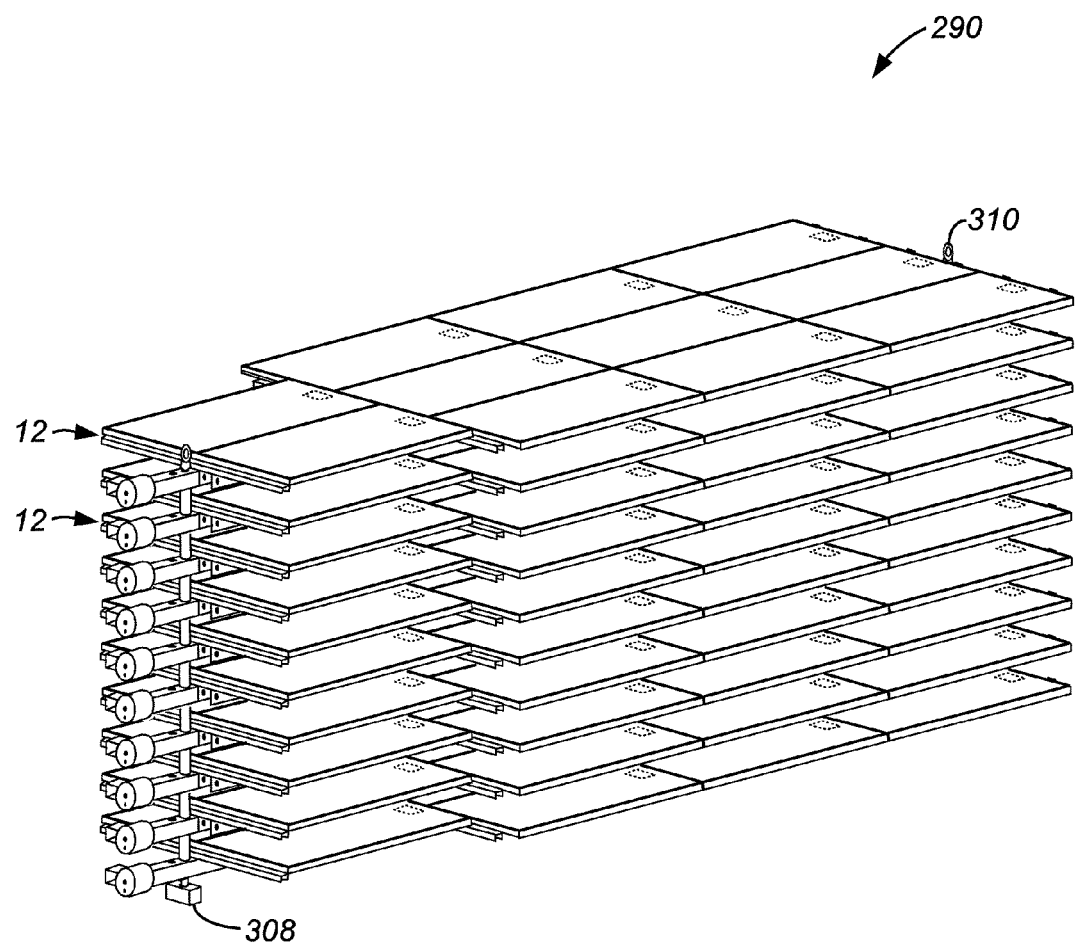
Figure 22:
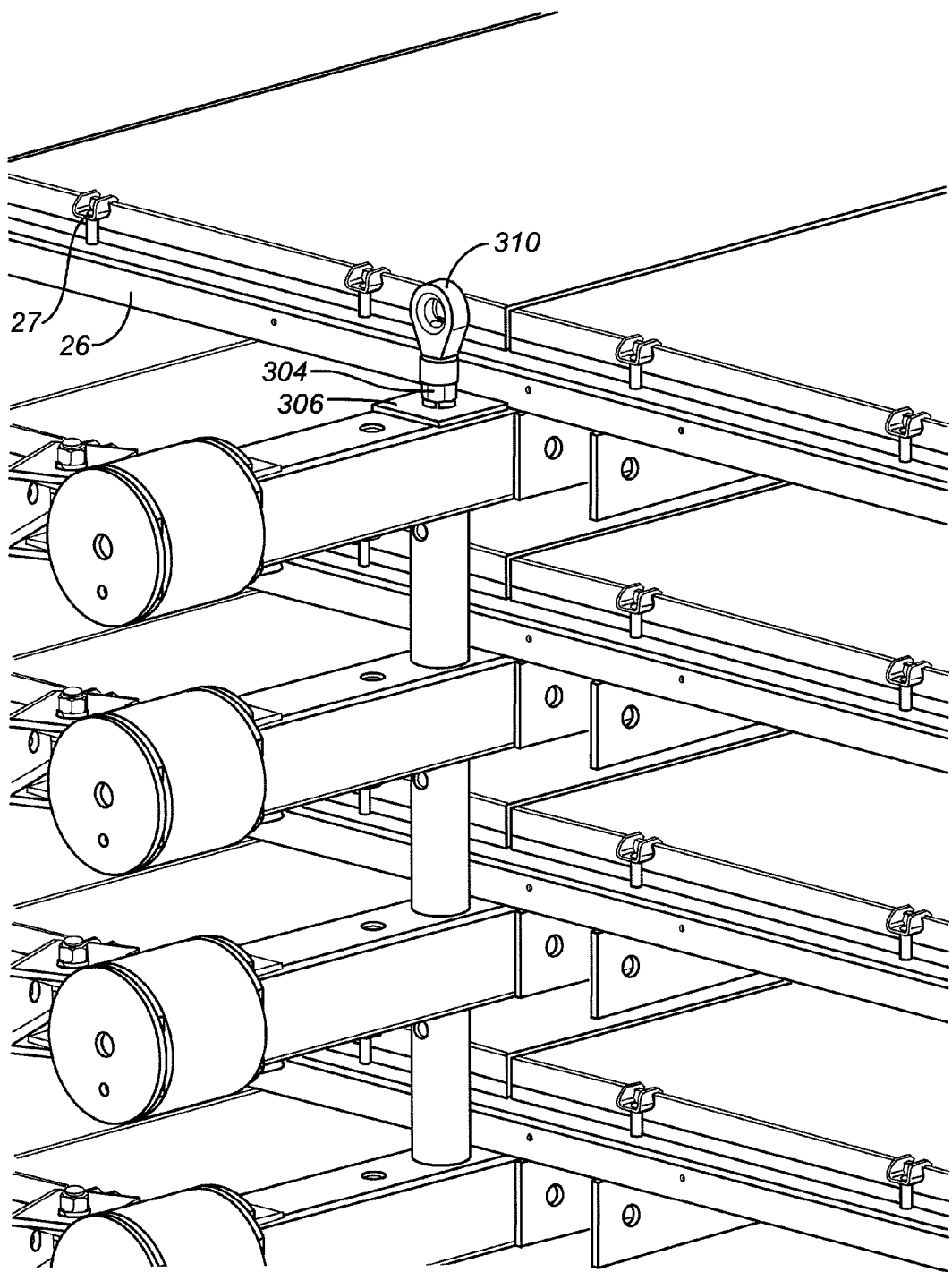

FIGS. 19 and 20 illustrate the assembly of a stack 290 of solar collector module assemblies 12 with a completed stack shown in FIGS. 21 and 22. The south end 30 of torque member 24 has a vertical opening 292. A first spacer assembly 294 is used to separate and support adjacent assemblies 12 through the use of a spacer tube 296. Spacer tube 296 has a reduced diameter portion 298 and a full diameter portion 300. Reduced diameter portion 298 is sized to fit within opening 292; however full diameter portion 300 is oversized relative to opening 292. A rod 302 extends through each of the spacer tubes 296 and openings 292 in the stack 290 and is secured at each end with a nut 304 and washers 306. A threaded base member 308 is used at the bottom of the stack 290 to support the stack on a support surface. A lifting eye 310 is secured to the upper end of rod 302 and is used to aid moving stack 290. A similar spacer assembly 294 is used at the other end of stack 290.

A second spacer assembly 314 is used between, typically midway between, first spacer assemblies 294. Second spacer assembly 314 includes a pair of T-shaped supports 316 positioned beneath each assembly 12. Each T-shaped support 316 includes a base 318 and a center element 320 extending upwardly from a central portion of base 318. T-shaped supports 316 are used to separate and support adjacent assemblies 12. As shown in FIG. 20, rails 26 are U-shaped with downwardly extending legs 322 connected by a bight 324. There is a gap 326 between adjacent modules 22 at rails 26. Base 318 is sized to fit within gap 326 and rest on rails 26. Center element 320 fits between legs 322 and rests against bight 324 of rail 26 so that the weight of an overlying assembly 12 is transferred to frame 20 of the underlying assembly 12. T-shaped supports 316 are also used beneath the bottommost assembly 12 for supporting the stack 390 on a support surface, which may be, for example, provided by conventional pallets, a custom full-length pallet, the bed of a transport vehicle, or a loading dock. Stack 290 may be lifted and moved using, for example, a forklift engaging one or more palettes (not shown) supporting stack 290 or a crane using lifting eyes 310.

In this example some of the weight of overlying assemblies 12 is transferred to the underlying assemblies 12 through torque members 24 and spacer tubes 296. If desired, spacer tubes 296 could be configured so that the weight of overlying assemblies 12 would be transferred directly to underlying spacer tubes 296, not through torque members 24.

Upon manufacture, solar collector module assemblies 12 can be placed in the shipping and storage orientation of FIG. 18 and stacked as shown in FIGS. 19-22 using first and second spacer assemblies 294, 314. The installation site is determined. Stack 290 of assemblies 12 can be transported in the stacked configuration to the installation site. The appropriate weights for south bases 28 and north bases 66 are determined. Ballast-type south and north bases 28, 66 are relatively simple in construction and are typically manufactured at or close to the installation site to reduce shipping costs. South and north bases 28, 66 are placed on the ground, or other support surface, at the installation site. South bases 28 are typically placed at spaced apart positions on a generally East-West line. North bases 66 are also typically placed at spaced apart positions on a generally East-West line. Very little, if any, site preparation needs to be made when using ballast-type bases 28, 66 because the weight of ballast-type bases 28, 66 eliminates the need to bury all or part of the base within the ground, and the design of the system allows for use on irregular, rough, or undulating terrain. Assemblies 12 or then removed from stack 290 and prepared for being secured to south and north bases 28, 66. To do so drive element 54 is bolted to torque member 24 to its use position shown in FIG. 7. South side joint 34 at south end 30 of torque member 24 is secured to south pivot mount 44 at south base 28. Support struts 70 are pivoted downwardly and outwardly using bearing assembly 72 and strut mount 80; see FIGS. 8 and 9. The length of each support strut 70 is adjusted to position solar collector module assembly 12 at tilt angle 32, typically 20°, and to accommodate the position, height and orientation of the north bases 66 to which the support struts are attached. As shown in FIG. 4, in the disclosed example this is accomplished using a pin type member 328 passing through a hole 330 in a lower telescoping section 332 and one of several holes 334 in an upper telescoping section 336. Finer length adjustments can be provided by, for example, using a threaded insert at one or both ends of support strut 70 through which a pin, bolt or other pivot member, such as pivot member 338, passes. In some situations it may be necessary to extend the length of support strut 70 to a length greater than can be accommodated by telescoping sections 332, 336; in such situations strut extensions, not shown, may be used to accommodate the extra length needed. North pivot mounts 86, which are attached to north bases 66, can rotate about a generally vertical axis to become aligned with the associated support strut 70. Lower end 84 of each support strut 70 is pivotally secured to north pivot mounts 86 by a bolt or other pivot member 338.

The determination of the weight for south bases 28 and north bases 66 can be made to be site-specific based upon the size and configuration of assemblies 12 or can be made based upon typical configurations for assemblies 12 and expected wind loads. The weight determination can be made by the final user or installer or by the manufacture of assemblies 12. One typical way for determining the weight of south and north bases 28, 66 is to provide the user or installer guidelines so that for a particular range of surface areas for assembly 12 oriented over a particular range of tilt angles, recommended weights for south and north bases 28, 66 can be provided for different ranges of expected wind speeds. Alternatively, the manufacturer can provide the user or installer with recommended weights for south and north bases 28, 66 based upon information for the particular installation.

Figure 30:
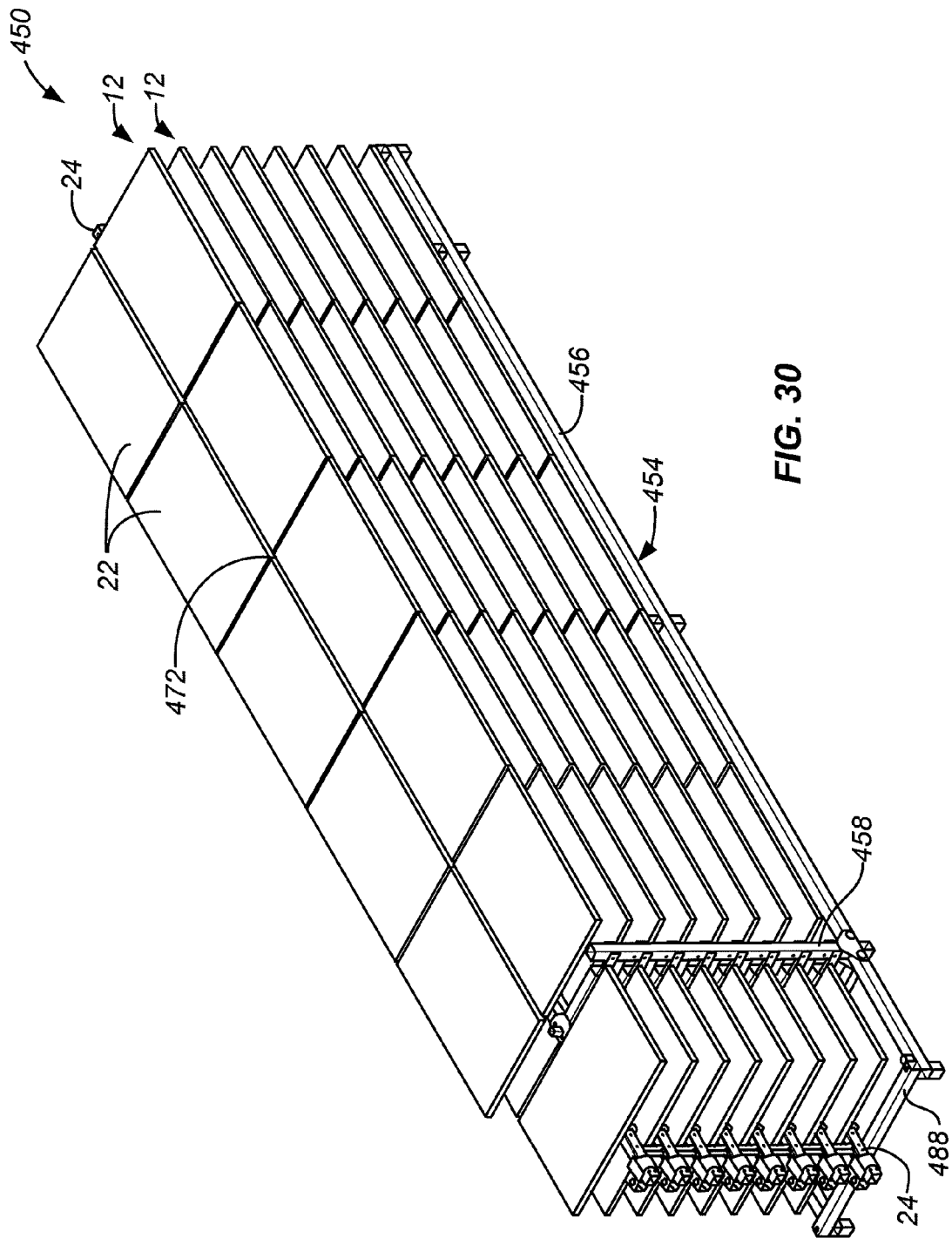
FIG. 30 shows a further example of a solar collector assembly arrangement including a stack of solar collector assemblies, similar to that of FIG. 19, mounted to a shipping/storage skid.

FIG. 30 shows an example of a solar collector assembly arrangement 450 including a stack 452 of solar collector module assemblies 12, similar to the stack of FIG. 19, mounted to a shipping/storage skid 454. Skid 454 includes a generally rectangular base 456 and an upwardly extending stabilizer bar 458. Skid 454 is designed to permit solar collector assembly arrangement 450 to be lifted and transported using a number of methods, such as forklifts or overhead cranes. Skid 454 may have other configurations and may include, for example, stationary or retractable wheels for particular installations.

Solar collector module assembly 12 is similar to assembly 12 shown in FIGS. 1-13 and 18. One of the differences is that rails 26 of frame 20 are spaced apart from the edges of solar collector modules 22. This can be seen by comparing FIG. 35 with FIG. 18. Also, instead of using clips 27 along the edges of solar collector modules 22, see FIG. 6, rails 26 are secure in to the underside of solar collector modules 22 using an appropriate fastener 455, such as screws. Other techniques for securing solar collector modules 22 to frame 20, including the use of adhesives with or without mechanical fasteners can also be used.

Figure 31:
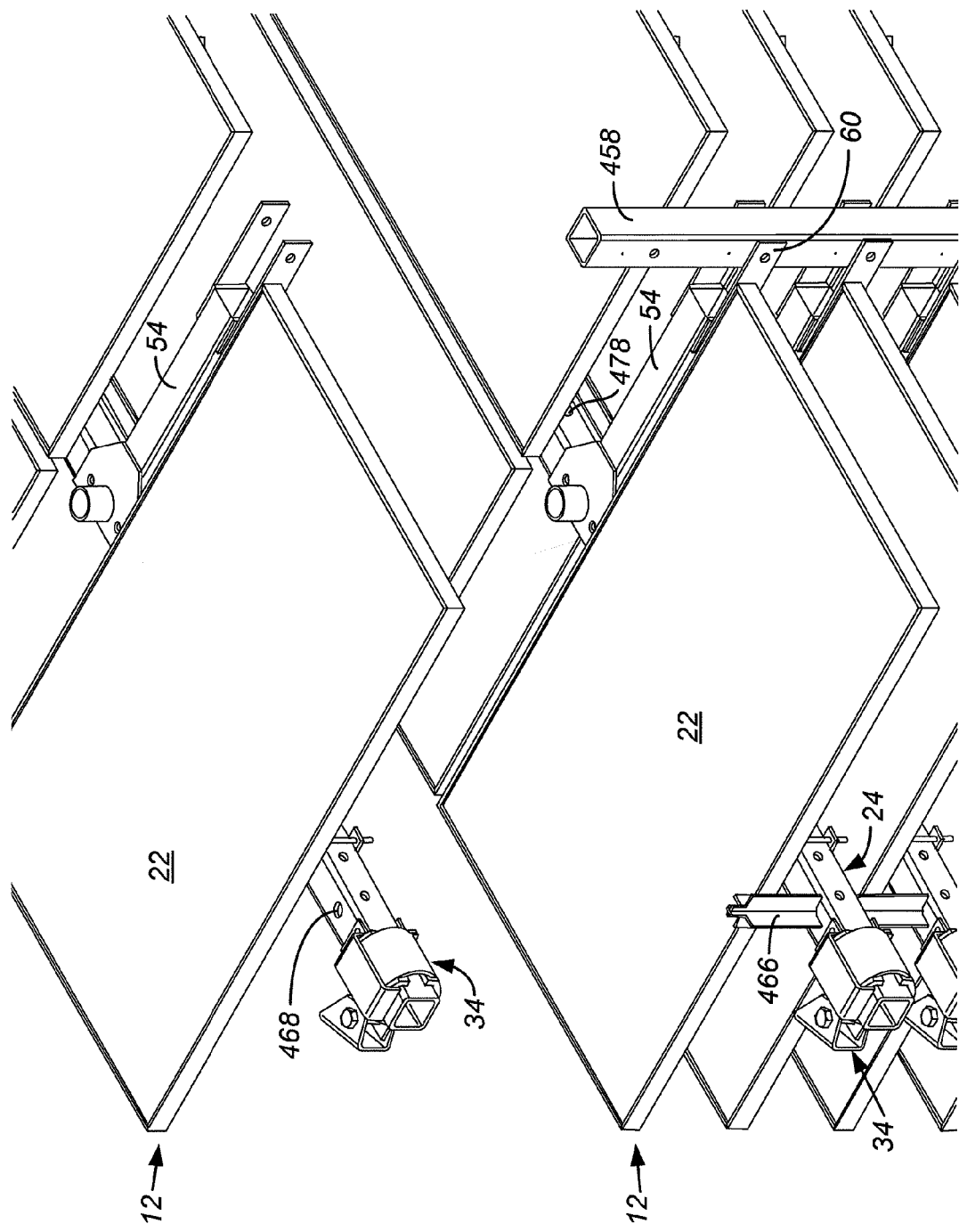
FIGS. 31 and 32 are enlarged views of the ends of the arrangement of FIG. 30 with the top solar collector assembly spaced apart to show detail.
Figure 32:
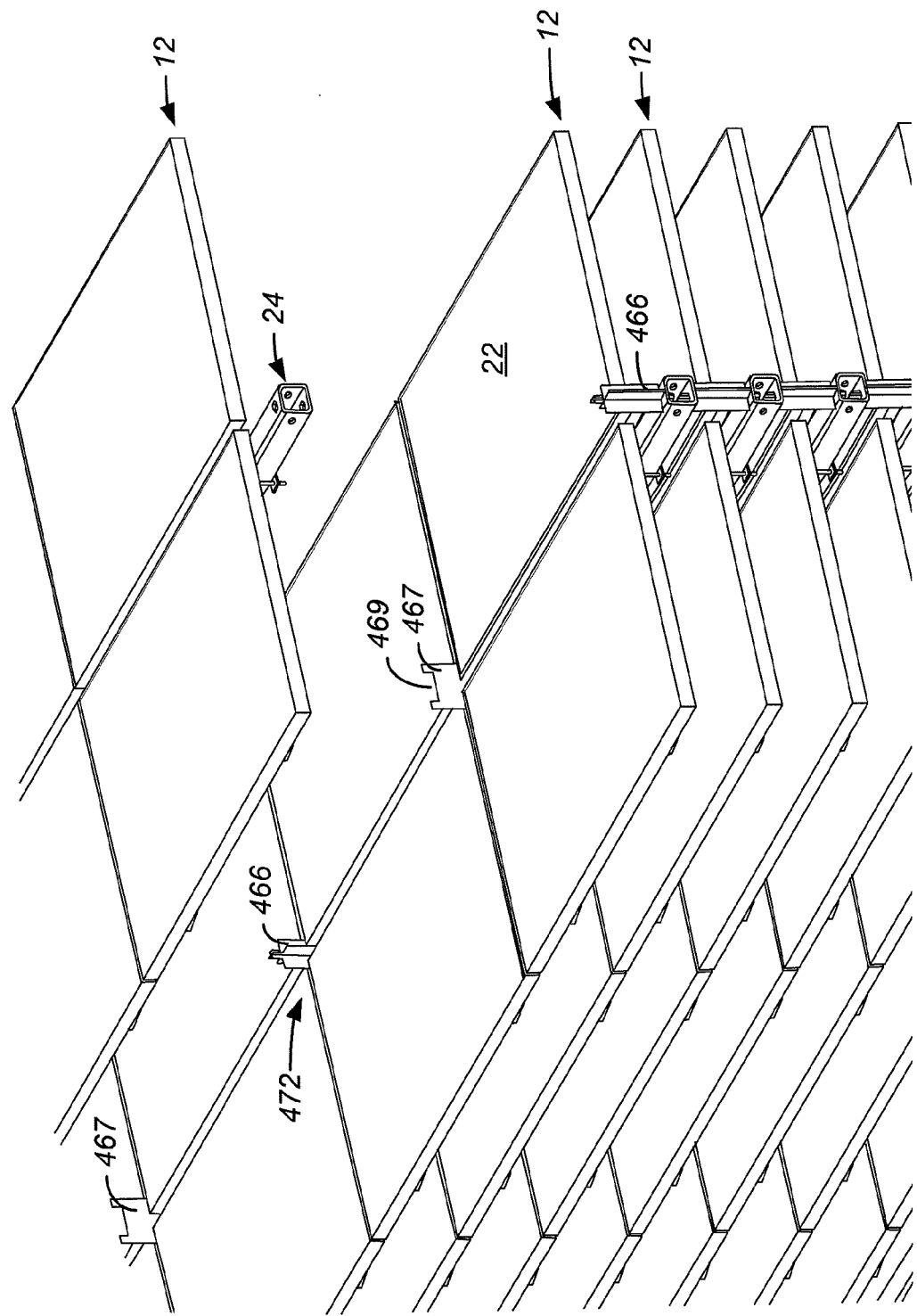
Figure 33:
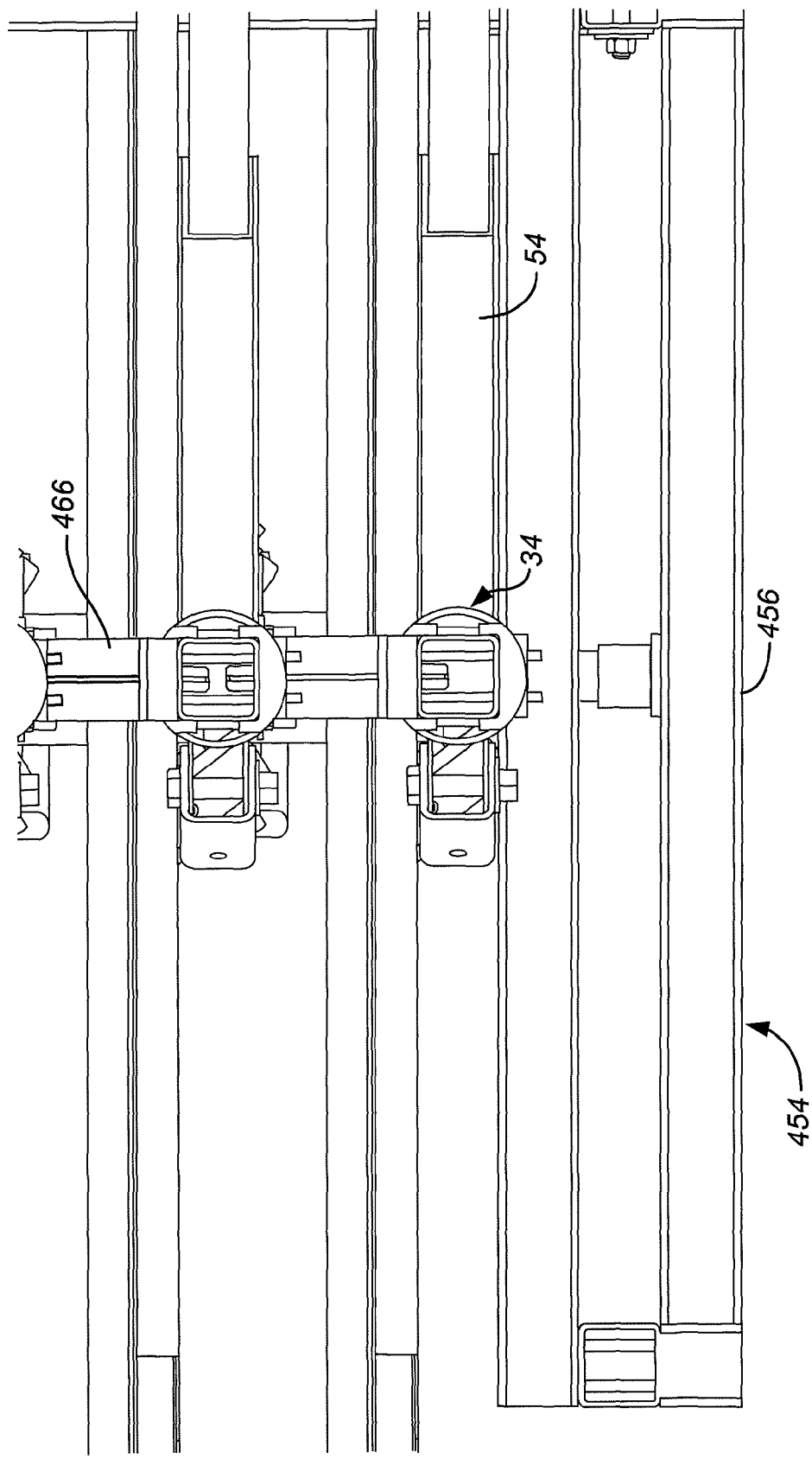
FIGS. 33 and 34 are enlarged partial end views of the upper and lower portions of the arrangement of FIG. 30.
Figure 34:
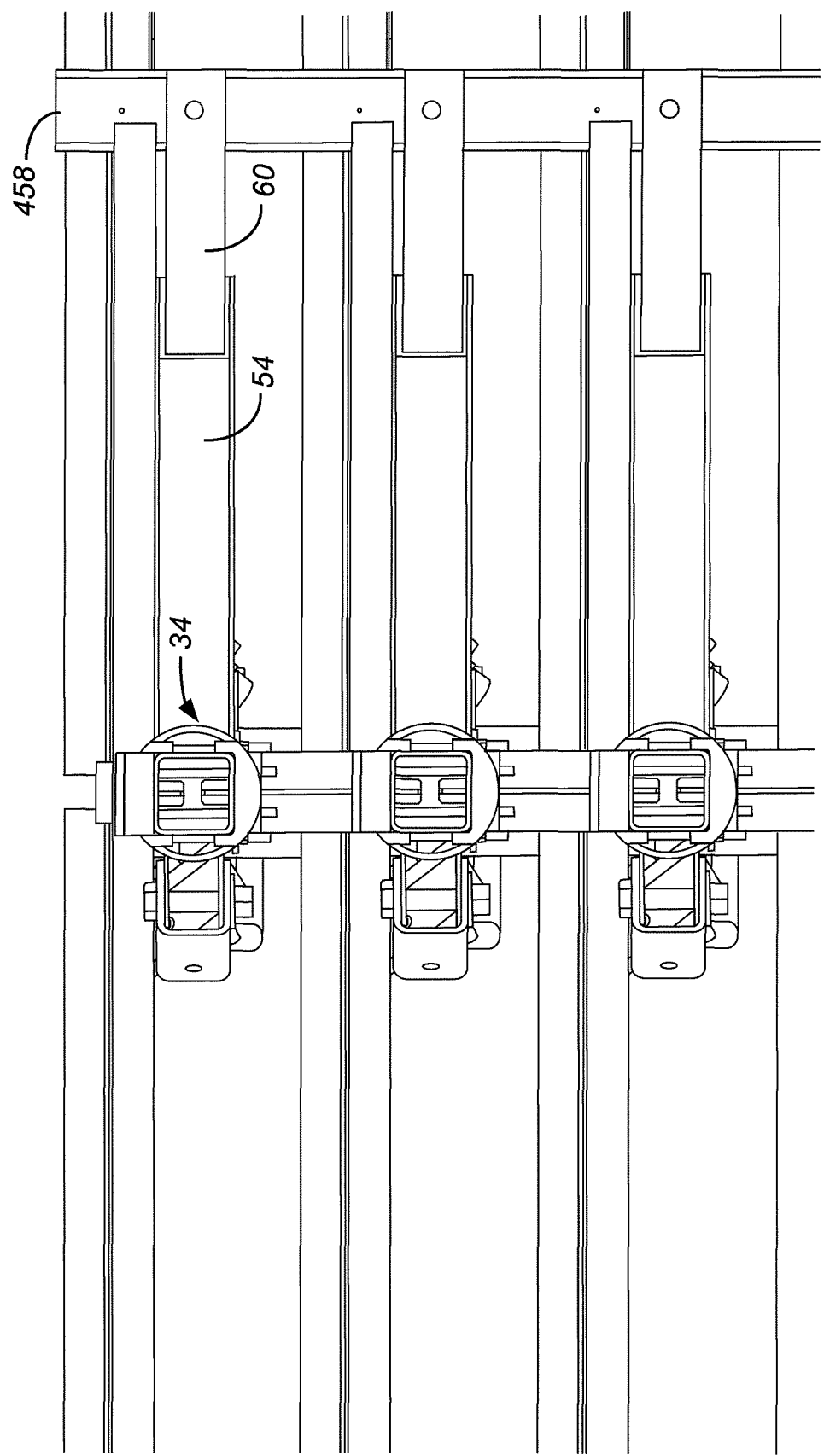
Figure 35:
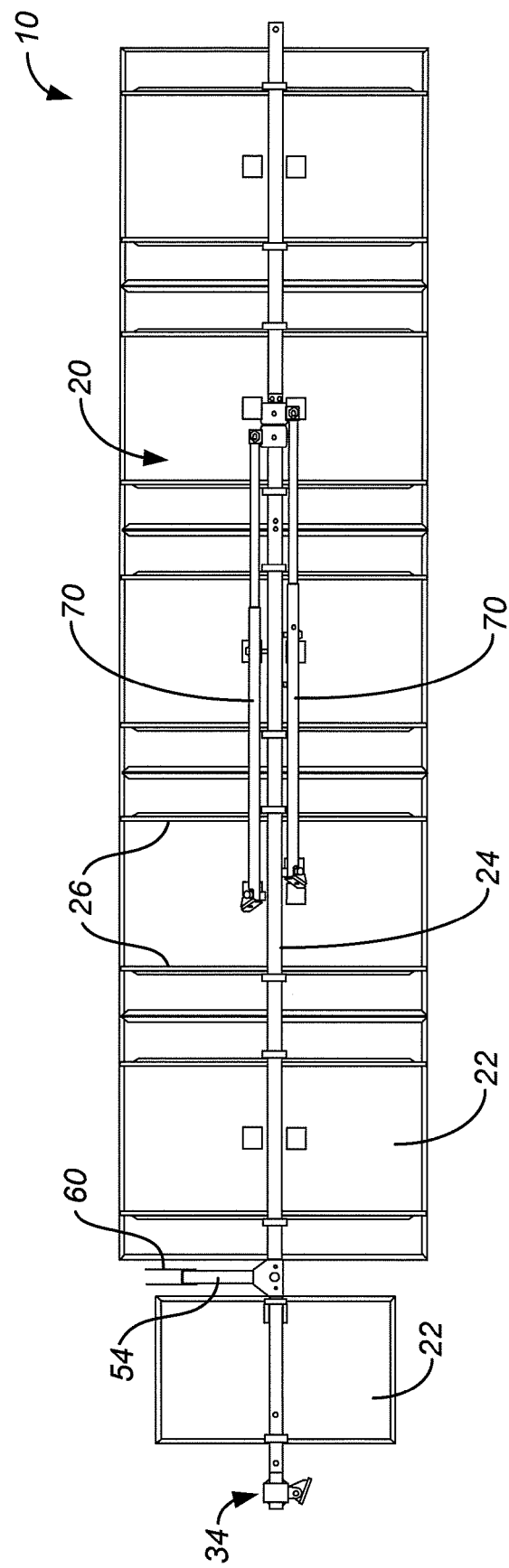
FIG. 35 is an underside view of a solar collector assembly of FIG. 30 in the storage or transportation configuration of FIG. 30.
Figure 36:
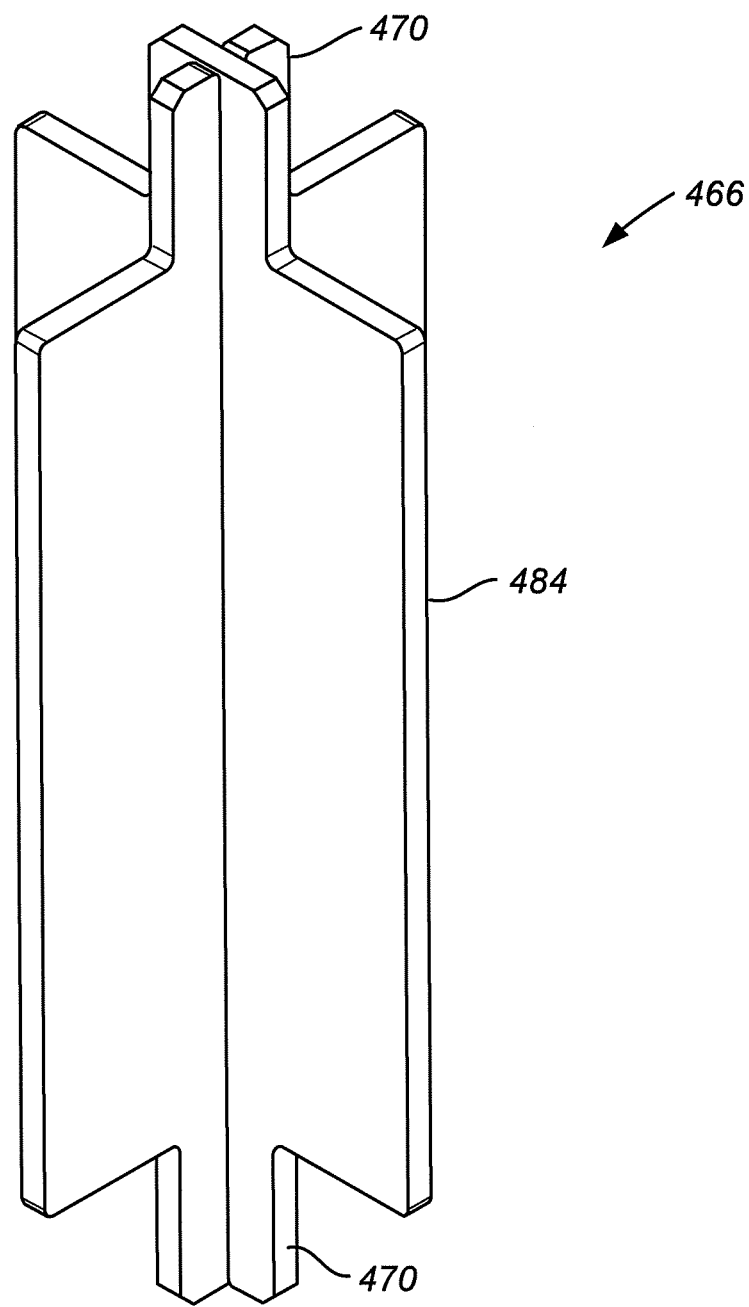
FIG. 36 is an isometric view of the spacer element of FIG. 31.
Figure 39:
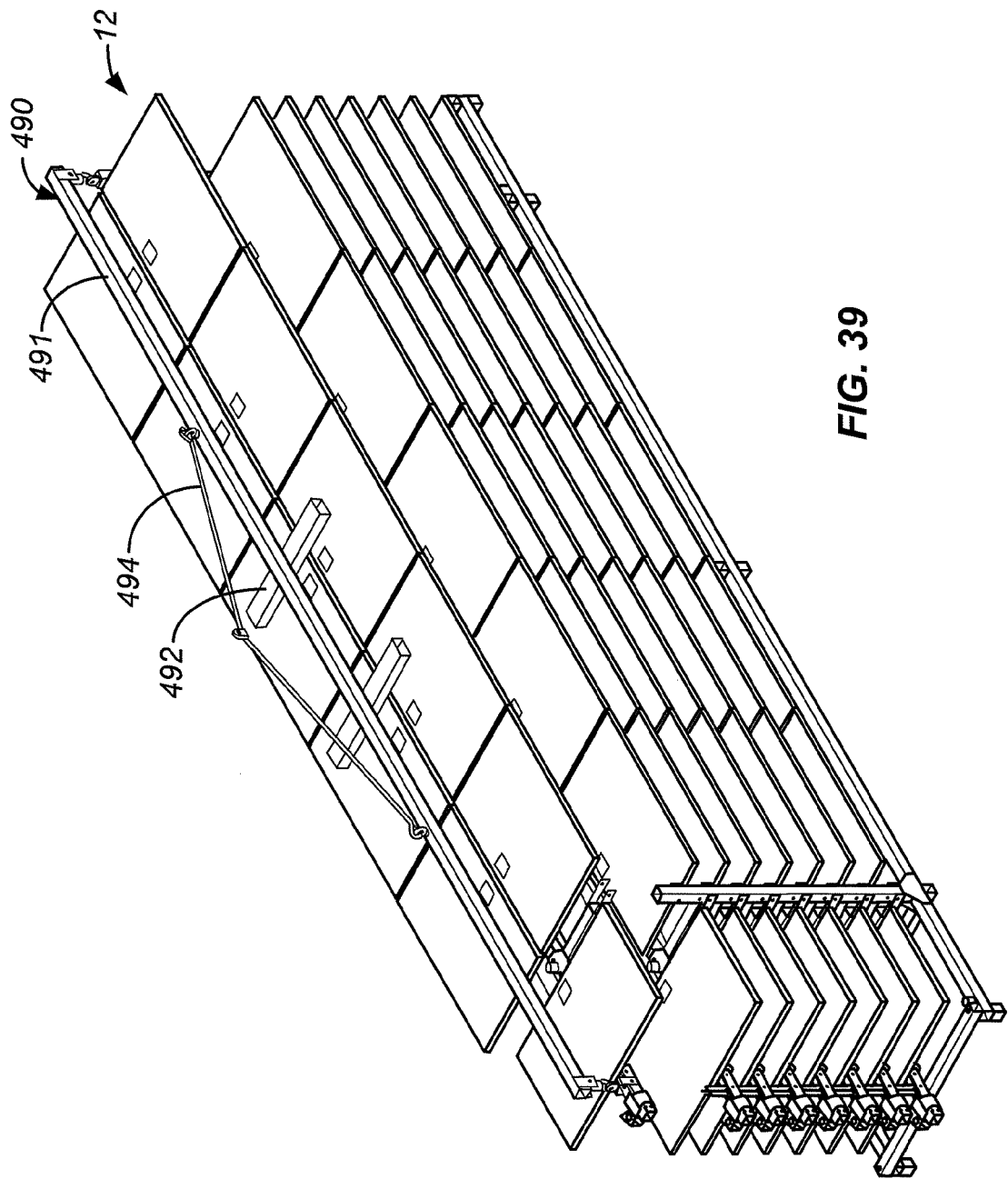
FIG. 39 is an isometric view showing the use of a lifting bar to remove the upper solar collector module assembly from the stack of solar collector module assemblies.

Solar collector module assemblies 12 are stacked one on top of another using spacer elements 466, see FIGS. 31, 32 and 36, and through the use of drive element 54 as a stabilizer when solar collector module assemblies 12 are in a storage or transportation configuration, such as in FIGS. 30 and 39. Torque members 24 have holes 468, see FIG. 31, formed therein for receipt of the reduced-size ends 470 of spacer element 466. Holes 468 are located at each end of torque member 24 as well as, in this example, along the length of torque member 24 at a four corner junction 472 of adjacent solar collectors 22. The X cross-sectional shape of spacer element 466 provides good strength while permitting solar collectors 22 to be mounted close to one another. The weight of overlaying assemblies 12 is transferred, through torque member 24, to frame 20 of the underlying assemblies 12 so the solar collectors 22 do not need to support the weight of overlying assemblies 12. FIG. 32 also shows the use spacer elements 467 that can also be placed at a four corner junction. Spacer elements 467 are flat rectangular members having cutouts 469 at opposite ends sized for receipt of torque members 24.

Figure 37:
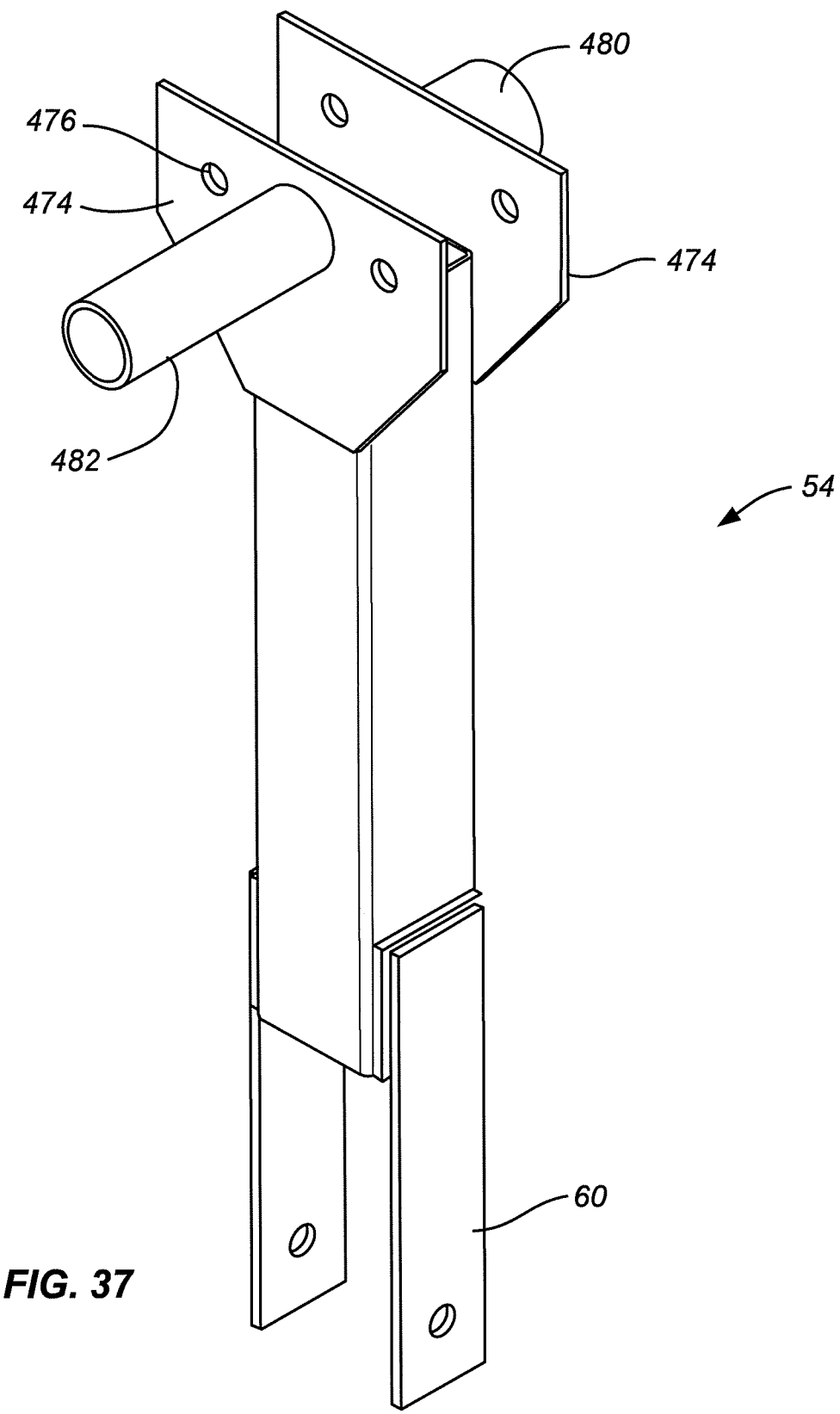
FIG. 37 is an isometric view of the drive element of FIG. 31.

Drive element 54 of FIGS. 31 and 37 is substantially the same as drive element 54 of FIG. 7 with the following distinctions. Drive element 54 of FIG. 37 includes a pair of plates 474 having holes 476 formed therein. Plates 474 are separated by distance slightly larger than the width of torque member 24, which has a square cross-sectional shape. This permits drive element 54 to be placed in a use orientation, such as shown in FIG. 7, with the drive element extending generally perpendicular to the tilt axis 42 defined by torque member 24 and a right angle to a plane formed by modules 22. Quick release fasteners, bolts, or other suitable fasteners can be used to secure drive element 54 to torque member 24 by aligning holes 476 with appropriately positioned holes 478 (see FIG. 31) formed in torque member 24.

Drive element 54 of FIG. 37 also includes an outer tubular element 480 and an inner tubular element 482 extending outwardly from plates 474. With drive element 54 in the storage or transportation orientation of FIGS. 31 and 35, that is with drive element extending radially outwardly from tilt axis 42 defined by torque member 24 and generally parallel to a plane defined by modules 22, the drive element can be secured to torque member 24 in the same manner as when in the use orientation, that is using bolts or other fasteners passing through appropriately formed holes in torque member 24. While in the use orientation it may be desirable to use bolts to secure drive element 54 to torque member 24, it may be desirable to use quick release fasteners to facilitate setting up the system on site. The outer end 60 of drive element 54 is secured to stabilizer bar 458 using bolts, quick release fasteners, or other appropriate means. The length of inner tubular element 482 plus the thickness of plate 474 is chosen to be equal to the height of the large diameter portion 484 of spacer element 466 so to permit weight to be properly transferred between torque members 24 at the location of drive elements 54. In the storage or transportation orientation of FIGS. 31 and 37, drive element 54 acts as a stabilizer arm 54 to not only transfer weight between torque members 24 but also to provide lateral stability to assemblies 12 and effectively prevent assemblies 12 from rotating or twisting about their torque members 24.

Figure 38:
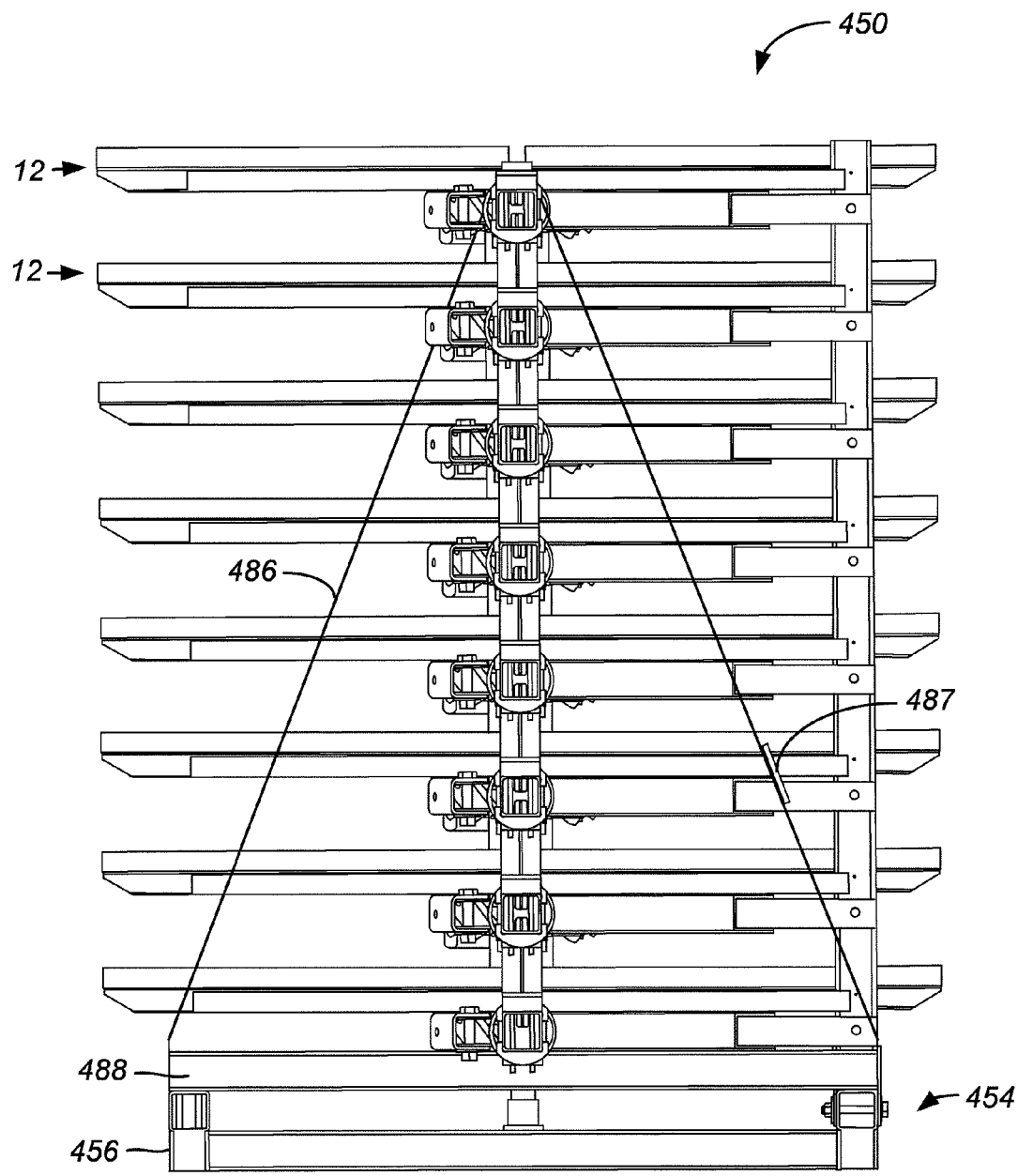
FIG. 38 is an end in view of the solar collector assembly arrangement of FIG. 30 showing the use of a hold down straps at either end to help maintain the stack of solar collector module assemblies secured to the skid.

FIG. 38 is an end in view of the solar collector assembly arrangement 450 of FIG. 30 showing the use of a hold down strap 486 at one end to help maintain the stack of solar collector module assemblies 12 secured to skid 454. Strap 46 passes through a hollow frame number 488 of base 456 and extends over the torque member 24 of the uppermost solar collector module assembly 12. Hold down strap 486 includes a tensioning device 487 to allow the user to provide proper tension to strap 486. A similar strap is used at the other end of base 456.

Figure 40:
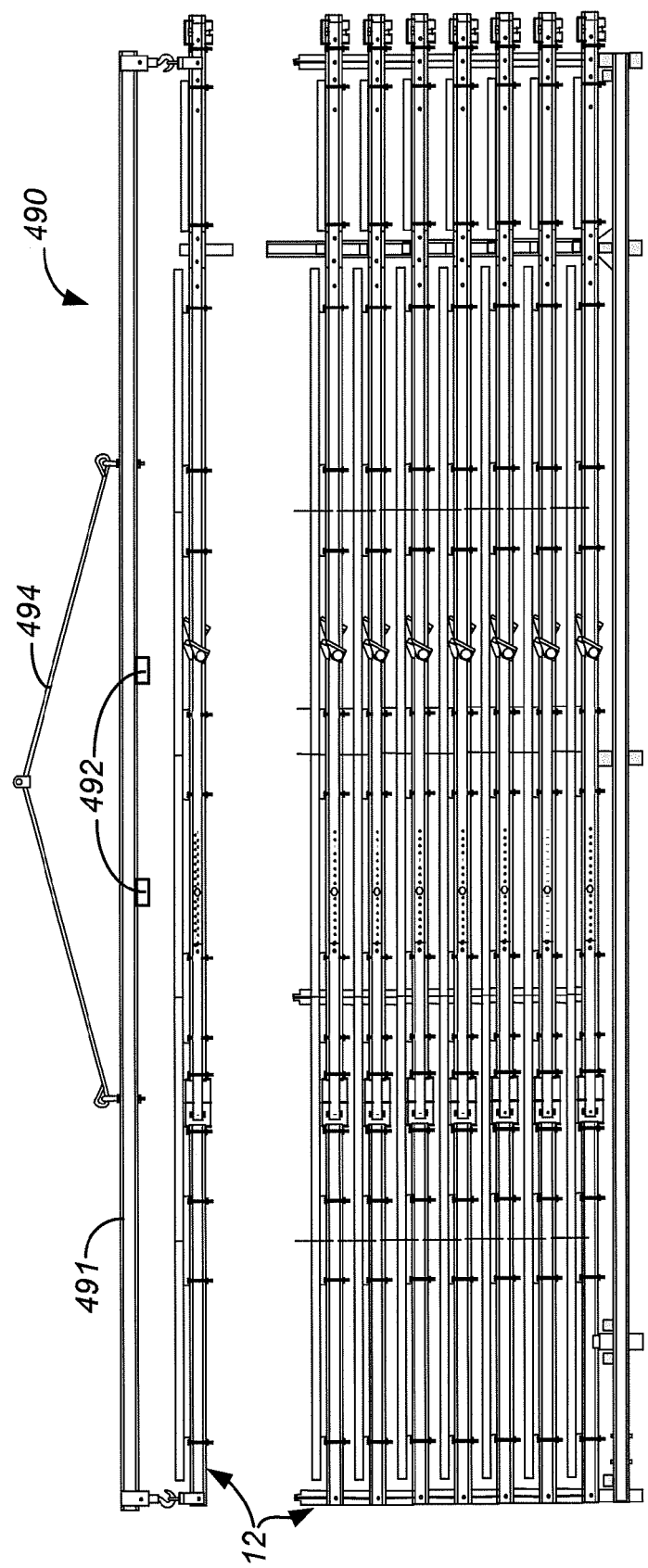
FIGS. 40 and 41 are side and enlarged partial side views of the structure of FIG. 39.
Figure 41:
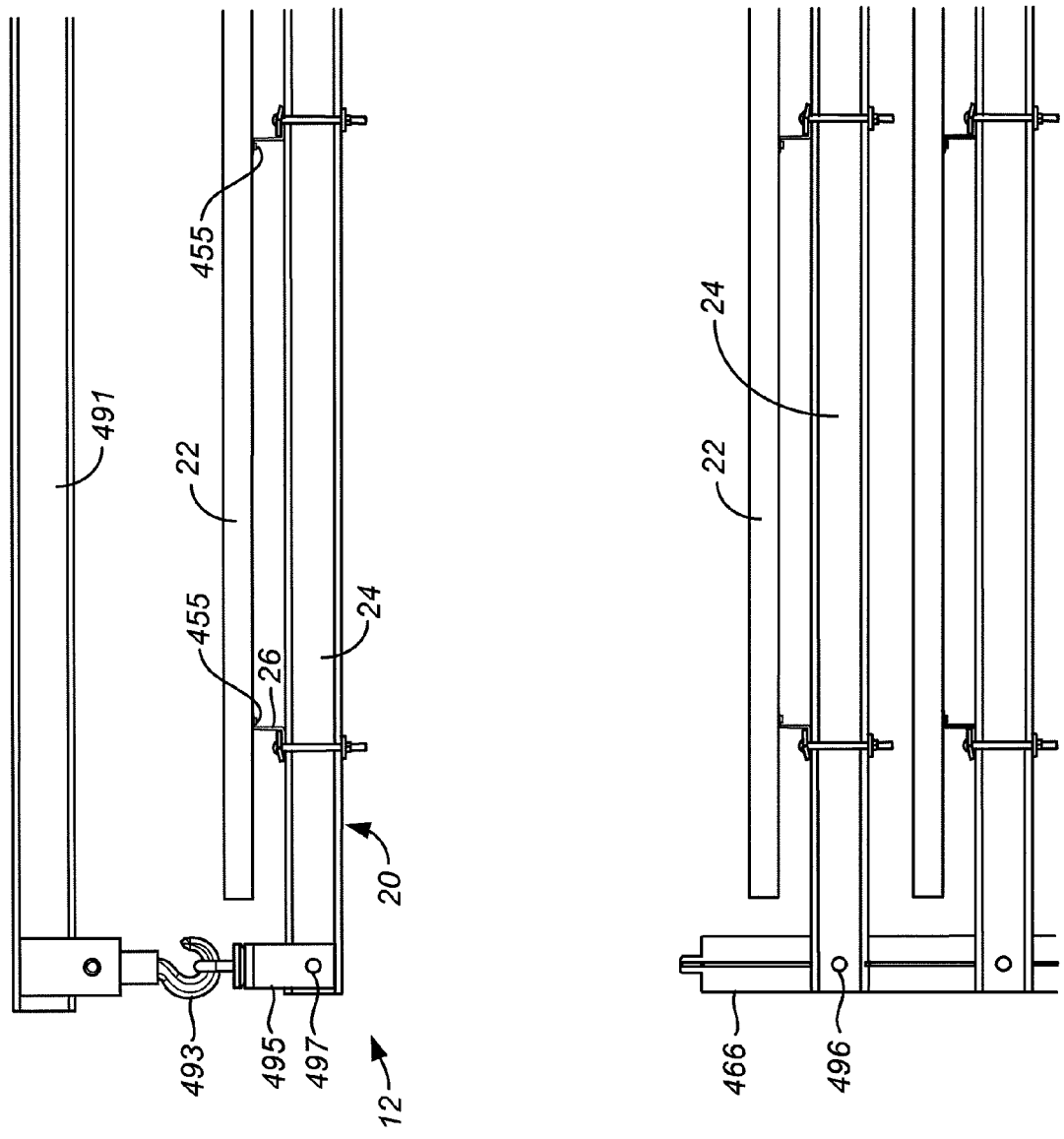

FIGS. 39-41 show the use of lifting apparatus 490 to aid in lifting a solar collector module assembly 12 to either create a stack of assemblies 12 or to remove an assembly 12 from a stack of assemblies 12, typically at an installation site with the aid of a crane, forklift or other mechanical lifting apparatus. Lifting apparatus 490 includes a lifting bar 491 having a pair of stabilizing bars 492 secured to the bottom of bar 491. Lifting apparatus 490 also has lifting hooks at both ends and a lifting line 494 extending outwardly from lifting bar 491. Lifting apparatus 490 also includes a lifting eye adapter 495 that can be secured to either end of torque member 24, typically using a bolt or a quick release fastener, not shown, passing through holes 496, 497 formed in torque member 24 and adapter 495, respectively.

The above descriptions may have used terms such as above, below, top, bottom, over, under, et cetera. These terms are used to aid understanding of the invention are not used in a limiting sense. The directions north and south have been used assuming the installation site is in the Northern Hemisphere. The more generic terms polar for north and equator or equatorial for south can be used to cover installation sites in both the Northern Hemisphere and the Southern Hemisphere.

Modification and variation can be made to the disclosed embodiments without departing from the subject of the invention. For example, torque member 24 may have a variety of cross-sectional shapes including round and square, may have a partially or fully solid interior, may be made of one or more materials, and may have its various structural features vary along its length. Torque member 24 and rails 26, which act as a support or frame for solar collector modules 22, could be replaced by other solar collector support structure, such as a rigid rectangular platform. Therefore, tilt assembly 50 could be secured to structure other than torque member 24. The solar collector support structure could be mounted so to tilt not about a fixed tilt axis 42 but, for example, about a range of instantaneous tilt axes.

Any and all patents, patent applications and printed publications referred to above are incorporated by reference.

The invention claimed is:

1. A stack of solar collector assemblies comprising:
a plurality of spacers;
a stack of solar collector assemblies, each solar collector assembly comprising:
a frame and a solar collector mounted to the frame, the frame having a first end and a second end, the frame comprising a frame member defining a tilt axis;
solar collector having upper and lower surfaces with the upper and lower surfaces of the solar collectors of adjacent ones of the solar collector assemblies facing one another;
the frame further comprising spacer engagement areas configured to engage with the spacers;
a first side support coupled to the frame member towards the first end;
a second side support coupled to the frame member towards the second end, the frame member being pivotally coupled to the first and second side supports to permit the solar collector module to be tilted about a tilt axis;
the spacers extending between each of the solar collector assemblies so as to engage with the spacer engagement areas on adjacent solar collector module assemblies to support the solar collector module assemblies in a stacked configuration; and
the second side support comprising first and second struts, each strut being coupled to the frame for pivotal movement about a first axis generally parallel to the tilt axis and about a second axis to permit the struts to be extended from a first orientation generally parallel to the frame member to a second orientation generally away from the frame during set up.

2. A stack of solar collector assemblies of claim 1 wherein the frame extends beyond the solar collector at the first and second ends.

3. The stack of solar collector assemblies of claim 1 wherein the plurality of spacers comprise elongated members each having a first end and a second end, the first end configured to pass into a hole in a one frame member and a second end configured to pass into a hole in an adjacent frame member.

4. The stack of solar collector assemblies of claim 1 wherein: the spacer engagement areas comprise holes in the frame members toward the first and second ends; the plurality of spacers comprises a plurality of first spacer elements configured to engage the holes in the frame members; and the first spacer elements comprise elongated members each having a first end and a second end, the first end configured to pass into a hole in the first or second end of one frame member and a second end configured to stably engage an adjacent frame member.

5. The stack of solar collector assemblies of claim 4 wherein the first spacer elements further comprise rods and the elongated members comprise tubular spacer elements configured to permit the rods to extend therethrough at the first and second ends of the frame member.

6. The stack of solar collector assemblies of claim 5 wherein the rods comprise lifting points to facilitate lifting of the stack of solar collector assemblies.

7. The stack of solar collector assemblies of claim 4 wherein:
the frame further comprises rails extending transversely to the frame member; and further comprising:
a plurality of second spacer elements configured to engage the rails, the second spacer elements having a generally inverted T-cross-sectional shape with a base and a center element extending upwardly from the base and wherein the base is configured to engage the rail of one frame and the center element is configured to engage the rail of an adjacent frame.

8. The stack of solar collector assemblies of claim 1 wherein at least one of the solar collector assemblies comprises:
a drive element configured to be securable to the frame member in a first orientation and securable to the frame in a second orientation;
the drive element extending substantially away from the pivot axis and the solar collector when in the first orientation; and
the drive element extending (1) substantially away from the pivot axis, and (2) generally along and parallel to the solar collector when in the second orientation.

9. The stack of solar collector assemblies of claim 8 further comprising a skid on which the solar collector assemblies are supported.

10. The stack of solar collector assemblies of claim 9 wherein: the skid comprises a base, supporting the solar collector assemblies, and a stabilizer bar extending upwardly from the base; and the drive element is securable to the stabilizer bar to help stabilize the stack of solar collector assemblies.

11. The stack of solar collector assemblies of claim 10 wherein a plurality of the solar collector assemblies comprise drive elements and wherein adjacent drive elements comprise nesting elements which engage one another to at least reduce relative lateral movement therebetween.

12. The stack of solar collector assemblies of claim 1 wherein the bottom assembly in the stack is biased toward the top assembly in the stack.

13. The stack of solar collector assemblies of claim 1 wherein stack further comprises lifting points to facilitate lifting of the stack of solar collector assemblies.

\* \* \* \* \*